US012656586B2

(12) United States Patent
Saito et al.

(10) Patent No.: US 12,656,586 B2
(45) Date of Patent: Jun. 16, 2026

(54) IMAGING LENS AND IMAGING APPARATUS

(71) Applicant: FUJIFILM Corporation, Tokyo (JP)

(72) Inventors: Hiroki Saito, Saitama (JP); Ryoko Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 722 days.

(21) Appl. No.: 18/155,673

(22) Filed: Jan. 17, 2023

(65) Prior Publication Data

US 2023/0228980 A1     Jul. 20, 2023

(30) Foreign Application Priority Data

Jan. 19, 2022     (JP) ................................. 2022-006673

(51) Int. Cl.
*G02B 15/14*          (2006.01)

(52) U.S. Cl.
CPC . *G02B 15/143107* (2019.08); *G02B 15/1421* (2019.08); *G02B 15/143103* (2019.08); *G02B 15/143503* (2019.08)

(58) Field of Classification Search
CPC ........ G02B 15/143107; G02B 15/1421; G02B 15/143103; G02B 15/143503
See application file for complete search history.

(56) References Cited

U.S. PATENT DOCUMENTS

| | | | |
|---|---|---|---|
| 6,301,056 B1 | 10/2001 | Kreitzer | |
| 2021/0103123 A1 | 4/2021 | Hagiwara | |

FOREIGN PATENT DOCUMENTS

| | | |
|---|---|---|
| CN | 112835185 A | 5/2021 |
| JP | 2005-249983 A | 9/2005 |
| JP | 2008-292732 A | 12/2008 |
| JP | 2014-044246 A | 3/2014 |
| JP | 2017-003807 A | 1/2017 |
| JP | 2021-060475 A | 4/2021 |

OTHER PUBLICATIONS

JP_2008292732, translation (Year: 2008).*
An Office Action; "Notice of Reasons for Refusal," mailed by the Japanese Patent Office on Jul. 29, 2025, which corresponds to Japanese Patent Application No. 2022-006673 and is related to U.S. Appl. No. 18/155,673; with English language translation.

* cited by examiner

*Primary Examiner* — Wen Huang
(74) *Attorney, Agent, or Firm* — Studebaker Brackett PLLC

(57)          ABSTRACT
An imaging lens consists of a front group, an aperture stop, and a rear group, in order from an object side. The rear group includes at least one Lp lens that is made of a resin, has a positive refractive power, and is cemented to a lens. Assuming that an Abbe number and a refractive index of the Lp lens are respectively vp and Np, the Lp lens satisfies Conditional Expression represented by $120 < vp + 94.24 \times Np < 180$. The imaging lens satisfies predetermined conditional expressions.

18 Claims, 24 Drawing Sheets

EXAMPLE 1

EXAMPLE 1

INFINITY

CLOSE

EXAMPLE 1

EXAMPLE 2

EXAMPLE 2

EXAMPLE 3

EXAMPLE 3

FIG. 10

EXAMPLE 4

EXAMPLE 4

EXAMPLE 5

EXAMPLE 5

FIG. 14

EXAMPLE 6

EXAMPLE 6

EXAMPLE 7

EXAMPLE 7

EXAMPLE 8

EXAMPLE 8

EXAMPLE 9

EXAMPLE 9

FIG. 22

EXAMPLE 10

EXAMPLE 10

IMAGING LENS AND IMAGING APPARATUS

CROSS-REFERENCE TO RELATED APPLICATIONS

This application claims priority from Japanese Patent Application No. 2022-006673, filed on Jan. 19, 2022, the entire disclosure of which is incorporated herein by reference.

BACKGROUND OF THE INVENTION

Technical Field

A technique of the present disclosure relates to an imaging lens and an imaging apparatus.

Related Art

In the related art, as an imaging lens that can be used in an imaging apparatus such as a digital camera, an imaging lens described in JP2021-060475A below is known.

There is a demand for an imaging lens which has a small size and a light weight, has a small F number, and has favorable optical performance by suppressing chromatic aberration. The demand levels are increasing year by year.

SUMMARY

The present disclosure has been made in view of the above circumstances, and it is an object to provide an imaging lens, which has a small size and a light weight, has a small F number, and has favorable optical performance by suppressing chromatic aberration, and an imaging apparatus comprising the imaging lens.

According to one aspect of the present disclosure, an imaging lens consists of, in order from an object side to an image side, a front group, an aperture stop, and a rear group. The rear group includes at least one Lp lens that is made of a resin, has a positive refractive power, and is cemented to a lens. Conditional Expressions (1), (2), (3), and (4) are satisfied, which are represented by $$120 < vp + 94.24 \times Np < 186 \tag{1},$$

$$0 < d \times (1/Rf - 1/Rr) < 0.05 \tag{2},$$

$$-20 < TL \times (1/De - 1/Rr) < 20 \tag{3, and}$$

$$1 < FN_0 \times TL/(f \times \tan \omega m) < 30 \tag{4}.$$

The symbols of each of the above-mentioned conditional expressions are defined as follows. It assumed that an Abbe number of the Lp lens based on a d line is vp. It assumed that a refractive index of the Lp lens at the d line is Np. It assumed that a center thickness of the Lp lens is d. It assumed that a curvature radius of an object side surface of the Lp lens is Rf. It assumed that a curvature radius of an image side surface of the Lp lens is Rr. It assumed that a sum of an air-equivalent distance on an optical axis from a lens surface closest to the image side in the rear group to an image plane and a distance on the optical axis from a lens surface closest to the object side in the front group to the lens surface closest to the image side in the rear group in a state in which an infinite distance object is in focus is TL. It assumed that a distance on the optical axis from the image side surface of the Lp lens to an image point, which is formed by an optical system ranging from a lens surface adjacent to the image side of the aperture stop to the image side surface of the Lp lens, in a case where a point at a position of the aperture stop on the optical axis is set as an object point in a state in which the infinite distance object is in focus is De. De is calculated in a case where a medium closer to the image side than the image side surface of the Lp lens is set as air. It assumed that a sign of De is negative in a case where the image point is closer to the object side than the image side surface of the Lp lens on the optical axis and is positive in a case where the image point is closer to the image side than the image side surface of the Lp lens. It assumed that an open F number of a whole system in a state in which the infinite distance object is in focus is FNo. It assumed that a focal length of the whole system in a state in which the infinite distance object is in focus is f. It assumed that a maximum half angle of view of the whole system in a state in which the infinite distance object is in focus is ωm.

The Lp lens may be configured to have either the object side surface or the image side surface being in contact with air. Alternatively, the Lp lens may be configured to have both the object side surface and the image side surface cemented to a lens.

It is preferable that a focus group moving along the optical axis during focusing includes the Lp lens.

The Lp lens may be configured to have either the object side surface or the image side surface having an aspherical shape.

Assuming that the air-equivalent distance on the optical axis from the lens surface closest to the image side in the rear group to the image plane in a state in which the infinite distance object is in focus is Bf, it is preferable that the imaging lens according to the above-mentioned aspect satisfies Conditional Expression (5), which is represented by $$0.4 < Bf/(f \times \tan \omega m) < 1.7 \tag{5}.$$

Assuming that a distance on the optical axis from the lens surface closest to the object side in the front group to a paraxial entrance pupil position in a state in which the infinite distance object is in focus is Denp, it is preferable that the imaging lens according to the above-mentioned aspect satisfies Conditional Expression (6), which is represented by $$0.3 < Denp/f < 2.5 \tag{6}.$$

Assuming that the air-equivalent distance on the optical axis from the lens surface closest to the image side in the rear group to the image plane in a state in which the infinite distance object is in focus is Bf, and a sum of the air-equivalent distance on the optical axis from the lens surface closest to the image side in the rear group to the image plane and a distance on the optical axis from a paraxial exit pupil position to the lens surface closest to the image side in the rear group in a state in which the infinite distance object is in focus is Dexp, it is preferable that the imaging lens according to the above-mentioned aspect satisfies Conditional Expression (7), which is represented by $$1.95 < Dexp/Bf < 7.2 \tag{7}.$$

Assuming that a focal length of the Lp lens is fp, it is preferable that the imaging lens according to the above-mentioned aspect satisfies Conditional Expression (8), which is represented by $$0.1 < TL/fp < 1.2 \tag{8}.$$

Assuming that a height from the optical axis of a principal ray at a maximum half angle of view on the object side surface of the Lp lens in a state in which the infinite distance object is in focus is Hpp, and a height from the optical axis of an on-axis marginal ray on the object side surface of the Lp lens in a state in which the infinite distance object is in focus is Hpm, it is preferable that the imaging lens according to the above-mentioned aspect satisfies Conditional Expression (9), which is represented by $$0.2 < Hpp/Hpm < 1.1 \tag{9}$$

It is preferable that the imaging lens according to the above-mentioned aspect satisfies Conditional Expression (10), which is represented by $$-0.9 < (De-Rr)/(De+Rr) < 0.9 \tag{10}$$

It is preferable that the imaging lens according to the above-mentioned aspect satisfies Conditional Expression (11), which is represented by $$0.005 < (Rf-Rr)/(Rf+Rr) < 0.45 \tag{11}$$

Assuming that a focal length of a focus group moving along the optical axis during focusing is ffoc, and a focal length of the Lp lens is fp, it is preferable that the imaging lens according to the above-mentioned aspect satisfies Conditional Expression (12), which is represented by $$0.04 < ffoc/fp < 0.36 \tag{12}$$

It is preferable that the Lp lens satisfies Conditional Expression (13), which is represented by $$14 < vp < 28 \tag{13}$$

Assuming that a partial dispersion ratio of the Lp lens between a g line and an F line is θgFp, it is preferable that the Lp lens satisfies Conditional Expression (14), which is represented by $$0.67 < θgFp < 1.1 \tag{14}$$

It is preferable that the Lp lens satisfies Conditional Expression (15), which is represented by $$1.51 < Np < 1.72 \tag{15}$$

Assuming that a sum of the air-equivalent distance on the optical axis from the lens surface closest to the image side in the rear group to the image plane and a distance on the optical axis from a paraxial exit pupil position to the lens surface closest to the image side in the rear group in a state in which the infinite distance object is in focus is Dexp, and a sum of the air-equivalent distance on the optical axis from the lens surface closest to the image side in the rear group to the image plane and a distance on the optical axis from the object side surface of the Lp lens to the lens surface closest to the image side in the rear group in a state in which the infinite distance object is in focus is Dpi, it is preferable that the imaging lens according to the above-mentioned aspect satisfies Conditional Expression (16), which is represented by $$0.8 < Dexp/Dpi < 2.4 \tag{16}$$

Assuming that a sum of the air-equivalent distance on the optical axis from the lens surface closest to the image side in the rear group to the image plane and a distance on the optical axis from the object side surface of the Lp lens to the lens surface closest to the image side in the rear group in a state in which the infinite distance object is in focus is Dpi, and a height from the optical axis of an on-axis marginal ray on the object side surface of the Lp lens in a state in which the infinite distance object is in focus is Hpm, it is preferable that the imaging lens according to the above-mentioned aspect satisfies Conditional Expression (17), which is represented by $$1.9 < Dpi/Hpm < 5.9 \tag{17}$$

4

It is preferable that the imaging lens according to the above-mentioned aspect satisfies Conditional Expression (18), which is represented by $$-2.5 < (f×\tan ωm)×(1/De-1/Rr) < 1 \tag{18}$$

An imaging apparatus according to another aspect of the present disclosure comprises the imaging lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "group that has a positive refractive power" in the present specification means that the group has a positive refractive power as a whole. Similarly, the term "group that has a negative refractive power" means that the group has a negative refractive power as a whole. The term "a lens that has a positive refractive power" and the term "a positive lens" are synonymous. The terms "front group", "rear group", "focus group", "first lens group", "second lens group", and "third lens group" in the present specification are not limited to a configuration consisting of a plurality of lenses. However, a configuration may have a configuration consisting of only one lens.

The term "the whole system" of the present specification means an imaging lens. The sign of the curvature radius of the convex surface facing toward the object side is positive, and the sign of the curvature radius of the convex surface facing toward the image side is negative. The curvature radius, the sign of the refractive power, and the surface shape of the lens including the aspherical surface will be used in terms of the paraxial region unless otherwise specified.

The "focal length" used in a conditional expression is a paraxial focal length. Unless otherwise specified, the "distance on the optical axis" used in Conditional Expression is considered as a geometrical distance. Unless otherwise specified, the values used in the conditional expressions are values based on the d line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens, which has a small size and a light weight, has a small F number, and has favorable optical performance by suppressing chromatic aberration, and an imaging apparatus comprising the imaging lens.

BRIEF DESCRIPTION OF THE DRAWINGS

FIG. 10 is a cross-sectional view showing a configuration of an imaging lens of Example 4.

FIG. 14 is a cross-sectional view showing a configuration of an imaging lens of Example 6.

FIG. 22 is a cross-sectional view showing a configuration of an imaging lens of Example 10.

DESCRIPTION OF EMBODIMENTS

Figure 1:
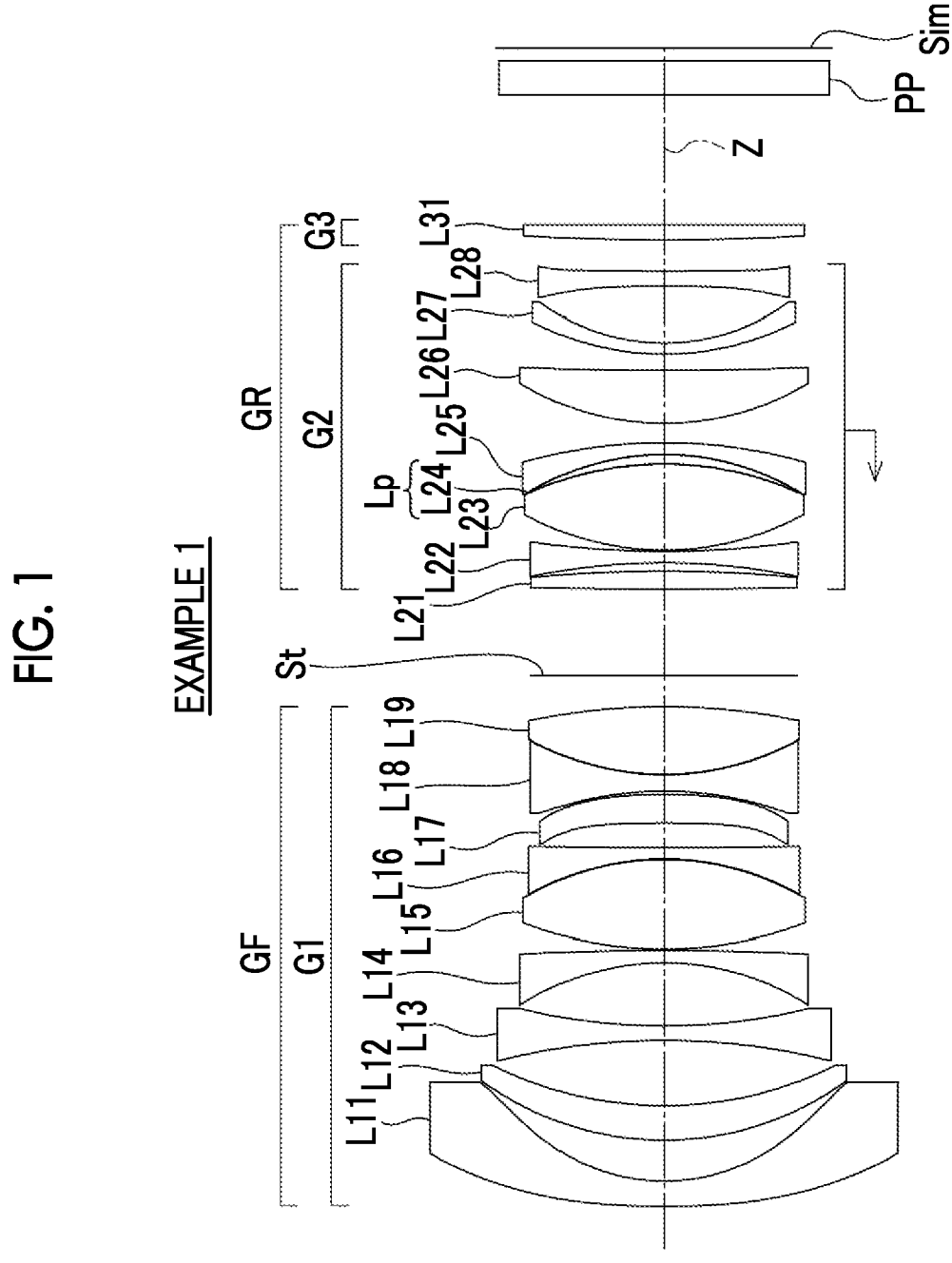
FIG. 1 is a cross-sectional view showing a configuration of an imaging lens according to an embodiment, which corresponds to the imaging lens of Example 1.
Figure 2:
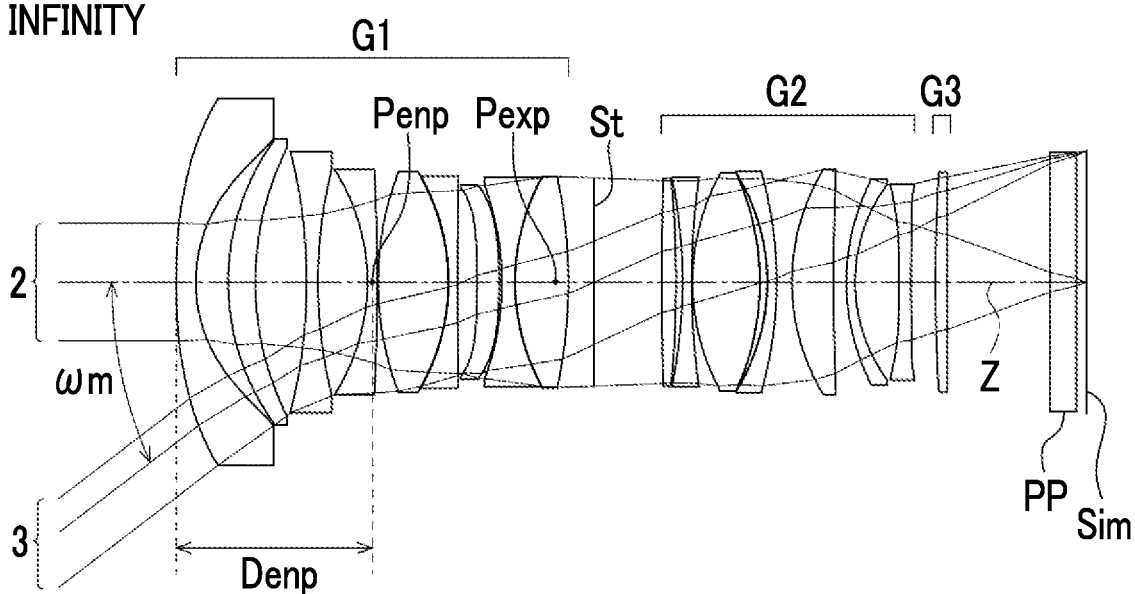
FIG. 2 is a cross-sectional view showing a configuration and luminous flux in each in-focus state of the imaging lens of FIG. 1.
Figure 2:
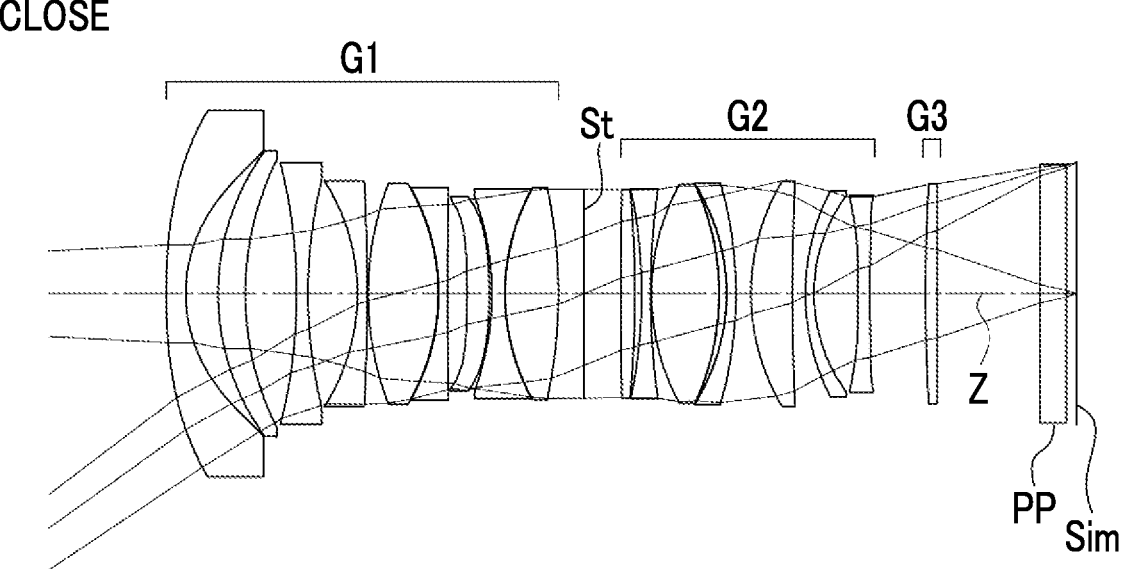

Hereinafter, embodiments of the present disclosure will be described with reference to the accompanying drawings. FIG. 1 shows a cross-sectional view of the configuration of the imaging lens according to the embodiment of the present disclosure in a state in which the infinite distance object is in focus. FIG. 2 shows a cross-sectional view showing a configuration and luminous flux in each in-focus state of the imaging lens of FIG. 1. In FIG. 2, the upper part labeled "INFINITY" shows a state in which the infinite distance object is in focus, and the lower part labeled "CLOSEST" shows a state in which a close object at a distance of 98.4 mm (millimeters) from the lens surface closest to the object side is in focus. In the present specification, an object at an infinite distance is referred to as the infinite distance object, and an object at the close distance is referred to as the close object. The upper part of FIG. 2 shows, as the luminous flux, an on-axis luminous flux 2 and a luminous flux 3 having a maximum half angle of view ωm in a state in which the infinite distance object is in focus. The lower part of FIG. 2 shows, as the luminous flux, an on-axis luminous flux and a luminous flux having a maximum half angle of view in a state in which the close object is in focus.

The examples shown in FIGS. 1 and 2 correspond to the imaging lens of Example 1 to be described later. In FIGS. 1 and 2, the left side is the object side and the right side is the image side. Hereinafter, description thereof will be given mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens according to the embodiment of the present disclosure consists of a front group GF, an aperture stop St, and a rear group GR, in order from the object side to the image side along an optical axis Z. According to the configuration, there is an advantage in suppressing various aberrations while maintaining the reduction in size and weight. It should be noted that the aperture stop St in FIG. 1 does not indicate a size and a shape, but indicates a position in an optical axis direction.

For example, the front group GF and the rear group GR of the imaging lens of FIG. 1 are configured as follows. The front group GF consists of a first lens group G1. The first lens group G1 consists of nine lenses, lenses L11 to L19, in order from the object side to the image side. The rear group GR consists of a second lens group G2 and a third lens group G3, in order from the object side to the image side. The second lens group G2 consists of eight lenses L21 to L28. The third lens group G3 consists of one lens L31.

In the example of FIG. 1, during focusing, the first lens group G1 and the third lens group G3 remain stationary with respect to an image plane Sim, and the entire second lens group moves integrally along the optical axis Z. The term "moves integrally" described herein means that the same amount of movement is performed in the same direction at the same time. In the present specification, a group which moves along the optical axis Z during focusing is referred to as a focus group. The focusing is performed by moving the focus group. The arrow pointing to the left below the second lens group G2 in FIG. 1 indicates that the second lens group G2 is a focus group moving toward the object side during focusing from the infinite distance object to the close object.

It should be noted that the term "lens group" in the present specification refers to a part including at least one lens, which is a constituent part of the imaging lens and is divided by an air spacing that changes during focusing. During focusing, each lens group moves or remains stationary, and the mutual spacing between the lenses in each lens group does not change. That is, in the present specification, one lens group is a group in which the spacing between adjacent groups changes during focusing and the total spacing between adjacent lenses does not change within itself.

The rear group GR of the imaging lens according to the embodiment of the present disclosure includes at least one Lp lens Lp which is made of a resin, has a positive refractive power, and which is cemented to a lens. By disposing the above-mentioned Lp lens Lp made of a resin as a material in the rear group GR, it is easy to correct longitudinal chromatic aberration and lateral chromatic aberration in a well-balanced manner while achieving reduction in weight. In the example of FIG. 1, a lens L24 corresponds to the Lp lens Lp. The lens L24 of the example of FIG. 1 is cemented to a lens L23 and a lens L25.

The Lp lens Lp is a lens which satisfies Conditional Expression (1). Here, it is assumed that an Abbe number of the Lp lens Lp based on the d line is νp, and a refractive index of the Lp lens Lp at the d line is Np. By not allowing the corresponding value of Conditional Expression (1) to be equal to or less than the lower limit thereof, it is possible to suppress excessive correction of chromatic aberration. By not allowing the corresponding value of Conditional Expression (1) to be equal to or greater than the upper limit thereof, there is an advantage in improving chromatic aberration. In order to obtain more favorable characteristics, it is more preferable that the Lp lens Lp satisfies Conditional Expression (1-1), and it is yet more preferable that the Lp lens Lp satisfies Conditional Expression (1-2).

$$120 < \nu p + 94.24 \times Np < 186 \tag{1}$$

$$140 < \nu p + 94.24 \times Np < 183 \tag{1-1}$$

$$160 < \nu p + 94.24 \times Np < 175 \tag{1-2}$$

Figures 3, 4:
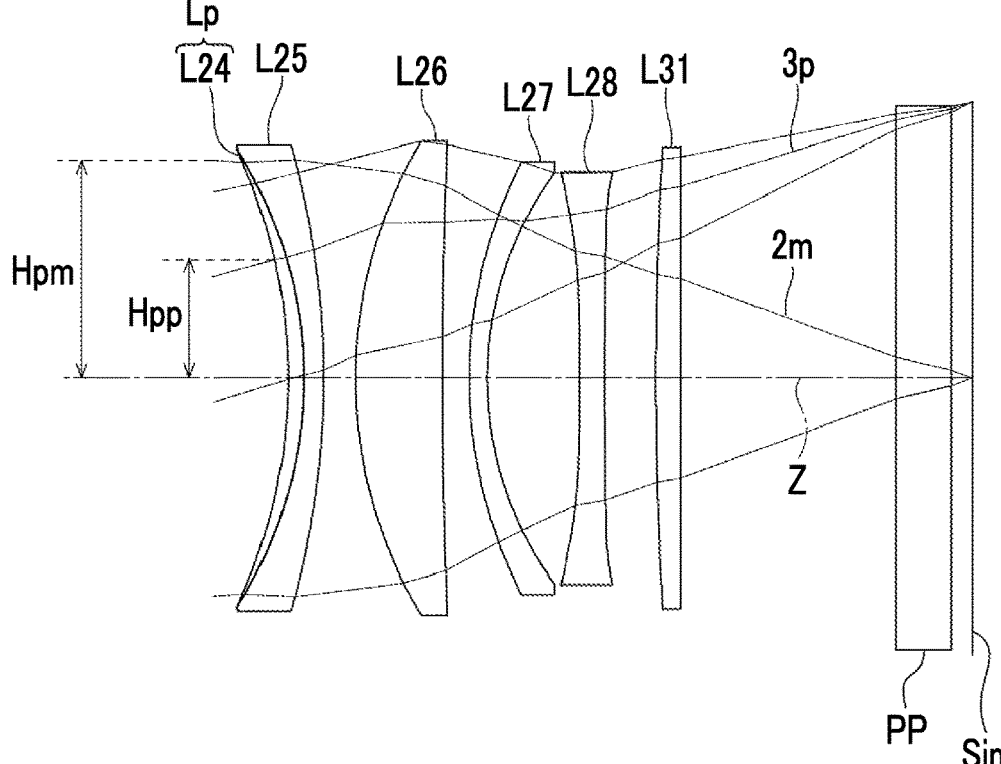
FIG. 3 is a diagram for explaining symbols of each conditional expression.
FIG. 4 is a diagram for explaining symbols of each conditional expression.

Assuming that a center thickness of the Lp lens Lp is d, a curvature radius of the object side surface of the Lp lens Lp is Rf, and a curvature radius of the image side surface of the Lp lens Lp is Rr, it is preferable that the Lp lens Lp satisfies Conditional Expression (2). For example, FIG. 3 shows an enlarged view of a part of the imaging lens of FIG. 1 including the Lp lens Lp, and shows the center thickness d. The Lp lens Lp satisfying Conditional Expression (2) has a small d and has a shape in which Rf and Rr are approximate to each other. By not allowing the corresponding value of Conditional Expression (2) to be equal to or less than the lower limit thereof, the refractive power of the Lp lens Lp can be increased. Therefore, a higher chromatic aberration correction effect can be obtained. By not allowing the corresponding value of Conditional Expression (2) to be equal to or greater than the upper limit, the refractive power and the thickness of the Lp lens Lp can be appropriately set. Therefore, it is easy to suppress fluctuation in aberrations in a case where the refractive index of the Lp lens Lp fluctuates due to environment change such as temperature. In order to obtain more favorable characteristics, it is more preferable that the Lp lens Lp satisfies Conditional Expression (2-1), it is yet more preferable that the Lp lens Lp satisfies Conditional Expression (2-2), and it is most preferable that the Lp lens Lp satisfies Conditional Expression (2-3).

$$0 < d \times (1/Rf - 1/Rr) < 0.05 \tag{2}$$

$$0.0001 < d \times (1/Rf - 1/Rr) < 0.025 \tag{2-1}$$

$$0.0005 < d \times (1/Rf - 1/Rr) < 0.015 \tag{2-2}$$

$$0.0013 < d \times (1/Rf - 1/Rr) < 0.009 \tag{2-3}$$

Hereinafter, preferable and possible configurations of the imaging lens according to the embodiment of the present disclosure including the above-mentioned Lp lens Lp will be described. In the following description of conditional expressions, in order to avoid redundancy, the same symbol is used for the same definition, and the duplicate description of the symbol is omitted. In the following description, the "imaging lens according to the embodiment of the present disclosure" is also simply referred to as an "imaging lens" in order to avoid redundancy.

Regarding the Lp lens Lp, it is preferable that the imaging lens satisfies Conditional Expression (3). Here, it is assumed that a sum of an air-equivalent distance on the optical axis from a lens surface closest to the image side in the rear group GR to an image plane Sim and a distance on the optical axis from a lens surface closest to the object side in the front group GF to the lens surface closest to the image side in the rear group GR in a state in which an infinite distance object is in focus is TL. Further, it is assumed that a distance on the optical axis from the image side surface of the Lp lens Lp to an image point, which is formed by an optical system ranging from a lens surface adjacent to the image side of the aperture stop St to the image side surface of the Lp lens Lp, in a case where a point at a position of the aperture stop St on the optical axis is set as an object point in a state in which the infinite distance object is in focus is De. For example, FIG. 3 shows the distance De in the imaging lens of FIG. 1. By not allowing the corresponding value of Conditional Expression (3) to be equal to or less than the lower limit thereof, it is easy to make the off-axis principal ray passing through the Lp lens Lp substantially perpendicular to the object side surface of the Lp lens Lp. Thereby, the difference in optical path length between the off-axis principal ray and the on-axis ray increases. Therefore, it is possible to make a difference in the effect of correcting chromatic aberration between the off-axis ray and the on-axis ray, and it is possible to effectively correct lateral chromatic aberration. By not allowing the corresponding value of Conditional Expression (3) to be equal to or greater than the upper limit thereof, it is possible to suppress the off-axis principal ray passing through the Lp lens Lp from being incident onto the object side surface of the Lp lens Lp at an angle in the convergence direction. As a result, there is an advantage in achieving the optical system closer to the object side than the Lp lens Lp. The phrase "incident at an angle in the convergence direction" as used herein means that the incident ray is incident from the optical axis side, that is, from the inside in the radial direction with respect to the normal line of the lens surface at the incident point. In order to obtain more favorable characteristics, it is more preferable that the imaging lens satisfies Conditional Expression (3-1), it is yet more preferable that the imaging lens satisfies Conditional Expression (3-2), and it is most preferable that the imaging lens satisfies Conditional Expression (3-3).

$$-20 < TL \times (1/De - 1/Rr) < 20 \tag{3}$$

$$-10 < TL \times (1/De - 1/Rr) < 10 \tag{3-1}$$

$$-9 < TL \times (1/De - 1/Rr) < 5 \tag{3-2}$$

$$-7.4 < TL \times (1/De - 1/Rr) < 0.7 \tag{3-3}$$

Referring to FIG. 3, the distance De will be described in detail. FIG. 3 shows an enlarged part of the imaging lens of FIG. 1 ranging from the aperture stop St to the lens L24 corresponding to the Lp lens Lp. In FIG. 3, the lens surface adjacent to the image side of the aperture stop St is an object side surface of the lens L21, and a point at a position of the aperture stop St on the optical axis is a point Pob. In a case where the point Pob is an object point, the image point formed by the optical system from the object side surface of the lens L21 to an image side surface of the lens L24 is a point Pim. That is, the point Pob and the point Pim are in a conjugate relationship with respect to the optical system from the object side surface of the lens L21 to the image side surface of the lens L24. In FIG. 3, the solid line indicates a ray that is emitted from the point Pob as an object point and is incident onto the optical system from the object side surface of the lens L21 to the image side surface of the lens L24, and the two-dot chain line indicates a ray that is emitted from the optical system and is incident onto the point Pim as the image point. The distance De is a distance on the optical axis from this reference to the point Pim with respect to the image side surface of the Lp lens Lp. In FIG. 3, a ray is drawn for convenience of explanation, but the distance De is calculated by tracing the paraxial ray instead of using the real ray. Further, assuming that the medium closer to the image side than the image side surface of the Lp lens Lp is air, the distance De is calculated. The sign of the distance De is negative in a case where the image point is closer to the object side than the image side surface of the Lp lens Lp on the optical axis, and positive in a case where the image point is closer to the image side than the image side surface of the Lp lens Lp on the optical axis.

In a case where an open F number in a state in which the infinite distance object is in focus is FNo, a focal length of the whole system in a state in which the infinite distance object is in focus is f, and a maximum half angle of view in a state in which the infinite distance object is in focus is $\omega$m, it is preferable that the imaging lens satisfies Conditional Expression (4). tan of Conditional Expression (4) is a tangent. By not allowing the corresponding value of Conditional Expression (4) to be equal to or less than the lower limit thereof, the magnitude of the luminous flux passing through the optical system and the total length of the optical system can be appropriately set. As a result, there is an advantage in suppressing various aberrations. By not allowing the corresponding value of Conditional Expression (4) to be equal to or greater than the upper limit, it is easy to realize an optical system which has a small size and a light weight and has a smaller F number. In order to obtain more favorable characteristics, it is more preferable that the imaging lens satisfies Conditional Expression (4-1), it is yet more preferable that the imaging lens satisfies Conditional Expression (4-2), and it is most preferable that the imaging lens satisfies Conditional Expression (4-3).

$$1 < FNo \times TL/(f \times \tan \omega m) < 30 \tag{4}$$

$$3 < FNo \times TL/(f \times \tan \omega m) < 21 \tag{4-1}$$

$$5 < FNo \times TL/(f \times \tan \omega m) < 14 \tag{4-2}$$

$$8 < FNo \times TL/(f \times \tan \omega m) < 10 \tag{4-3}$$

Assuming that the air-equivalent distance on the optical axis from the lens surface closest to the image side in the rear group GR to the image plane Sim in a state in which the infinite distance object is in focus is Bf, it is preferable that the imaging lens satisfies Conditional Expression (5). By not allowing the corresponding value of Conditional Expression (5) to be equal to or less than the lower limit thereof, there is an advantage in suppressing field curvature. By not allowing the corresponding value of Conditional Expression (5) to be equal to or greater than the upper limit thereof, there is an advantage in achieving reduction in total length of the optical system. In order to obtain more favorable characteristics, it is more preferable that the imaging lens satisfies Conditional Expression (5-1), and it is yet more preferable that the imaging lens satisfies Conditional Expression (5-2).

$$0.4 < Bf/(f \times \tan \omega m) < 1.7 \tag{5}$$

$$0.6 < Bf/(f \times \tan \omega m) < 1.47 \tag{5-1}$$

$$0.77 < Bf/(f \times \tan \omega m) < 1.1 \tag{5-2}$$

Assuming that a distance on the optical axis from the lens surface closest to the object side in the front group GF to a paraxial entrance pupil position Penp in a state in which the infinite distance object is in focus is Denp, it is preferable that the imaging lens satisfies Conditional Expression (6). For example, FIG. 2 shows the paraxial entrance pupil position Penp in a state in which the infinite distance object is in focus, and the distance Denp defined above. By not allowing the corresponding value of Conditional Expression (6) to be equal to or less than the lower limit thereof, there is an advantage in suppressing distortion. By not allowing the corresponding value of Conditional Expression (6) to be equal to or greater than the upper limit thereof, there is an advantage in achieving reduction in size of the front group GF. In order to obtain more favorable characteristics, it is more preferable that the imaging lens satisfies Conditional Expression (6-1), and it is yet more preferable that the imaging lens satisfies Conditional Expression (6-2).

$$0.3 < Denp/f < 2.5 \tag{6}$$

$$0.7 < Denp/f < 2 \tag{6-1}$$

$$0.92 < Denp/f < 1.25 \tag{6-2}$$

Assuming that, in a state in which the infinite distance object is in focus, a sum of the air-equivalent distance on the optical axis from the lens surface closest to the image side in the rear group GR to the image plane Sim and a distance on the optical axis from a paraxial exit pupil position Pexp to the lens surface closest to the image side in the rear group GR is Dexp, it is preferable that the imaging lens satisfies Conditional Expression (7). For example, FIG. 2 shows the paraxial exit pupil position Pexp in a state in which the infinite distance object is in focus. By not allowing the corresponding value of Conditional Expression (7) to be equal to or less than the lower limit thereof, there is an advantage in suppressing astigmatism. By not allowing the corresponding value of Conditional Expression (7) to be equal to or greater than the upper limit thereof, there is an advantage in achieving reduction in size of the rear group GR. In order to obtain more favorable characteristics, it is more preferable that the imaging lens satisfies Conditional Expression (7-1), and it is yet more preferable that the imaging lens satisfies Conditional Expression (7-2).

$$1.95 < Dexp/Bf < 7.2 \tag{7}$$

$$2.47 < Dexp/Bf < 6.1 \tag{7-1}$$

$$3.5 < Dexp/Bf < 4.96 \tag{7-2}$$

Assuming that a focal length of the Lp lens Lp is fp, it is preferable that the imaging lens satisfies Conditional Expression (8). Assuming that the medium on the object side and the image side of the Lp lens Lp is air, fp is calculated. By not allowing the corresponding value of Conditional Expression (8) to be equal to or less than the lower limit thereof, the effect of correcting chromatic aberration of the Lp lens Lp can be enhanced. By not allowing the corresponding value of Conditional Expression (8) to be equal to or greater than the upper limit thereof, it is possible to suppress fluctuation in aberrations assuming that a refractive index of the Lp lens Lp fluctuates due to changes in the environment such as temperature. In order to obtain more favorable characteristics, it is more preferable that the imaging lens satisfies Conditional Expression (8-1), and it is yet more preferable that the imaging lens satisfies Conditional Expression (8-2).

$$0.1 < TL/fp < 1.2 \tag{8}$$

$$0.15 < TL/fp < 0.95 \tag{8-1}$$

$$0.25 < TL/fp < 0.61 \tag{8-2}$$

It is preferable that the imaging lens satisfies Conditional Expression (9). Here, it is assumed that a height from the optical axis Z of a principal ray $3p$ at a maximum half angle of view $\omega m$ on the object side surface of the Lp lens Lp in a state in which the infinite distance object is in focus is Hpp. Further, it is assumed that a height from the optical axis Z of an on-axis marginal ray $2m$ on the object side surface of the Lp lens Lp in a state in which the infinite distance object is in focus is Hpm. For example, FIG. 4 shows the height Hpp and the height Hpm in the imaging lens of FIG. 1. In FIG. 4, a part ranging from the lens L24 corresponding to the Lp lens Lp to the image plane Sim is enlarged and shown together with each ray. By not allowing the corresponding value of Conditional Expression (9) to be equal to or less than the lower limit thereof, there is an advantage in correcting lateral chromatic aberration. By not allowing the corresponding value of Conditional Expression (9) to be equal to or greater than the upper limit thereof, there is an advantage in correcting longitudinal chromatic aberration. In order to obtain more favorable characteristics, it is more preferable that the imaging lens satisfies Conditional Expression (9-1), and it is yet more preferable that the imaging lens satisfies Conditional Expression (9-2).

$$0.2 < Hpp/Hpm < 1.1 \tag{9}$$

$$0.31 < Hpp/Hpm < 0.9 \tag{9-1}$$

$$0.5 < Hpp/Hpm < 0.72 \tag{9-2}$$

It is preferable that the imaging lens satisfies Conditional Expression (10). By not allowing the corresponding value of Conditional Expression (10) to be equal to or less than the lower limit thereof, there is an advantage in correcting lateral chromatic aberration. By not allowing the corresponding value of Conditional Expression (10) to be equal to or greater than the upper limit thereof, there is an advantage in achieving reduction in size. In order to obtain more favorable characteristics, it is more preferable that the imaging lens satisfies Conditional Expression (10-1), and it is yet more preferable that the imaging lens satisfies Conditional Expression (10-2).

$$-0.9 < (De-Rr)/(De+Rr) < 0.9 \tag{10}$$

$$-0.7 < (De-Rr)/(De+Rr) < 0.5 \tag{10-1}$$

$$-0.56 < (De-Rr)/(De+Rr) < 0.16 \tag{10-2}$$

It is preferable that the imaging lens satisfies Conditional Expression (11). By not allowing the corresponding value of Conditional Expression (11) to be equal to or less than the lower limit thereof, there is an advantage in correcting lateral chromatic aberration. By not allowing the corresponding value of Conditional Expression (11) to be equal to or greater than the upper limit thereof, there is an advantage in suppressing the difference in spherical aberration for each color. In order to obtain more favorable characteristics, it is more preferable that the imaging lens satisfies Conditional Expression (11-1), and it is yet more preferable that the imaging lens satisfies Conditional Expression (11-2).

$$0.005 < (Rf-Rr)/(Rf+Rr) < 0.45 \tag{11}$$

$$0.01 < (Rf-Rr)/(Rf+Rr) < 0.25 \tag{11-1}$$

$$0.03 < (Rf-Rr)/(Rf+Rr) < 0.17 \tag{11-2}$$

Assuming that assuming that a focal length of the focus group moving along the optical axis Z during focusing is ffoc, it is preferable that the imaging lens satisfies Conditional Expression (12). By not allowing the corresponding value of Conditional Expression (12) to be equal to or less than the lower limit thereof, there is an advantage in suppressing fluctuation in chromatic aberration during focusing. By not allowing the corresponding value of Conditional Expression (12) to be equal to or greater than the upper limit thereof, it is possible to suppress fluctuation in aberrations in a case where the refractive index of the Lp lens Lp fluctuates due to changes in the environment such as temperature. In order to obtain more favorable characteristics, it is more preferable that the imaging lens satisfies Conditional Expression (12-1), and it is yet more preferable that the imaging lens satisfies Conditional Expression (12-2).

$$0.04 < ffoc/fp < 0.36 \tag{12}$$

$$0.065 < ffoc/fp < 0.28 \tag{12-1}$$

$$0.094 < ffoc/fp < 0.22 \tag{12-2}$$

It is preferable that the Lp lens Lp satisfies Conditional Expression (13). By not allowing the corresponding value of Conditional Expression (13) to be equal to or less than the lower limit thereof, it is possible to suppress excessive correction of chromatic aberration. By not allowing the corresponding value of Conditional Expression (13) to be equal to or greater than the upper limit thereof, there is an advantage in correcting chromatic aberration. In order to obtain more favorable characteristics, it is more preferable that the Lp lens Lp satisfies Conditional Expression (13-1), and it is yet more preferable that the Lp lens Lp satisfies Conditional Expression (13-2).

$$14 < \nu p < 28 \tag{13}$$

$$17 < \nu p < 26 \tag{13-1}$$

$$19.3 < \nu p < 22.3 \tag{13-2}$$

Assuming that a partial dispersion ratio of the Lp lens between a g line and an F line Lp is $\theta gFp$, it is preferable that the Lp lens Lp satisfies Conditional Expression (14). By not allowing the corresponding value of Conditional Expression (14) to be equal to or less than the lower limit thereof, it is easy to correct secondary chromatic aberration. By not allowing the corresponding value of Conditional Expression (14) to be equal to or greater than the upper limit thereof, it is possible to suppress excessive correction of secondary chromatic aberration. In order to obtain more favorable characteristics, it is more preferable that the Lp lens Lp satisfies Conditional Expression (14-1), and it is yet more preferable that the Lp lens Lp satisfies Conditional Expression (14-2).

$$0.67 < \theta gFp < 1.1 \tag{14}$$

$$0.72 < \theta gFp < 0.95 \tag{14-1}$$

$$0.76 < \theta gFp < 0.88 \tag{14-2}$$

Assuming that a refractive indexes for the g line, F line, and C line of a certain lens are Ng, NF, and NC, respectively, and the partial dispersion ratios thereof between the g line and F line of the lens is $\theta gF$, $\theta gF$ is defined by the following expression.

$$\theta gF = (Ng - NF)/(NF - NC)$$

It is preferable that the Lp lens Lp satisfies Conditional Expression (15). By not allowing the corresponding value of Conditional Expression (15) to be equal to or less than the lower limit thereof, there is an advantage in suppressing field curvature. By not allowing the corresponding value of Conditional Expression (15) to be equal to or greater than the upper limit, the availability of the material is increased, and there is an advantage in achieving reduction in costs. In order to obtain more favorable characteristics, it is more preferable that the Lp lens Lp satisfies Conditional Expression (15-1), and it is yet more preferable that the Lp lens Lp satisfies Conditional Expression (15-2).

$$1.51 < Np < 1.72 \tag{15}$$

$$1.55 < Np < 1.67 \tag{15-1}$$

$$1.58 < Np < 1.63 \tag{15-2}$$

Assuming that, in a state in which the infinite distance object is in focus, a sum of the air-equivalent distance on the optical axis from the lens surface closest to the image side in the rear group GR to the image plane Sim and a distance on the optical axis from the object side surface of the Lp lens Lp to the lens surface closest to the image side in the rear group GR is Dpi, it is preferable that the imaging lens satisfies Conditional Expression (16). By not allowing the corresponding value of Conditional Expression (16) to be equal to or less than the lower limit thereof, there is an advantage in correcting lateral chromatic aberration. By not allowing the corresponding value of Conditional Expression (16) to be equal to or greater than the upper limit thereof, there is an advantage in correcting longitudinal chromatic aberration. In order to obtain more favorable characteristics, it is more preferable that the imaging lens satisfies Conditional Expression (16-1), and it is yet more preferable that the imaging lens satisfies Conditional Expression (16-2).

$$0.8 < Dexp/Dpi < 2.4 \tag{16}$$

$$1 < Dexp/Dpi < 2 \tag{16-1}$$

$$1.21 < Dexp/Dpi < 1.79 \tag{16-2}$$

It is preferable that the imaging lens satisfies Conditional Expression (17). By not allowing the corresponding value of Conditional Expression (17) to be equal to or less than the lower limit thereof, there is an advantage in achieving reduction in size of the Lp lens Lp. By not allowing the corresponding value of Conditional Expression (17) to be equal to or greater than the upper limit thereof, there is an advantage in correcting lateral chromatic aberration. In order to obtain more favorable characteristics, it is more preferable that the imaging lens satisfies Conditional Expression (17-1), and it is yet more preferable that the imaging lens satisfies Conditional Expression (17-2).

$$1.9 < Dpi/Hpm < 5.9 \tag{17}$$

$$2.1 < Dpi/Hpm < 5.1 \tag{17-1}$$

$$2.33 < Dpi/Hpm < 4.7 \tag{17-2}$$

It is preferable that the imaging lens satisfies Conditional Expression (18). By satisfying Conditional Expression (18), the same effect as in the case where Conditional Expression (3) is satisfied can be obtained. By not allowing the corresponding value of Conditional Expression (18) to be equal to or less than the lower limit thereof, it is easy to make the off-axis principal ray passing through the Lp lens Lp substantially perpendicular to the object side surface of the Lp lens Lp. Thereby, the difference in optical path length between the off-axis principal ray and the on-axis ray increases. Therefore, it is possible to make a difference in the effect of correcting chromatic aberration between the off-axis ray and the on-axis ray, and it is possible to effectively correct lateral chromatic aberration. By not allowing the corresponding value of Conditional Expression (18) to be equal to or greater than the upper limit thereof, it is possible to suppress that the off-axis principal ray passing through the Lp lens Lp is incident onto the object side surface of the Lp lens Lp at an angle in the convergence direction. As a result, there is an advantage in achieving the optical system closer to the object side than the Lp lens Lp. In order to obtain more favorable characteristics, it is more preferable that the imaging lens satisfies Conditional Expression (18-1), and it is yet more preferable that the imaging lens satisfies Conditional Expression (18-2).

$$-2.5 < (f \times \tan \omega m) \times (1/De - 1/Rr) < 1 \tag{18}$$

$$-1.5 < (f \times \tan \omega m) \times (1/De - 1/Rr) < 0.5 \tag{18-1}$$

$$-1.07 < (f \times \tan \omega m) \times (1/De - 1/Rr) < 0.12 \tag{18-2}$$

It is preferable that the imaging lens satisfies Conditional Expression (19). The unit of ωm is degree. By not allowing the corresponding value of Conditional Expression (19) to be equal to or less than the lower limit thereof, the effect of correcting lateral chromatic aberration of the Lp lens Lp can be obtained more remarkably. By not allowing the corresponding value of Conditional Expression (19) to be equal to or greater than the upper limit, the effect of correcting the longitudinal chromatic aberration of the Lp lens Lp can be obtained more remarkably. In order to obtain more favorable characteristics, it is more preferable that the imaging lens satisfies Conditional Expression (19-1), and it is yet more preferable that the imaging lens satisfies Conditional Expression (19-2).

$$15 < \omega m < 60 \tag{19}$$

$$25 < \omega m < 50 \tag{19-1}$$

$$35 < \omega m < 41 \tag{19-2}$$

It is preferable that the imaging lens satisfies Conditional Expression (20). By not allowing the corresponding value of Conditional Expression (20) to be equal to or less than the lower limit thereof, there is an advantage in achieving reduction in size in the outer diameter direction. By not allowing the corresponding value of Conditional Expression (20) to be equal to or greater than the upper limit, the effect of correcting the longitudinal chromatic aberration of the Lp lens Lp can be obtained more remarkably. In order to obtain more favorable characteristics, it is more preferable that the imaging lens satisfies Conditional Expression (20-1), and it is yet more preferable that the imaging lens satisfies Conditional Expression (20-2).

$$0.9 < FNo < 4 \tag{20}$$

$$1.1 < FNo < 2.8 \tag{20-1}$$

$$1.3 < FNo < 1.5 \tag{20-2}$$

It is preferable that the focus group moving along the optical axis Z during focusing includes the Lp lens Lp. In such a case, there is an advantage in achieving reduction in size and weight of the focus group.

The Lp lens Lp may be configured to have either one of the object side surface or the image side surface being in contact with air and the other is cemented to a lens. In such a case, since the refractive power of the Lp lens Lp at one of the air contact surfaces is increased, there is an advantage in correcting spherical aberration.

Alternatively, the Lp lens Lp may be configured to have both the object side surface and the image side surface cemented to lenses. In such a case, there is an advantage in suppressing occurrence of various aberrations caused by a shape error of the Lp lens Lp.

The Lp lens Lp may be cemented to a positive lens or a negative lens. The cemented lens including the Lp lens Lp may be a cemented lens consisting of two lenses or a cemented lens consisting of three lenses.

The Lp lens Lp may be configured to have either one of the object side surface or the image side surface having an aspherical shape. In such a case, there is an advantage in correcting astigmatism. The Lp lens Lp may be configured such that both the object side surface and the image side surface have aspherical shapes. In such a case, astigmatism correction is more advantageous.

The imaging lens may be configured to include only one Lp lens Lp. By limiting the number of resin lenses whose optical characteristics are likely to change depending on the environment to only one lens, it is possible to suppress change in the performance of the optical system due to the environment.

In the example of FIG. 1, the front group GF consists of one lens group and the rear group GR consists of two lens groups. However, the number of lens groups constituting the front group GF and the number of the lens groups constituting the rear group GR may be different from the numbers thereof in the example in FIG. 1. Further, the technique of the present disclosure can also be applied to a variable magnification optical system. In a case where the technique of the present disclosure is applied to a variable magnification optical system, a value at the wide angle end is used as the corresponding value of each conditional expression.

The above-mentioned preferred configurations and available configurations may be optional combinations, and it is preferable to selectively adopt the configurations in accordance with required specification. It should be noted that Conditional Expressions that the imaging lens according to the embodiment of the present disclosure preferably satisfies are not limited to Conditional Expressions described in the form of Expression, and the lower limit and the upper limit are selected from the preferable, more preferable, yet more preferable, and most preferable conditional expressions. Conditional Expressions may include all conditional expressions obtained through optional combinations. Further, the imaging lens according to the embodiment of the present disclosure can be variously modified without departing from the scope of the technique of the present disclosure.

For example, the imaging lens according to a preferred aspect of the present disclosure consists of, in order from the object side to the image side, a front group GF, an aperture stop St, and a rear group GR. The rear group GR includes at least one Lp lens Lp which is made of a resin, has a positive refractive power, and is cemented to a lens. With such a configuration, Conditional Expressions (1), (2), (3), and (4) are satisfied.

Next, examples of the imaging lens according to the embodiment of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, some description is not repeated herein. The imaging lens of Example 1 consists of, in order from the object side to the image side, a first lens group G1 that has a positive refractive power, an aperture stop St, a second lens group G2 that has a positive refractive power, and a third lens group G3 that has a positive refractive power. The front group GF consists of a first lens group G1. The rear group GR consists of a second lens group G2 and a third lens group G3. During focusing from the infinite distance object to the close object, the first lens group G1 and the third lens group G3 remain stationary with respect to the image plane Sim, and the second lens group G2 moves toward the object side.

A lens component of the second lens group G2, which is third from the object side, includes the Lp lens Lp. The lens component is a cemented lens formed by cementing a positive lens, the Lp lens Lp, and a negative lens, in order from the object side. In addition, in the present specification, the term "one lens component" means one cemented lens or one single lens. The "single lens" is one lens that is not cemented.

Regarding the imaging lens of Example 1, Table 1 shows basic lens data, Table 2 shows specifications and variable surface spacings, and Table 3 shows aspherical coefficients thereof. The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of νd shows an Abbe number of each constituent element based on the d line. The column of the lens corresponding to the Lp lens Lp in the column of θgF shows the partial dispersion ratio between the g line and the F line of the lens. The twenty third and twenty fourth surfaces of Table 1 correspond to the Lp lens Lp.

In the table of basic lens data, the sign of the curvature radius of the convex surface facing toward the object side is positive and the sign of the curvature radius of the convex surface facing toward the image side is negative. In a cell of a surface number of a surface corresponding to the aperture stop St, the surface number and a term of (St) are noted. A value at the bottom cell of the column of surface spacing in the table indicates a spacing between the image plane Sim and the surface closest to the image side in the table. The symbol DD[ ] during focusing is used for each variable surface spacing during zooming, and the object side surface number of the spacing is given in [ ] and is noted in the column of surface spacing.

Table 2 shows the focal length, the open F number, the maximum total angle of view, and the variable surface spacing based on the d line. [°] in the column of the maximum total angle of view indicates the unit is degrees. In Table 2, the column of "Infinity" shows values in a state in which the infinite distance object is in focus, and the column of "Close" shows values in a state in which the close object is in focus. Further, a place immediately below the text "Close" indicates the distance from the lens surface closest to the object side to the closest object. In Example 1, the distance from the lens surface closest to the object side to the close object is 98.4 mm (millimeters).

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, in the first surface of Example 1, m=3, 4, 5, . . . , and 16. The "E±n" (n: an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1 \pm (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

| | | Example 1 | | | |
|---|---|---|---|---|---|
| Sn | R | D | Nd | νd | θgF |
| *1 | 108.5565 | 2.1369 | 1.51633 | 64.06 | |
| *2 | 17.6883 | 3.4748 | | | |

TABLE 1-continued

| | | Example 1 | | | |
|---|---|---|---|---|---|
| Sn | R | D | Nd | νd | θgF |
| 3 | 26.2749 | 2.9240 | 1.95001 | 17.50 | |
| 4 | 32.6444 | 5.5326 | | | |
| 5 | −57.8559 | 1.2149 | 1.43875 | 94.66 | |
| 6 | 51.4155 | 5.3290 | | | |
| 7 | −22.7114 | 1.0474 | 1.49624 | 81.72 | |
| 8 | −233.3478 | 0.1000 | | | |
| 9 | 33.6233 | 7.5723 | 1.83444 | 44.56 | |
| 10 | −23.3586 | 0.9886 | 1.68766 | 30.88 | |
| 11 | 703.8290 | 2.0659 | | | |
| *12 | −179.3640 | 2.4178 | 1.80625 | 40.91 | |
| *13 | −49.5591 | 0.2763 | | | |
| 14 | −30.5958 | 1.4163 | 1.60710 | 37.29 | |
| 15 | 23.6657 | 5.7460 | 1.77910 | 50.09 | |
| 16 | −55.4628 | 2.6315 | | | |
| 17(St) | ∞ | DD[17] | | | |
| 18 | 591.0712 | 1.5113 | 1.95000 | 17.50 | |
| 19 | −120.9951 | 0.7092 | | | |
| 20 | −55.7458 | 0.9672 | 1.84905 | 25.11 | |
| 21 | 80.9020 | 0.1000 | | | |
| 22 | 24.7562 | 7.2901 | 1.47324 | 87.71 | |
| 23 | −28.1453 | 0.8000 | 1.60166 | 21.20 | 0.80149 |
| 24 | −22.2181 | 1.0064 | 1.85478 | 24.80 | |
| 25 | −43.7027 | 1.6534 | | | |
| 26 | 23.7247 | 4.4746 | 1.82750 | 44.90 | |
| 27 | 275.2523 | 1.3850 | | | |
| 28 | 24.3566 | 0.9250 | 1.51742 | 52.43 | |
| 29 | 17.9316 | 4.7353 | | | |
| *30 | −610834.2445 | 1.2845 | 1.80625 | 40.91 | |
| *31 | 123.7285 | DD[31] | | | |
| 32 | 205.4054 | 1.2750 | 1.91136 | 36.86 | |
| 33 | −153289.9088 | 11.0266 | | | |
| 34 | ∞ | 2.8500 | 1.51680 | 64.20 | |
| 35 | ∞ | 1.1000 | | | |

TABLE 2

| | Example 1 | |
|---|---|---|
| | Infinity | Close 98.4 mm |
| Focal length | 18.37 | 18.48 |
| Open F number | 1.44 | 1.54 |
| Maximum total angle of view [°] | 75.0 | 71.6 |
| DD[17] | 7.3430 | 4.0015 |
| DD[31] | 2.6549 | 5.9964 |

TABLE 3

| | Example 1 | | |
|---|---|---|---|
| Sn | 1 | 2 | 12 |
| KA | 4.9999951373E+00 | 4.4576106190E−01 | 4.9999971968E+00 |
| A3 | 0.0000000000E+00 | 0.0000000000E+00 | 0.0000000000E+00 |
| A4 | 1.0227463698E−04 | 1.1431990660E−04 | −8.7395071314E−05 |
| A5 | −9.0930920035E−06 | −1.6415686116E−05 | 1.0624109351E−06 |
| A6 | 1.2323656963E−06 | 5.5904076343E−06 | −9.2123410539E−07 |
| A7 | −3.4481842489E−07 | −1.6052919742E−06 | 1.2400218919E−07 |
| A8 | 4.7872678934E−08 | 2.4529987188E−07 | −5.7234610832E−09 |
| A9 | −2.9651115932E−09 | −1.8851653802E−08 | −1.9711691347E−09 |
| A10 | 3.9472616975E−11 | 2.0891480788E−10 | 2.7816783703E−10 |
| A11 | 3.5482363039E−12 | 9.7607051982E−11 | −3.1587518477E−12 |
| A12 | 5.0467123801E−14 | −9.0804167579E−12 | −1.6304064600E−12 |
| A13 | −2.5516602720E−14 | 3.1016960398E−13 | 1.2158347601E−13 |
| A14 | 1.4250573766E−15 | 1.4117737281E−15 | −5.0762358341E−15 |
| A15 | −3.4175382509E−17 | −3.7665813839E−16 | 2.2677426378E−16 |
| A16 | 3.1782538989E−19 | 7.2705688604E−18 | −5.5081755430E−18 |

TABLE 3-continued

| | Example 1 | | |
|---|---|---|---|
| Sn | 13 | 30 | 31 |
| KA | −3.2732191741E+00 | 5.0000000000E+00 | −4.9999994369E+00 |
| A3 | 0.0000000000E+00 | 0.0000000000E+00 | 0.0000000000E+00 |
| A4 | −6.7121689007E−05 | −9.0440172248E−05 | −2.9418359131E−05 |
| A5 | −4.7700724966E−07 | −2.4614187371E−05 | −2.9208511289E−05 |
| A6 | −3.0938148177E−07 | 5.1214487295E−06 | 6.5538155779E−06 |
| A7 | 5.0938119398E−08 | −1.8041464040E−07 | −4.8840956974E−07 |
| A8 | −3.8292900537E−09 | −1.1762911586E−07 | −2.1328515272E−08 |
| A9 | −1.8320332035E−09 | 3.3076818900E−08 | 7.3388787016E−09 |
| A10 | 3.5191960748E−10 | −4.4525550526E−09 | −1.5498491131E−10 |
| A11 | −1.0403822251E−11 | 3.2734066671E−10 | −5.3476126706E−11 |
| A12 | −1.6563067031E−12 | −2.5617796711E−12 | 1.7432783887E−12 |
| A13 | 4.3727498519E−15 | −2.3497798090E−12 | 4.5980370009E−13 |
| A14 | 2.1072867464E−14 | 2.5325972412E−13 | −5.0347651363E−14 |
| A15 | −1.5312701836E−15 | −1.1605417626E−14 | 2.1778475546E−15 |
| A16 | 3.3506646602E−17 | 2.0651300834E−16 | −3.7475870284E−17 |

Figure 5:
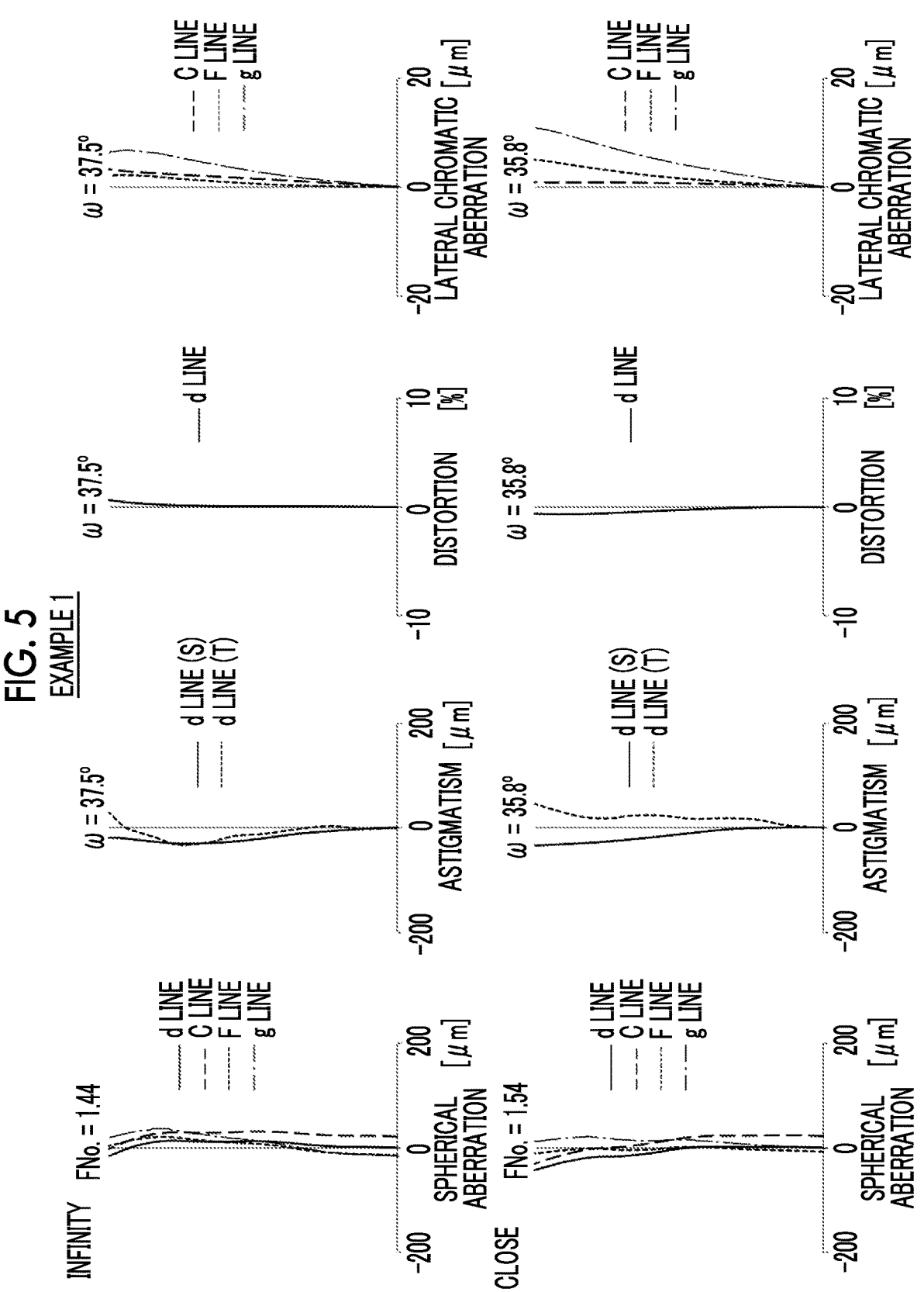
FIG. 5 is a diagram showing aberrations of the imaging lens of Example 1.

FIG. 5 shows a diagram showing aberrations of the imaging lens of Example 1. FIG. 5 shows, in order from the left, spherical aberration, astigmatism, distortion, and lateral chromatic aberration. In FIG. 5, the upper part labeled "Infinity" shows aberration diagrams in a state in which the infinite distance object is in focus, and the lower part labeled "Close" shows aberration diagrams in the state in which the close object is in focus. The distance from the lens surface closest to the object side in the data of each aberration diagram to the close object is the same as a value shown in the table of specifications. In the spherical aberration diagram, aberrations at the d line, the C line, the F line, and the g line are indicated by the solid line, the long broken line, the short broken line, and the chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, the F line, and the g line are respectively indicated by the long broken line, the short broken line, and the chain line. In the spherical aberration diagram, the value of the open F number is shown after "FNo.=". In other aberration diagrams, a value of the maximum half angle of view is shown after "ω=".

Symbols, meanings, description methods, and illustration methods of the respective data pieces according to Example 1 are basically similar to those in the following examples unless otherwise specified. Therefore, in the following description, repeated description will not be given. Further, in the following description of the examples, as described above, a constituent part of the imaging lens divided by the air spacing that changes during focusing is referred to as a "lens group".

Example 2

Figure 6:
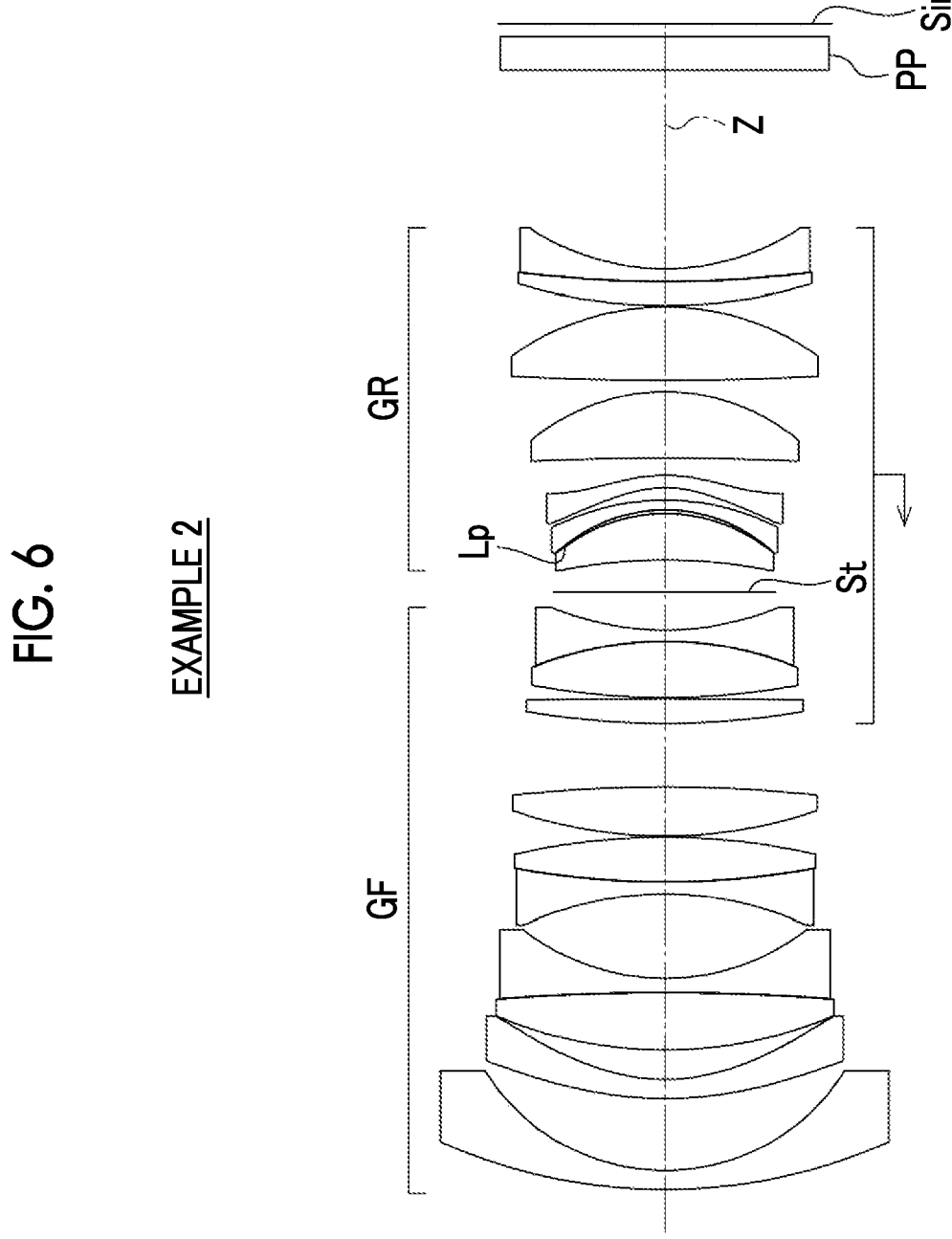
FIG. 6 is a cross-sectional view showing a configuration of an imaging lens of Example 2.

FIG. 6 is a cross-sectional view of a configuration of the imaging lens of Example 2. The imaging lens of Example 2 consists of a first lens group that has a positive refractive power and a second lens group that has a positive refractive power, in order from the object side to the image side. The second lens group includes an aperture stop St. The front group GF consists of the first lens group and a part of the second lens group on the object side. The rear group GR consists of the other part of the second lens group. During focusing from the infinite distance object to the close object, the first lens group remains stationary with respect to the image plane Sim, and the second lens group moves toward the object side.

A lens component of the second lens group, which is third from the object side, includes the Lp lens Lp. The lens component is a cemented lens formed by cementing a positive lens, the Lp lens Lp, and a negative lens, in order from the object side.

Figure 7:
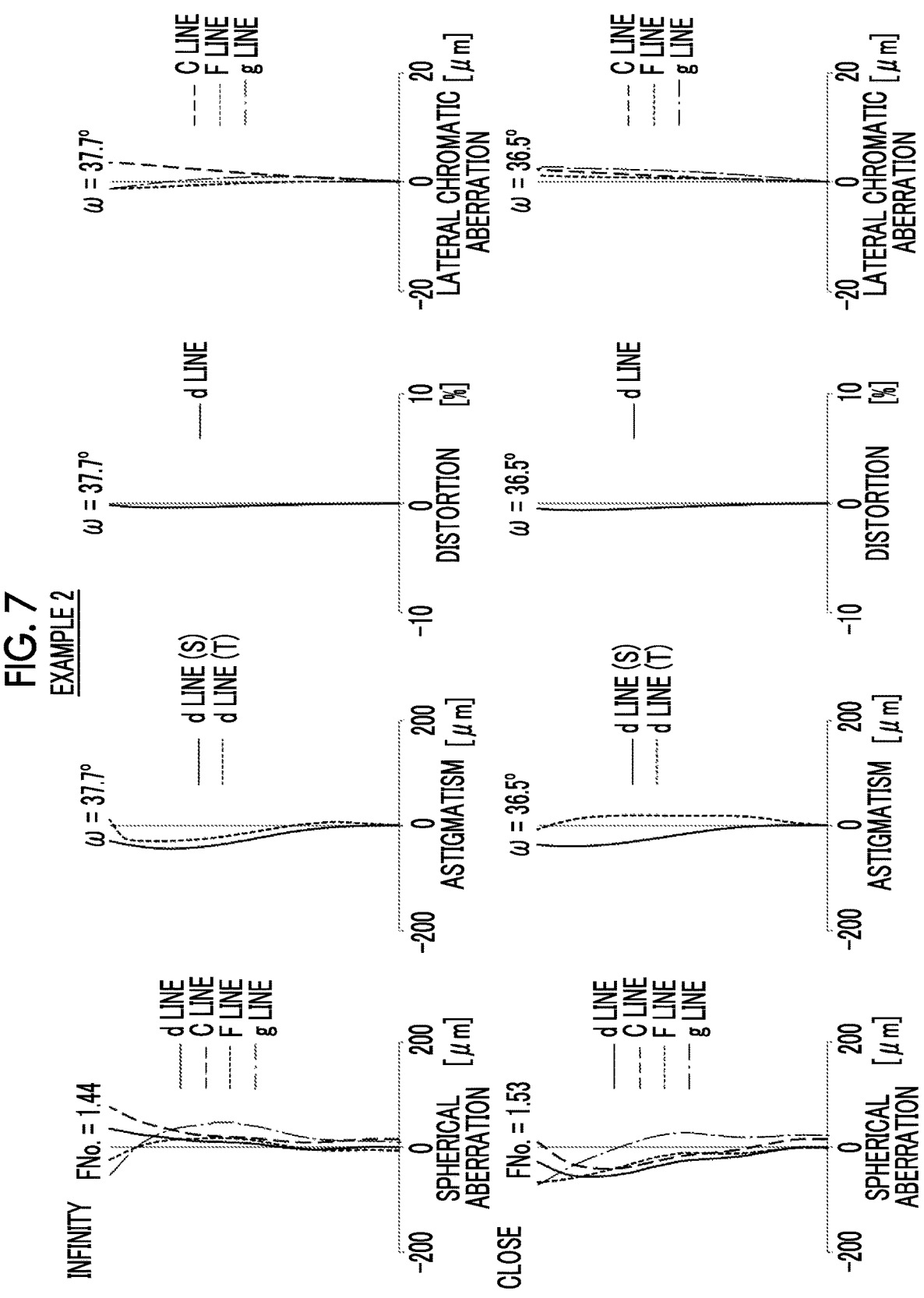
FIG. 7 is a diagram showing aberrations of the imaging lens of Example 2.

Regarding the imaging lens of Example 2, Table 4 shows basic lens data, Table 5 shows specifications and variable surface spacings, and Table 6 shows aspherical coefficients thereof. FIG. 7 shows aberration diagrams. The twentieth and twenty first surfaces of Table 4 correspond to the Lp lens Lp.

TABLE 4

| | Example 2 | | | | |
|---|---|---|---|---|---|
| Sn | R | D | Nd | νd | θgF |
| 1 | 47.0409 | 1.6198 | 1.72437 | 32.74 | |
| 2 | 18.0880 | 6.1564 | | | |
| *3 | 32.0642 | 1.6364 | 1.51633 | 64.06 | |
| *4 | 17.0016 | 2.5118 | | | |
| 5 | 37.1110 | 4.8902 | 1.99999 | 24.29 | |
| 6 | −187.2867 | 1.2153 | 1.49636 | 55.68 | |
| 7 | 19.7134 | 7.1282 | | | |
| 8 | −29.1011 | 1.0455 | 1.72615 | 28.69 | |
| 9 | 70.5466 | 3.8164 | 1.84685 | 43.31 | |
| 10 | −57.4948 | 0.1000 | | | |
| 11 | 40.0149 | 4.1891 | 1.91069 | 36.93 | |
| 12 | −119.6176 | DD[12] | | | |
| 13 | 68.6021 | 2.1064 | 1.57813 | 67.98 | |
| 14 | −643.2887 | 0.1000 | | | |
| 15 | 61.5413 | 4.8191 | 1.77406 | 50.59 | |
| 16 | −29.5899 | 0.9585 | 1.59630 | 38.37 | |
| 17 | 25.0717 | 3.2696 | | | |
| 18(St) | ∞ | 2.7092 | | | |
| 19 | −46.1972 | 3.9542 | 1.44363 | 88.67 | |
| 20 | −14.4732 | 0.3186 | 1.60166 | 21.20 | 0.80149 |
| 21 | −13.5794 | 0.8295 | 1.83863 | 23.78 | |
| 22 | −21.1153 | 1.0579 | | | |
| *23 | −10.1069 | 1.0789 | 1.80625 | 40.91 | |
| *24 | −12.6567 | 1.4448 | | | |
| 25 | −253.8661 | 5.6759 | 1.49952 | 80.07 | |
| 26 | −17.6687 | 0.9957 | | | |
| 27 | 262.6470 | 6.2484 | 1.49903 | 80.15 | |
| 28 | −22.5709 | 0.1000 | | | |
| 29 | 43.8677 | 2.0043 | 1.98599 | 16.05 | |
| 30 | 97.9060 | 1.0770 | 1.77836 | 26.08 | |
| 31 | 20.8971 | DD[31] | | | |
| 32 | ∞ | 2.8500 | 1.51680 | 64.20 | |
| 33 | ∞ | 1.1000 | | | |

TABLE 5

| Example 2 | | |
|---|---|---|
| | Infinity | Close 97 mm |
| Focal length | 18.37 | 18.17 |
| Open F number | 1.44 | 1.53 |
| Maximum total angle of view [°] | 75.5 | 73.0 |
| DD[12] | 5.4137 | 2.5007 |
| DD[31] | 16.9633 | 19.8763 |

TABLE 6

| Example 2 | | |
|---|---|---|
| Sn | 3 | 4 |
| KA | −4.9999008173E+00 | −4.8974637988E+00 |
| A3 | 0.0000000000E+00 | 0.0000000000E+00 |
| A4 | −4.0608165510E−06 | 9.7485050749E−05 |
| A5 | 6.2169965730E−06 | 8.1738115466E−06 |
| A6 | −9.9618050757E−07 | −2.6077492684E−06 |
| A7 | 5.3267109152E−08 | 1.3180987221E−07 |
| A8 | 1.4705041437E−09 | 1.0512534430E−08 |
| A9 | −1.0338241944E−10 | −1.0789026732E−09 |
| A10 | −1.9368549852E−11 | −3.5433606561E−11 |
| A11 | 2.4893631065E−13 | 6.6765893864E−12 |
| A12 | 2.0957369996E−13 | −1.8768401986E−13 |
| A13 | −1.4534042463E−14 | 5.1398733650E−15 |
| A14 | 2.2151926667E−16 | −9.8195611008E−16 |
| A15 | 7.0216752692E−18 | 5.3602960493E−17 |
| A16 | −1.8820658343E−19 | −8.6048000221E−19 |

| Sn | 23 | 24 |
|---|---|---|
| KA | 1.1733284499E−01 | 8.3931855950E−01 |
| A3 | 0.0000000000E+00 | 0.0000000000E+00 |
| A4 | 2.5733197417E−04 | 3.3275945102E−04 |
| A5 | −1.4018753665E−05 | −1.3904273044E−05 |
| A6 | 5.1384764142E−06 | 5.2339077802E−06 |
| A7 | −1.3266163176E−07 | −3.2084844785E−07 |
| A8 | −1.0990916404E−07 | −1.8806580412E−08 |
| A9 | 1.1655982046E−08 | −3.8532328240E−09 |
| A10 | −1.2938358073E−09 | 1.9225941923E−10 |
| A11 | 1.7728177578E−10 | 1.5406908911E−10 |
| A12 | 3.0022611519E−12 | −1.9234602567E−11 |
| A13 | −3.5758603120E−12 | 4.0295713343E−13 |
| A14 | 3.9625100606E−13 | 6.5780465765E−14 |
| A15 | −1.9079120003E−14 | −4.9505088195E−15 |
| A16 | 3.6231473498E−16 | 1.0950210735E−16 |

Example 3

Figure 8:
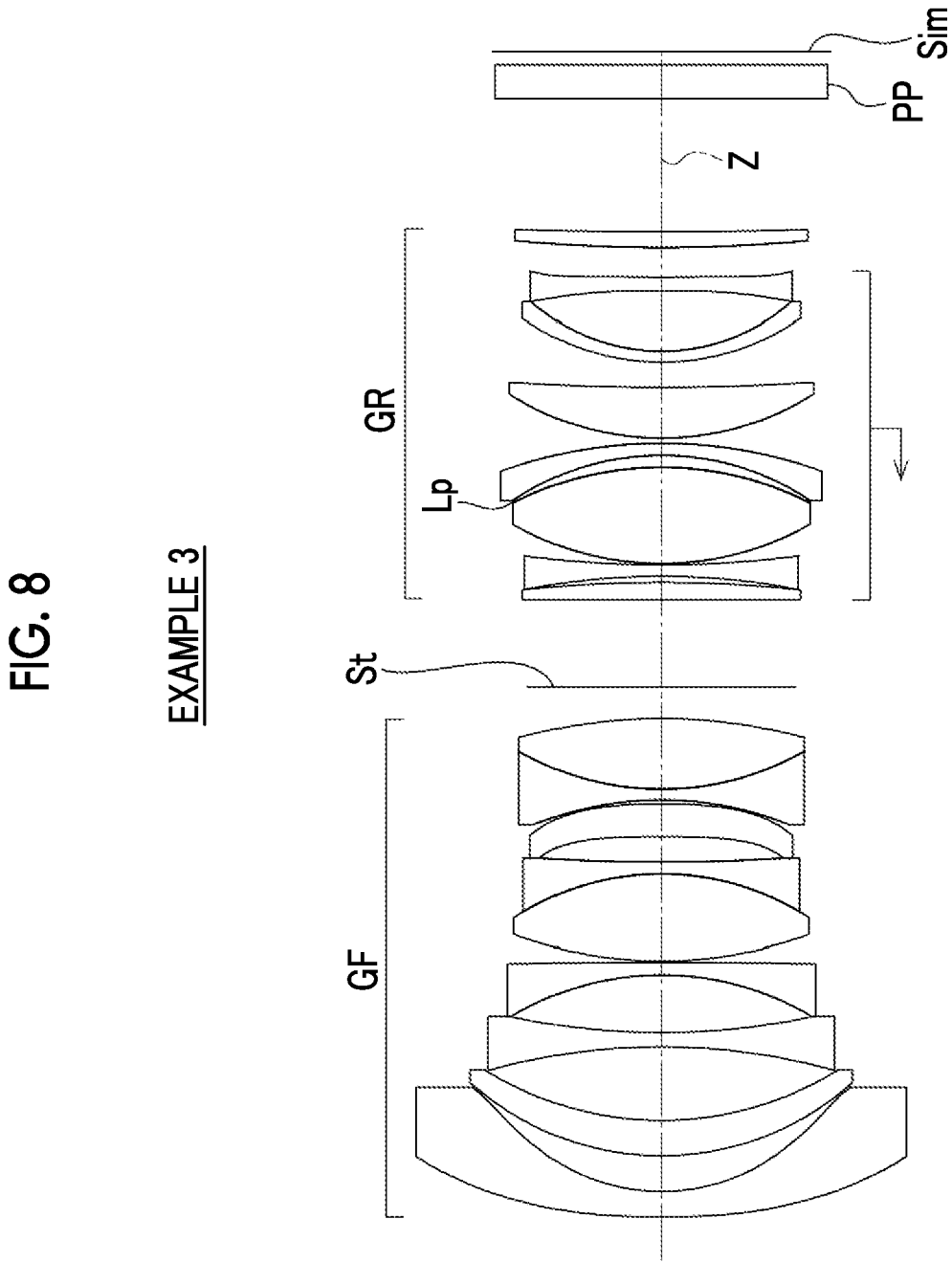
FIG. 8 is a cross-sectional view showing a configuration of an imaging lens of Example 3.

FIG. 8 is a cross-sectional view of a configuration of the imaging lens of Example 3. The imaging lens of Example 3 consists of, in order from the object side to the image side, a first lens group that has a positive refractive power, an aperture stop St, a second lens group that has a positive refractive power, and a third lens group that has a positive refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is third from the object side, includes the Lp lens Lp. The lens component is a cemented lens formed by cementing a positive lens, the Lp lens Lp, and a negative lens, in order from the object side.

Figure 9:
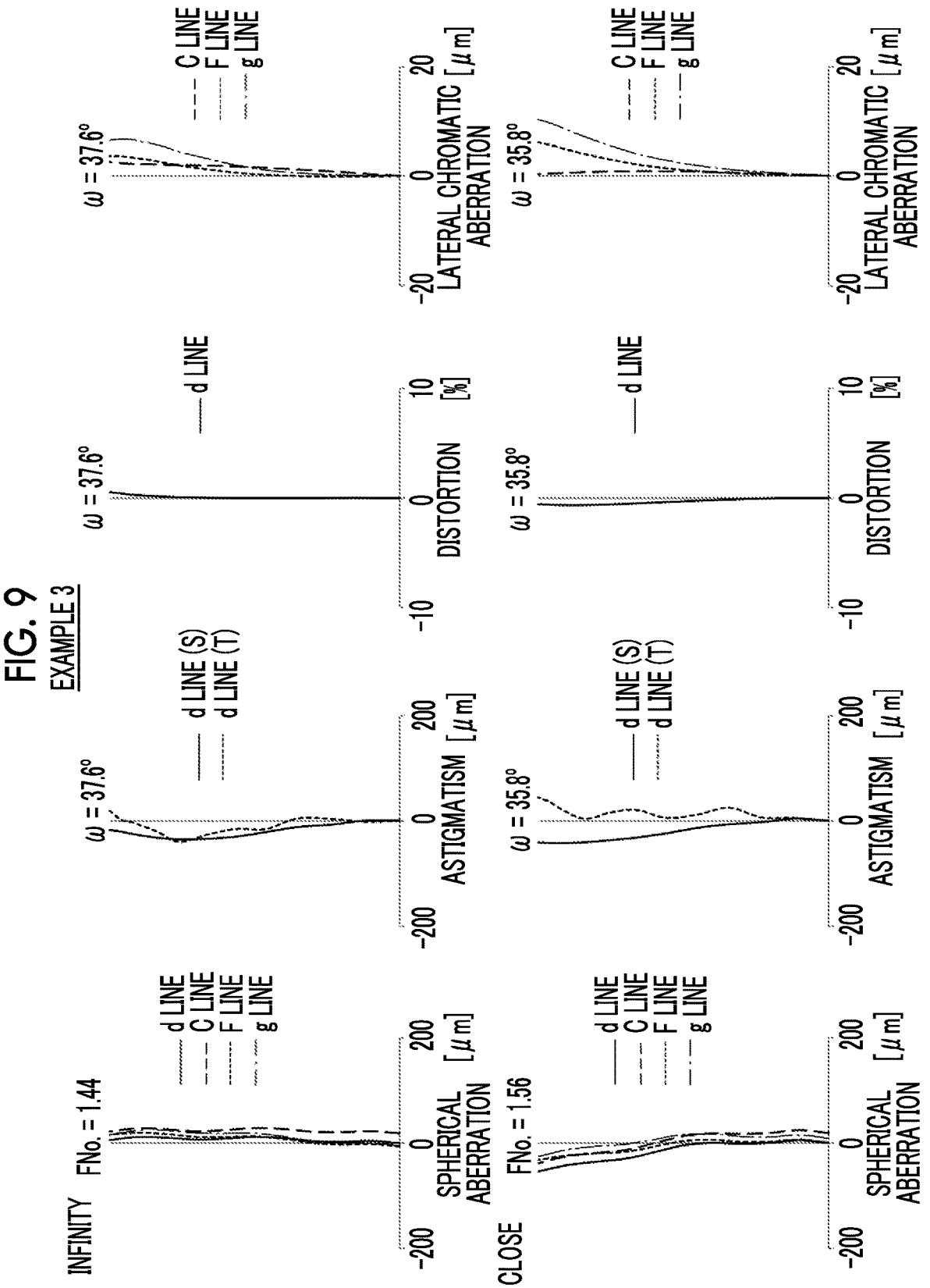
FIG. 9 is a diagram showing aberrations of the imaging lens of Example 3.

Regarding the imaging lens of Example 3, Table 7 shows basic lens data, Table 8 shows specifications and variable surface spacings, and Table 9 shows aspherical coefficients thereof. FIG. 9 shows aberration diagrams. The twenty third and twenty fourth surfaces of Table 7 correspond to the Lp lens Lp.

TABLE 7

| Example 3 | | | | | |
|---|---|---|---|---|---|
| Sn | R | D | Nd | vd | θgF |
| *1 | 124.1124 | 2.1300 | 1.51633 | 64.06 | |
| *2 | 18.3852 | 3.0139 | | | |
| 3 | 24.1456 | 2.9600 | 1.95000 | 17.50 | |
| 4 | 28.1198 | 6.1809 | | | |
| 5 | −54.5507 | 1.2100 | 1.43875 | 94.66 | |
| 6 | 61.6518 | 4.8136 | | | |
| 7 | −24.7707 | 1.0600 | 1.44757 | 92.67 | |
| 8 | −621.5430 | 0.1000 | | | |
| 9 | 35.9954 | 7.2900 | 1.85081 | 42.92 | |
| 10 | −22.7850 | 0.9800 | 1.70192 | 29.90 | |
| 11 | 158.9483 | 2.1314 | | | |
| *12 | −169.5923 | 2.7700 | 1.80625 | 40.91 | |
| *13 | −49.9054 | 0.3193 | | | |
| 14 | −28.8300 | 0.9100 | 1.58144 | 40.75 | |
| 15 | 24.2180 | 5.9200 | 1.75500 | 52.32 | |
| 16 | −45.9152 | 2.6540 | | | |
| 17(St) | ∞ | DD[17] | | | |
| 18 | 34941.5268 | 1.4500 | 1.95001 | 17.80 | |
| 19 | −108.8036 | 0.5214 | | | |
| 20 | −58.8329 | 0.9600 | 1.85478 | 24.80 | |
| 21 | 90.1964 | 0.1015 | | | |
| 22 | 25.3867 | 8.0900 | 1.43875 | 94.66 | |
| 23 | −27.6285 | 1.0000 | 1.59833 | 20.31 | 0.83392 |
| 24 | −22.5303 | 1.0100 | 1.85478 | 24.80 | |
| 25 | −39.9828 | 0.4342 | | | |
| 26 | 23.8730 | 4.2900 | 1.79702 | 48.30 | |
| 27 | 195.8073 | 2.1109 | | | |
| 28 | 20.5165 | 0.9200 | 1.51742 | 52.43 | |
| 29 | 16.6643 | 4.9682 | | | |
| 30 | −50366.6577 | 1.1700 | 1.80625 | 40.91 | |
| *31 | 147.8089 | DD[31] | | | |
| *32 | 133.2173 | 1.3200 | 1.87604 | 40.40 | |
| 33 | 421.6542 | 11.2033 | | | |
| 34 | ∞ | 2.8500 | 1.51680 | 64.20 | |
| 35 | ∞ | 1.1000 | | | |

TABLE 8

| Example 3 | | |
|---|---|---|
| | Infinity | Close 98.6 mm |
| Focal length | 18.37 | 18.50 |
| Open F number | 1.44 | 1.56 |
| Maximum total angle of view [°] | 75.1 | 71.6 |
| DD[17] | 7.3579 | 4.0025 |
| DD[31] | 2.5003 | 5.8556 |

TABLE 9

| | | Example 3 | |
| --- | --- | --- | --- |
| Sn | 1 | 2 | 12 |
| KA | −5.0000002753E+00 | 6.3242541879E−01 | −4.9999988890E+00 |
| A3 | 0.0000000000E+00 | 0.0000000000E+00 | 0.0000000000E+00 |
| A4 | 1.0663399595E−04 | 1.0942896554E−04 | −8.9306917072E−05 |
| A5 | −4.5872672876E−06 | −1.4578015270E−06 | 1.3676228466E−06 |
| A6 | −5.4698497681E−07 | −1.9916231209E−06 | −1.0906368637E−06 |
| A7 | 1.8927799745E−08 | 4.3960162672E−07 | 1.6919383870E−07 |
| A8 | 4.9463299753E−09 | −7.1242789642E−08 | −1.0983582728E−08 |
| A9 | −2.9444177396E−10 | 7.7037650341E−09 | −2.2189703936E−09 |
| A10 | −1.1098829242E−11 | −4.6525384933E−10 | 4.4471467211E−10 |
| A11 | 1.1752345446E−12 | 1.3079203257E−11 | −1.6831864456E−11 |
| A12 | −1.0578405056E−14 | −2.1937323349E−13 | −3.9480362035E−12 |
| A13 | −2.3957808350E−16 | 1.7893041289E−14 | 7.2429578885E−13 |
| A14 | −8.1205209712E−17 | −6.1706566835E−16 | −6.1334139219E−14 |
| A15 | 4.5210280730E−18 | −1.7027675033E−17 | 2.7654943646E−15 |
| A16 | −6.6429263855E−20 | 7.4811998574E−19 | −5.1759776699E−17 |

| Sn | 13 | 31 | 32 |
| --- | --- | --- | --- |
| KA | 4.9872729941E+00 | 5.0000000000E+00 | −5.0000087199E+00 |
| A3 | 0.0000000000E+00 | 0.0000000000E+00 | 0.0000000000E+00 |
| A4 | −5.8238173742E−05 | −7.3981514176E−05 | 2.0351837968E−05 |
| A5 | −3.2728399676E−06 | −2.6806141094E−05 | −9.2777431873E−05 |
| A6 | 1.5919635215E−06 | 5.9061878988E−06 | 4.9652180579E−05 |
| A7 | −6.1178376341E−07 | −5.4536296147E−07 | −1.6047783448E−05 |
| A8 | 1.2770616446E−07 | 2.2509431664E−08 | 2.9727512126E−06 |
| A9 | −1.7909588554E−08 | −1.1263718063E−09 | −1.9599618892E−07 |
| A10 | 2.4949067178E−09 | 6.1771593116E−10 | −3.6382949276E−08 |
| A11 | −5.2130022304E−10 | −7.2969037608E−11 | 1.0183483258E−08 |
| A12 | 9.9151268471E−11 | −5.1852049868E−13 | −1.0756492159E−09 |
| A13 | −1.2080933715E−11 | 5.6487284460E−13 | 5.2810994540E−11 |
| A14 | 8.7043446521E−13 | −3.7913411989E−14 | −4.3519505946E−13 |
| A15 | −3.4122887880E−14 | 1.0386940354E−15 | −6.4345787117E−14 |
| A16 | 5.6354914563E−16 | −1.0811852887E−17 | 1.9448623221E−15 |

Example 4

Figure 10:
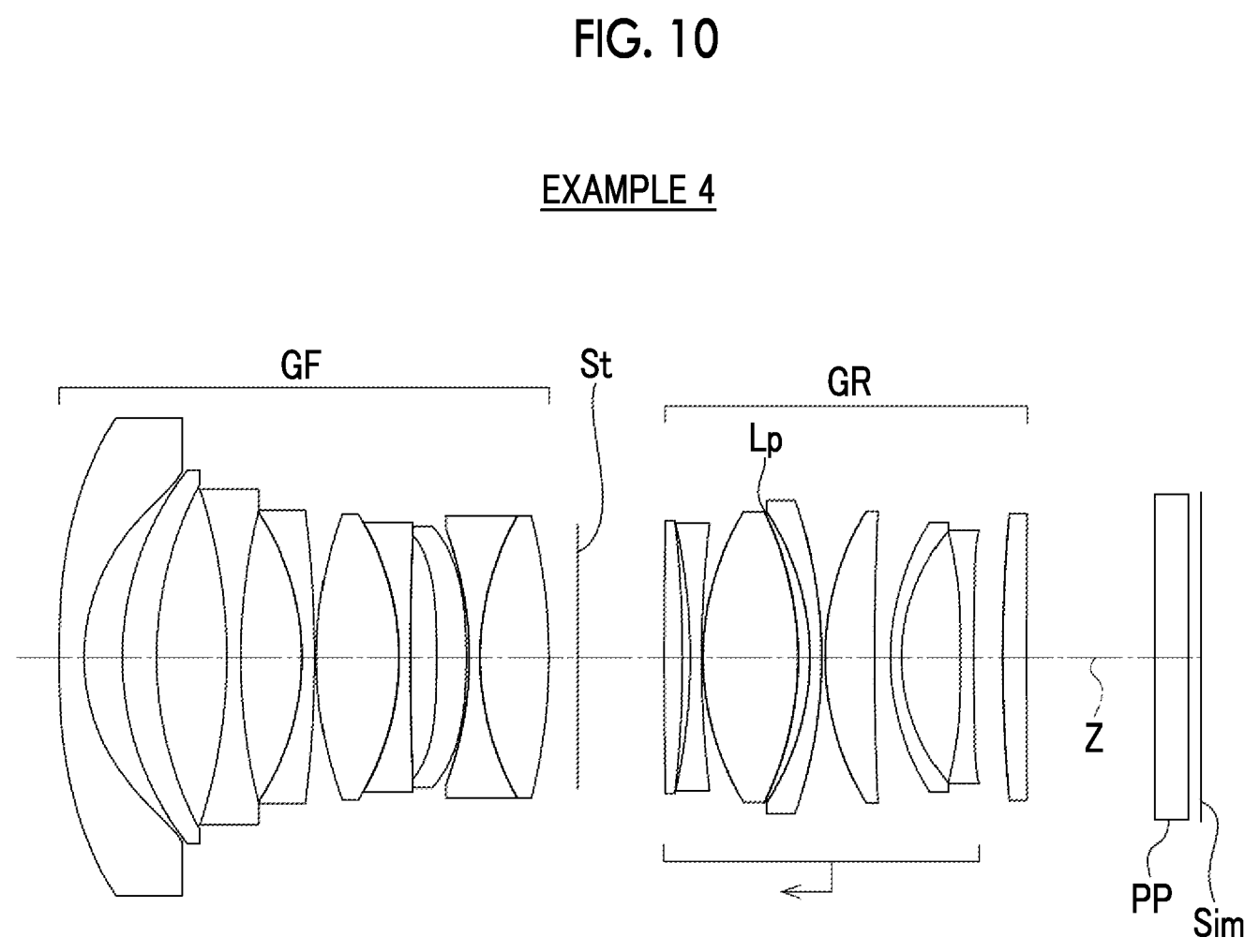

FIG. 10 is a cross-sectional view of a configuration of the imaging lens of Example 4. The imaging lens of Example 4 consists of, in order from the object side to the image side, a first lens group that has a positive refractive power, an aperture stop St, a second lens group that has a positive refractive power, and a third lens group that has a positive refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is third from the object side, includes the Lp lens Lp. The lens component is a cemented lens formed by cementing a positive lens, the Lp lens Lp, and a negative lens, in order from the object side.

Figure 11:
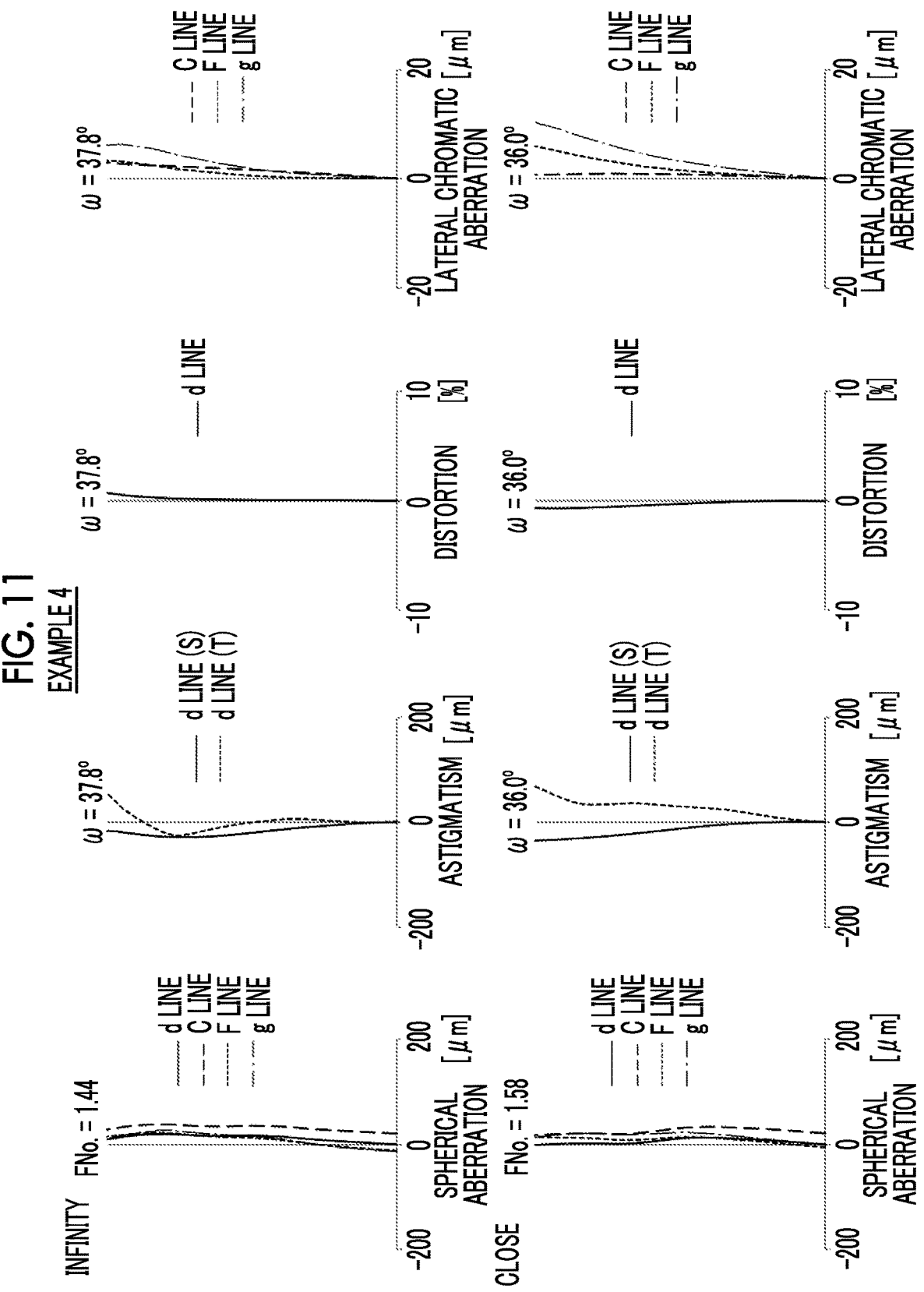
FIG. 11 is a diagram showing aberrations of the imaging lens of Example 4.

Regarding the imaging lens of Example 4, Table 10 shows basic lens data, Table 11 shows specifications and variable surface spacings, and Table 12 shows aspherical coefficients thereof. FIG. 11 shows aberration diagrams. The twenty third and twenty fourth surfaces of Table 10 correspond to the Lp lens Lp.

TABLE 10

| | | Example 4 | | | |
| --- | --- | --- | --- | --- | --- |
| Sn | R | D | Nd | vd | θgF |
| *1 | 160.9581 | 2.1400 | 1.51633 | 64.06 | |
| *2 | 18.7624 | 3.3087 | | | |

TABLE 10-continued

| | | Example 4 | | | |
| --- | --- | --- | --- | --- | --- |
| Sn | R | D | Nd | vd | θgF |
| 3 | 25.9790 | 2.9400 | 1.94999 | 17.50 | |
| 4 | 31.7597 | 6.0347 | | | |
| 5 | −46.4139 | 1.2000 | 1.43875 | 94.66 | |
| 6 | 51.8145 | 5.2630 | | | |
| 7 | −22.6743 | 1.0800 | 1.46620 | 88.48 | |
| 8 | −101.5965 | 0.1355 | | | |
| 9 | 35.5361 | 7.0800 | 1.83432 | 44.57 | |
| 10 | −23.3220 | 0.9700 | 1.70259 | 29.87 | |
| 11 | 265.2010 | 2.2469 | | | |
| *12 | −133.0919 | 2.5600 | 1.80625 | 40.91 | |
| *13 | −47.3771 | 0.2530 | | | |
| 14 | −31.1416 | 0.9300 | 1.58144 | 40.75 | |
| 15 | 24.5620 | 5.9200 | 1.75500 | 52.32 | |
| 16 | −49.6659 | 2.4660 | | | |
| 17(St) | ∞ | DD[17] | | | |
| 18 | 861.9910 | 1.5600 | 1.94736 | 18.99 | |
| 19 | −107.3913 | 0.6757 | | | |
| 20 | −52.7235 | 0.9700 | 1.85478 | 24.80 | |
| 21 | 96.0955 | 0.1231 | | | |
| 22 | 24.1472 | 8.1800 | 1.43875 | 94.66 | |
| 23 | −28.4348 | 1.0100 | 1.59833 | 20.31 | 0.83392 |
| 24 | −22.9941 | 1.0100 | 1.85478 | 24.80 | |
| 25 | −40.8192 | 0.2935 | | | |
| 26 | 23.8009 | 4.2700 | 1.79636 | 45.60 | |
| 27 | 252.5580 | 1.3719 | | | |
| 28 | 21.6969 | 0.9500 | 1.56189 | 48.65 | |
| 29 | 16.7803 | 4.9857 | | | |
| 30 | −1980.3514 | 1.1500 | 1.80625 | 40.91 | |
| *31 | 115.0856 | DD[31] | | | |
| *32 | 135.6202 | 2.0500 | 1.78729 | 49.27 | |
| 33 | 1908.7615 | 11.0674 | | | |

TABLE 10-continued

| | | Example 4 | | | |
|---|---|---|---|---|---|
| Sn | R | D | Nd | vd | θgF |
| 34 | ∞ | 2.8500 | 1.51680 | 64.20 | |
| 35 | ∞ | 1.1000 | | | |

TABLE 11

| | Example 4 | |
|---|---|---|
| | Infinity | Close 98.2 mm |
| Focal length | 18.19 | 18.34 |
| Open F number | 1.44 | 1.58 |
| Maximum total angle of view [°] | 75.6 | 72.0 |
| DD[17] | 7.4797 | 4.0644 |
| DD[31] | 2.5000 | 5.9153 |

TABLE 12

| | | Example 4 | |
|---|---|---|---|
| Sn | 1 | 2 | 12 |
| KA | −5.0000003987E+00 | 6.0977297137E−01 | −5.0000071982E+00 |
| A3 | 0.0000000000E+00 | 0.0000000000E+00 | 0.0000000000E+00 |
| A4 | 1.0829841339E−04 | 1.1059507799E−04 | −9.0258411145E−05 |
| A5 | −4.1292978539E−06 | −4.0564055377E−06 | 1.8284693990E−06 |
| A6 | −6.8787238914E−07 | −4.7356540091E−07 | −1.8340520284E−06 |
| A7 | 3.9659971679E−08 | 1.0987264472E−08 | 5.7977985303E−07 |
| A8 | 2.7452313966E−09 | 5.5112032927E−10 | −1.5041281373E−07 |
| A9 | −1.6824575111E−10 | 5.2004327341E−11 | 3.1238432928E−08 |
| A10 | −7.2739719990E−12 | 3.9073219708E−11 | −5.4356951156E−09 |
| A11 | −6.3058068021E−14 | −4.3147152498E−12 | 7.4600982008E−10 |
| A12 | 8.1695560266E−14 | −1.2884936667E−13 | −7.6406838497E−11 |
| A13 | −3.6631479287E−15 | 2.5769081514E−14 | 5.6361448605E−12 |
| A14 | −1.6852926920E−17 | −2.2600910741E−16 | −2.8642820949E−13 |
| A15 | 4.0336739686E−18 | −5.0761407004E−17 | 9.0055119452E−15 |
| A16 | −6.6219346712E−20 | 1.3378544160E−18 | −1.3060141513E−16 |

| Sn | 13 | 31 | 32 |
|---|---|---|---|
| KA | 5.0000005670E+00 | −4.9999940010E+00 | −3.3004160615E+00 |
| A3 | 0.0000000000E+00 | 0.0000000000E+00 | 0.0000000000E+00 |
| A4 | −5.8840163993E−05 | −1.0010295526E−04 | −3.9141741122E−05 |
| A5 | −6.4340938708E−07 | −2.6274885298E−05 | −2.9962693994E−05 |
| A6 | −5.5826989488E−07 | 7.0801068940E−06 | 7.3189957559E−06 |
| A7 | 1.7436379861E−07 | −9.8423897778E−07 | −6.5150133904E−07 |
| A8 | −2.9556850075E−08 | 1.1997840286E−07 | 7.6173855454E−09 |
| A9 | 1.2470655273E−09 | −1.3563302383E−08 | 4.1777765193E−09 |
| A10 | 1.8222250275E−10 | 9.7851130734E−10 | −2.2076673123E−10 |
| A11 | −1.4536250457E−11 | 6.7401998398E−11 | −7.5180932283E−13 |
| A12 | −1.0841249204E−12 | −2.3719427446E−11 | −2.2156091644E−12 |
| A13 | 1.1498591001E−13 | 2.1834022898E−12 | 3.2289013556E−13 |
| A14 | 2.5774730712E−15 | −8.6651054306E−14 | −1.3878519457E−14 |
| A15 | −5.0807503210E−16 | 1.0316339161E−15 | 1.1342749379E−16 |
| A16 | 1.2986830076E−17 | 1.2918380559E−17 | 3.5618732770E−18 |

Example 5

Figure 12:
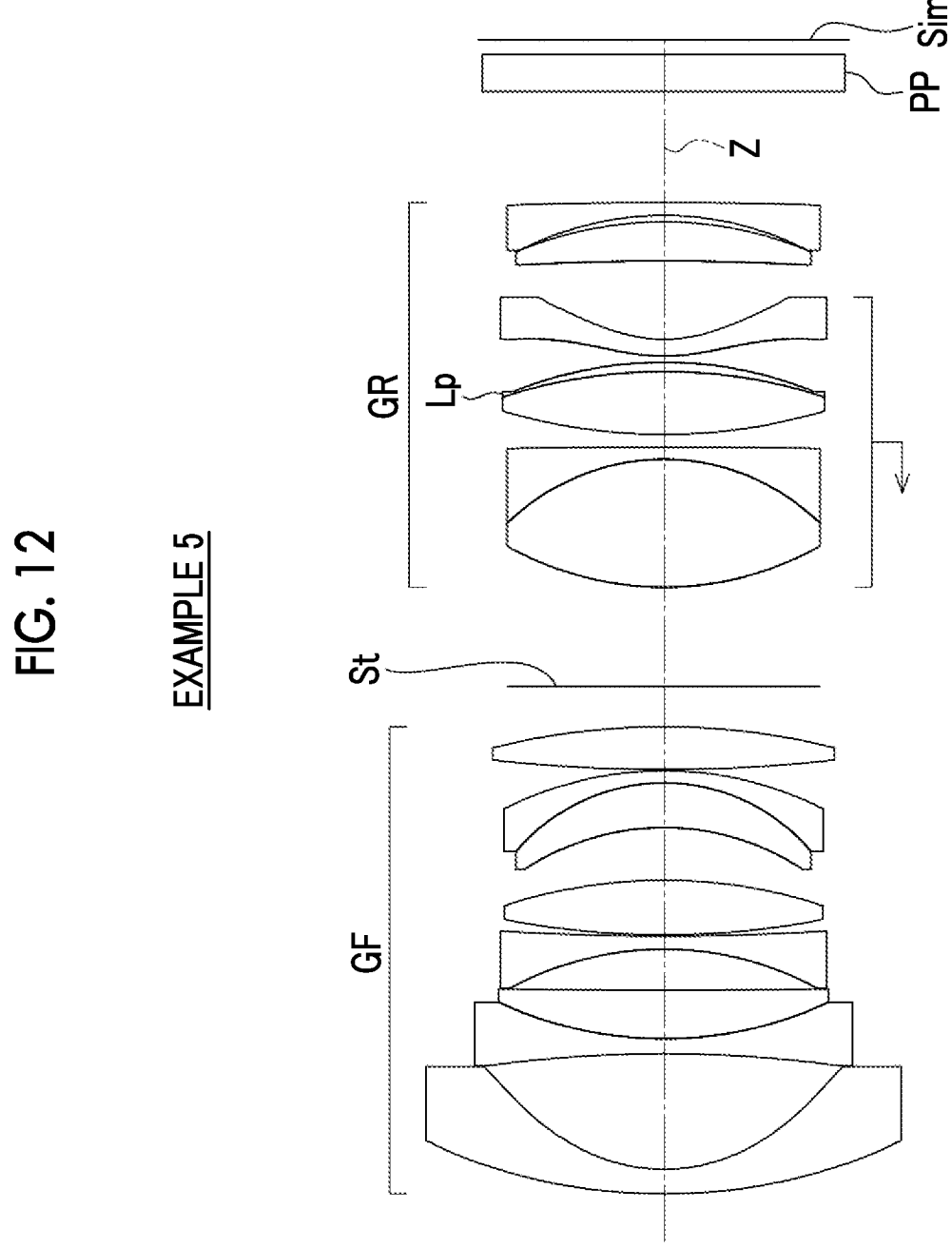
FIG. 12 is a cross-sectional view showing a configuration of an imaging lens of Example 5.

FIG. 12 is a cross-sectional view of a configuration of the imaging lens of Example 5. The imaging lens of Example 5 consists of, in order from the object side to the image side, a first lens group that has a positive refractive power, an aperture stop St, a second lens group that has a positive refractive power, and a third lens group that has a negative refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is second from the object side, includes the Lp lens Lp. The lens component is a cemented lens formed by cementing a positive lens and the Lp lens Lp in order from the object side.

Figure 13:
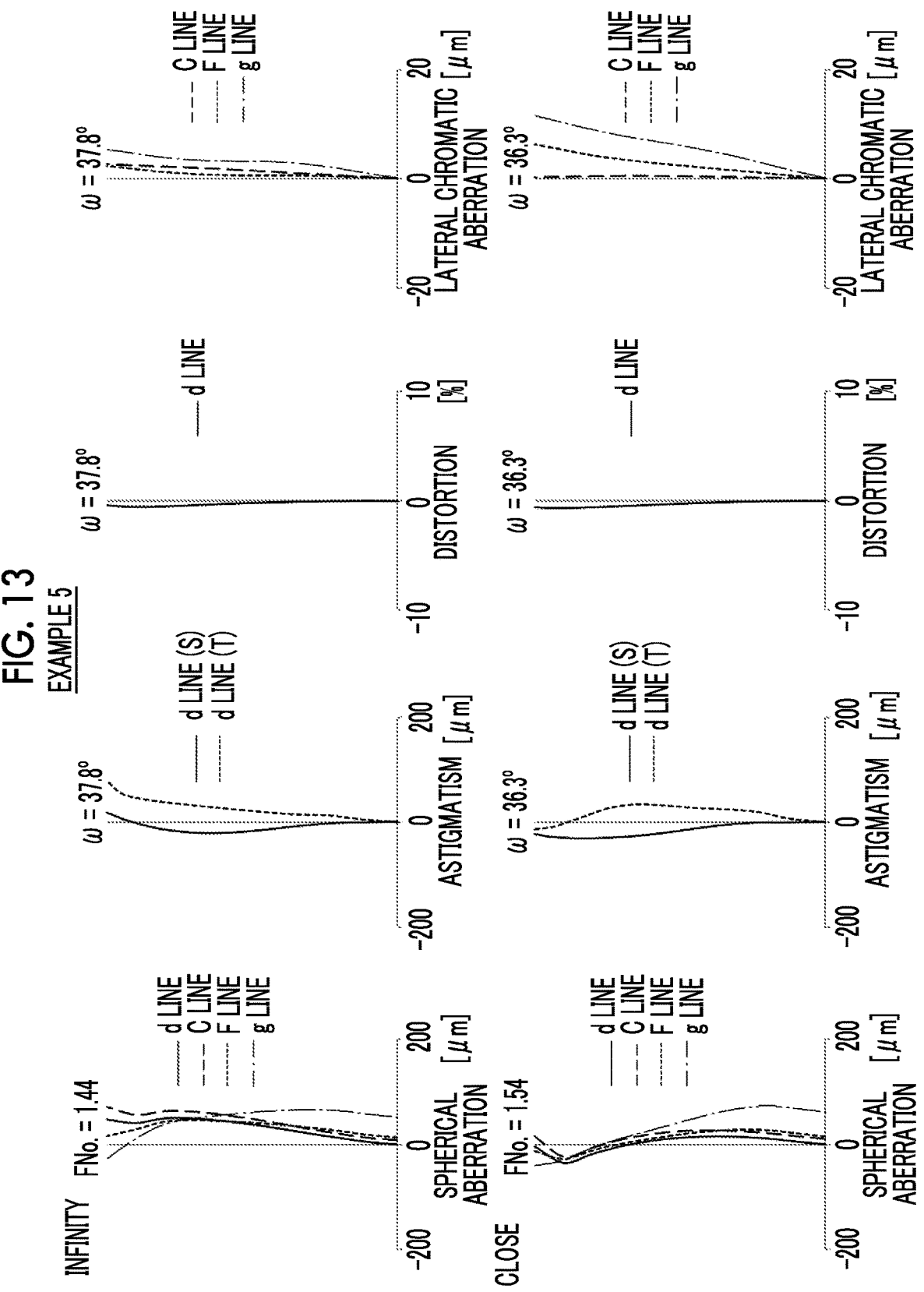
FIG. 13 is a diagram showing aberrations of the imaging lens of Example 5.

Regarding the imaging lens of Example 5, Table 13 shows basic lens data, Table 14 shows specifications and variable surface spacings, and Table 15 shows aspherical coefficients thereof. FIG. 13 shows aberration diagrams. The twentieth and twenty first surfaces of Table 13 correspond to the Lp lens Lp.

TABLE 13

| | | Example 5 | | | |
|---|---|---|---|---|---|
| Sn | R | D | Nd | vd | θgF |
| *1 | 53.1920 | 1.8711 | 1.51633 | 64.06 | |
| *2 | 14.1246 | 8.8566 | | | |
| 3 | −98.5219 | 1.1448 | 1.49700 | 81.61 | |
| 4 | 29.6756 | 3.7343 | 1.81600 | 46.62 | |
| 5 | 650.2039 | 3.1508 | | | |
| 6 | −24.6673 | 0.9945 | 1.74077 | 27.79 | |

TABLE 13-continued

| | | Example 5 | | | |
|---|---|---|---|---|---|
| Sn | R | D | Nd | νd | θgF |
| 7 | 194.5910 | 0.1000 | | | |
| 8 | 63.6132 | 4.1927 | 1.83481 | 42.74 | |
| 9 | −39.1509 | 4.0314 | | | |
| 10 | −19.3125 | 3.4290 | 1.49700 | 81.61 | |
| 11 | −14.7623 | 0.9265 | 1.73037 | 32.23 | |
| 12 | −27.0183 | 0.1000 | | | |
| 13 | 120.2649 | 3.2744 | 1.96300 | 24.11 | |
| 14 | −53.8651 | 3.0843 | | | |
| 15(St) | ∞ | DD[15] | | | |
| 16 | 24.3747 | 9.8055 | 1.49700 | 81.61 | |
| 17 | −17.0847 | 0.9316 | 1.85451 | 25.15 | |
| 18 | −619.7027 | 0.9709 | | | |
| 19 | 43.4087 | 4.8411 | 1.87070 | 40.73 | |

TABLE 14

| | Example 5 | |
|---|---|---|
| | Infinity | Close 100 mm |
| Focal length | 18.37 | 18.10 |
| Open F number | 1.44 | 1.54 |
| Maximum total angle of view [°] | 75.6 | 72.6 |
| DD[15] | 7.5361 | 4.7532 |
| DD[23] | 6.0169 | 8.7997 |

TABLE 15

| | Example 5 | | |
|---|---|---|---|
| Sn | 1 | 2 | 21 |
| KA | 1.4771129431E−01 | −1.8702755751E+00 | 3.4285317784E+00 |
| A3 | 0.0000000000E+00 | 0.0000000000E+00 | 0.0000000000E+00 |
| A4 | 5.6058711355E−05 | 1.6546424504E−04 | 6.4448879808E−05 |
| A5 | −3.6812594527E−06 | 1.4595515833E−06 | −5.5143657950E−05 |
| A6 | 2.3162777715E−07 | −2.4419296858E−06 | 9.4918497633E−06 |
| A7 | −9.6932929117E−08 | 5.5880245300E−07 | 1.7806748928E−07 |
| A8 | 1.3091730623E−08 | −9.8027713169E−08 | −2.0139489710E−07 |
| A9 | −6.7188078183E−10 | 9.9890403579E−09 | 1.4785579947E−08 |
| A10 | 6.5121795031E−12 | 4.0717944040E−10 | 1.0952076658E−09 |
| A11 | 3.5140717600E−13 | −7.1071849284E−12 | −1.6465238390E−10 |
| A12 | 2.7809820941E−14 | −3.3391240546E−13 | −2.4448761110E−12 |
| A13 | −3.9753106968E−15 | 2.5969922499E−13 | 1.1198491492E−12 |
| A14 | 2.3387345217E−16 | −2.1805339075E−14 | −3.4678571274E−14 |
| A15 | −8.4745713522E−18 | 7.4854830077E−16 | −1.6996969143E−15 |
| A16 | 1.3791559574E−19 | −9.7346107746E−18 | 8.2293959049E−17 |

| Sn | 22 | 23 |
|---|---|---|
| KA | −4.7651789517E−01 | −3.0148990109E+00 |
| A3 | 0.0000000000E+00 | 0.0000000000E+00 |
| A4 | −1.0103526475E−04 | 2.1201267645E−04 |
| A5 | −4.2231251440E−05 | −1.8996857515E−06 |
| A6 | 1.3594885458E−06 | −1.2870262257E−05 |
| A7 | 4.4236813318E−07 | 1.0257403013E−06 |
| A8 | 2.8675427387E−09 | 2.8037838497E−07 |
| A9 | 3.3703992583E−10 | −6.1790808248E−08 |
| A10 | −6.8019622870E−10 | 8.1817850805E−09 |
| A11 | −2.4184199510E−11 | −1.0332323043E−09 |
| A12 | 9.9130169015E−12 | 5.6975378629E−11 |
| A13 | −6.8396190839E−14 | 6.3412712859E−12 |
| A14 | −3.3960189439E−14 | −1.1819867638E−12 |
| A15 | −5.8713863072E−16 | 6.8151478217E−14 |
| A16 | 9.8420532746E−17 | −1.4139801272E−15 |

TABLE 13-continued

| | | Example 5 | | | |
|---|---|---|---|---|---|
| Sn | R | D | Nd | νd | θgF |
| 20 | −39.9288 | 0.7000 | 1.59833 | 20.31 | 0.83392 |
| *21 | −33.6621 | 0.4867 | | | |
| *22 | 15.1687 | 1.2659 | 1.80610 | 40.73 | |
| *23 | 10.6092 | DD[23] | | | |
| 24 | −195.6237 | 2.9976 | 1.87070 | 40.73 | |
| 25 | −28.8288 | 0.5001 | | | |
| 26 | −23.9845 | 0.9810 | 1.68893 | 31.07 | |
| 27 | −357.3939 | 8.5158 | | | |
| 28 | ∞ | 2.8500 | 1.51680 | 64.20 | |
| 29 | ∞ | 1.1000 | | | |

Example 6

Figure 14:
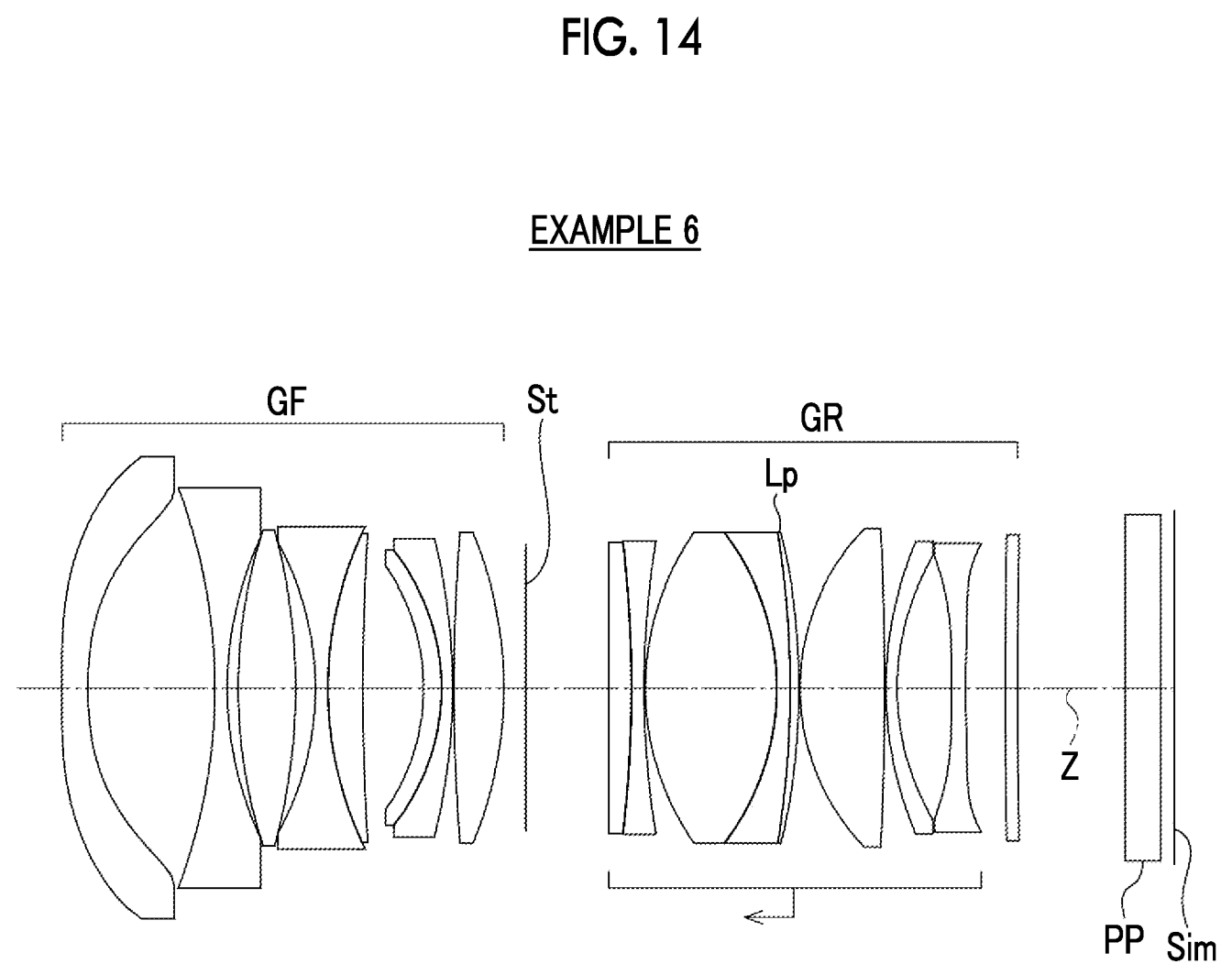

FIG. 14 is a cross-sectional view of a configuration of the imaging lens of Example 6. The imaging lens of Example 6 consists of, in order from the object side to the image side, a first lens group that has a positive refractive power, an aperture stop St, a second lens group that has a positive refractive power, and a third lens group that has a negative refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is second from the object side, includes the Lp lens Lp. The lens component is a cemented lens formed by cementing a positive lens, a negative lens, and the Lp lens Lp, in order from the object side.

Figure 15:
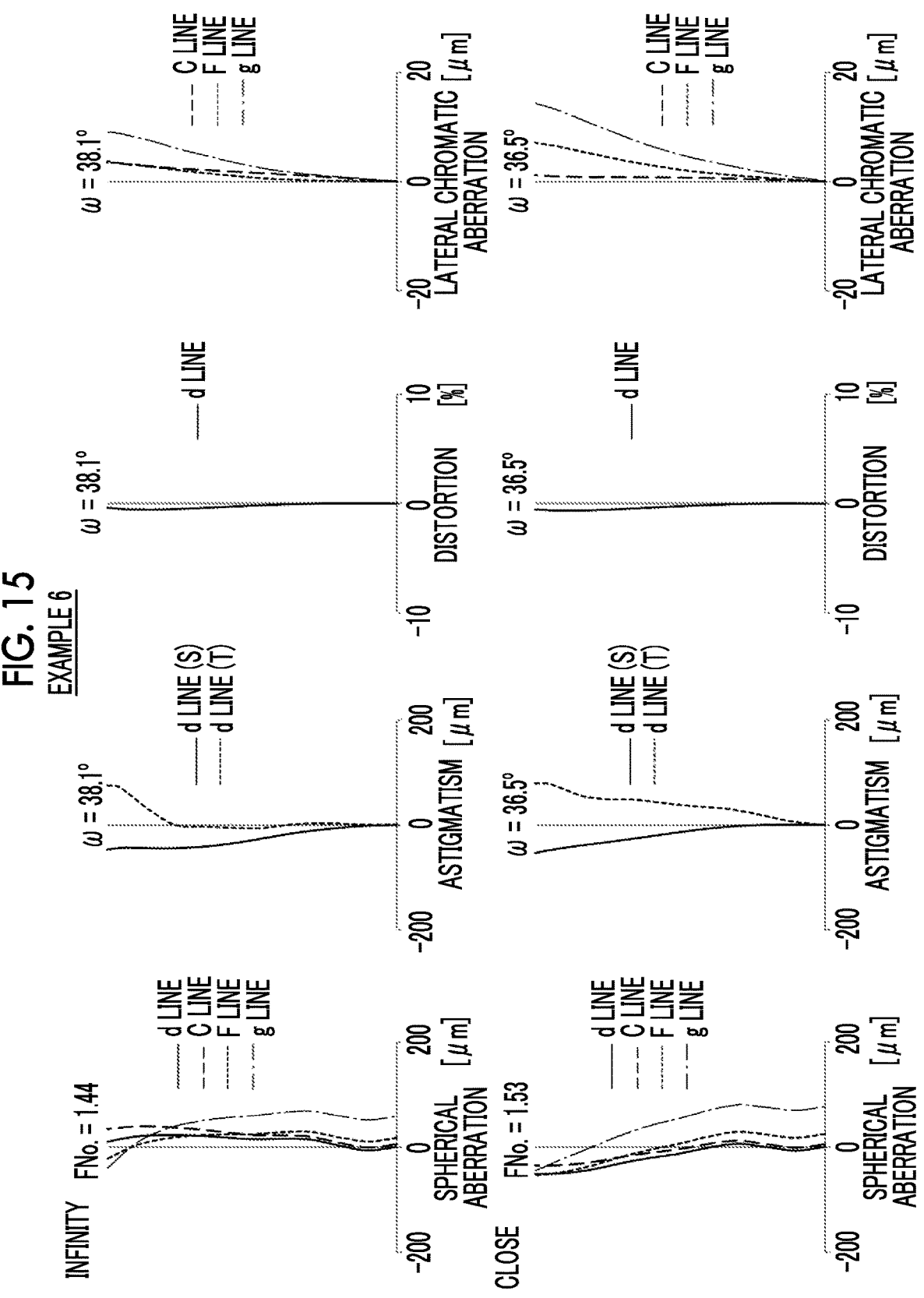
FIG. 15 is a diagram showing aberrations of the imaging lens of Example 6.

Regarding the imaging lens of Example 6, Table 16 shows basic lens data, Table 17 shows specifications and variable surface spacings, and Table 18 shows aspherical coefficients thereof. FIG. 15 shows aberration diagrams. The twenty first and twenty second surfaces of Table 16 correspond to the Lp lens Lp.

TABLE 16

| | | Example 6 | | | |
|---|---|---|---|---|---|
| Sn | R | D | Nd | vd | θgF |
| *1 | 103792.0312 | 2.0942 | 1.51633 | 64.06 | |
| *2 | 32.6229 | 10.2015 | | | |
| 3 | −45.2273 | 1.0138 | 1.80001 | 25.00 | |
| 4 | 28.5101 | 0.8742 | | | |
| 5 | 41.1799 | 4.6203 | 1.95001 | 33.00 | |
| 6 | −48.4082 | 1.5948 | | | |
| 7 | −24.1623 | 1.0002 | 1.44000 | 66.25 | |
| 8 | 29.4812 | 2.8129 | 1.94851 | 33.15 | |
| 9 | 201.3023 | 4.8738 | | | |
| *10 | −17.7302 | 1.4417 | 1.80625 | 40.91 | |
| 11 | −17.8203 | 0.9000 | 1.62332 | 35.67 | |
| 12 | −49.6053 | 0.1000 | | | |
| 13 | 161.4870 | 4.0101 | 1.95001 | 32.97 | |
| 14 | −32.6831 | 1.7500 | | | |
| 15(St) | ∞ | DD[15] | | | |
| 16 | 43567773.7841 | 1.7518 | 1.51349 | 77.92 | |
| 17 | −99.8892 | 1.0066 | 1.70730 | 29.64 | |

TABLE 16-continued

| | | Example 6 | | | |
|---|---|---|---|---|---|
| Sn | R | D | Nd | vd | θgF |
| 18 | 73.5382 | 0.1000 | | | |
| 19 | 21.9001 | 10.5584 | 1.49672 | 80.51 | |
| 20 | −20.6146 | 1.0682 | 1.82228 | 26.89 | |
| 21 | −78.9648 | 0.7000 | 1.59833 | 20.31 | 0.83392 |
| *22 | −56.9905 | 0.1000 | | | |
| 23 | 18.3819 | 6.8190 | 1.56318 | 70.28 | |
| 24 | −258.5424 | 0.1000 | | | |
| 25 | 29.9342 | 0.9068 | 1.58758 | 39.24 | |
| 26 | 20.9757 | 4.3647 | | | |
| *27 | 256256.9655 | 1.1433 | 1.68227 | 50.81 | |
| *28 | 107.0782 | DD[28] | | | |
| 29 | 666.4975 | 0.9882 | 1.95001 | 17.50 | |
| 30 | 534.6724 | 8.6470 | | | |
| 31 | ∞ | 2.8500 | 1.51680 | 64.20 | |
| 32 | ∞ | 1.1000 | | | |

TABLE 17

| | Example 6 | |
|---|---|---|
| | Infinity | Close 100 mm |
| Focal length | 18.16 | 18.00 |
| Open F number | 1.44 | 1.53 |
| Maximum total angle of view [°] | 76.3 | 73.0 |
| DD[15] | 6.6842 | 4.0016 |
| DD[28] | 3.1841 | 5.8668 |

TABLE 18

| | | Example 6 | |
|---|---|---|---|
| Sn | 1 | 2 | 10 |
| KA | −4.9999923706E+00 | 3.9324959194E−01 | −1.7088369598E+00 |
| A3 | 0.0000000000E+00 | 0.0000000000E+00 | 0.0000000000E+00 |
| A4 | 1.9274681311E−04 | 2.0537678706E−04 | −5.4158893296E−05 |
| A5 | −4.6251629167E−06 | −4.0500792001E−06 | −1.0969774412E−05 |
| A6 | −1.6733380375E−06 | −1.5226498427E−06 | 3.2109424831E−06 |
| A7 | 1.0858674170E−07 | 7.3906279437E−08 | −2.7234069625E−07 |
| A8 | 4.6075006685E−09 | 6.9447139724E−10 | −3.6578260687E−08 |
| A9 | −2.8910778900E−10 | 6.2846491999E−10 | 6.3300118037E−09 |
| A10 | −4.4527456426E−11 | −1.7687331758E−12 | 4.4430113261E−10 |
| A11 | 3.6816696182E−12 | −1.0818588954E−11 | −1.4239075094E−10 |
| A12 | −7.7058422488E−14 | 2.7605550275E−13 | 1.0203413023E−11 |
| A13 | 3.5147460112E−15 | 6.7577289073E−14 | −7.0871581068E−13 |
| A14 | −4.1220646544E−16 | −4.1837636831E−15 | 1.0684258098E−13 |
| A15 | 1.5548527718E−17 | 3.0904424572E−17 | −8.5807617870E−15 |
| A16 | −1.7251461780E−19 | 1.5889487426E−18 | 2.3669939255E−16 |

| Sn | 22 | 27 | 28 |
|---|---|---|---|
| KA | 5.0000007573E+00 | −5.0000000000E+00 | −4.0472962927E+00 |
| A3 | 0.0000000000E+00 | 0.0000000000E+00 | 0.0000000000E+00 |
| A4 | 5.2290372727E−06 | −1.4752199613E−04 | −4.0860012899E−05 |
| A5 | 1.2829865224E−07 | −1.2701365040E−05 | −1.9456756896E−05 |
| A6 | −3.4240109437E−07 | 3.6897001105E−06 | 4.2159035992E−06 |
| A7 | 1.1707154680E−07 | −5.7940423536E−07 | 2.8228876743E−07 |
| A8 | −2.1042722812E−08 | 3.1043228884E−09 | −3.5383125897E−07 |
| A9 | 2.3299978600E−09 | 1.0683773301E−08 | 8.4068421004E−08 |
| A10 | −2.0632730291E−10 | −2.1717868748E−10 | −8.7552977836E−09 |
| A11 | 1.7456859874E−11 | −1.5626604183E−10 | 3.1568500925E−10 |
| A12 | −1.1972647248E−12 | 1.4344040541E−11 | 2.3049885503E−11 |
| A13 | 5.2833351219E−14 | −4.4667871045E−13 | −3.8614582281E−12 |
| A14 | −1.4093922781E−15 | 9.7356308492E−15 | 2.7567089824E−13 |
| A15 | 2.9314374566E−17 | −3.7635339715E−16 | −1.1433513778E−14 |
| A16 | −5.1848895778E−19 | 1.4236440381E−18 | 2.1415740142E−16 |

Figure 16:
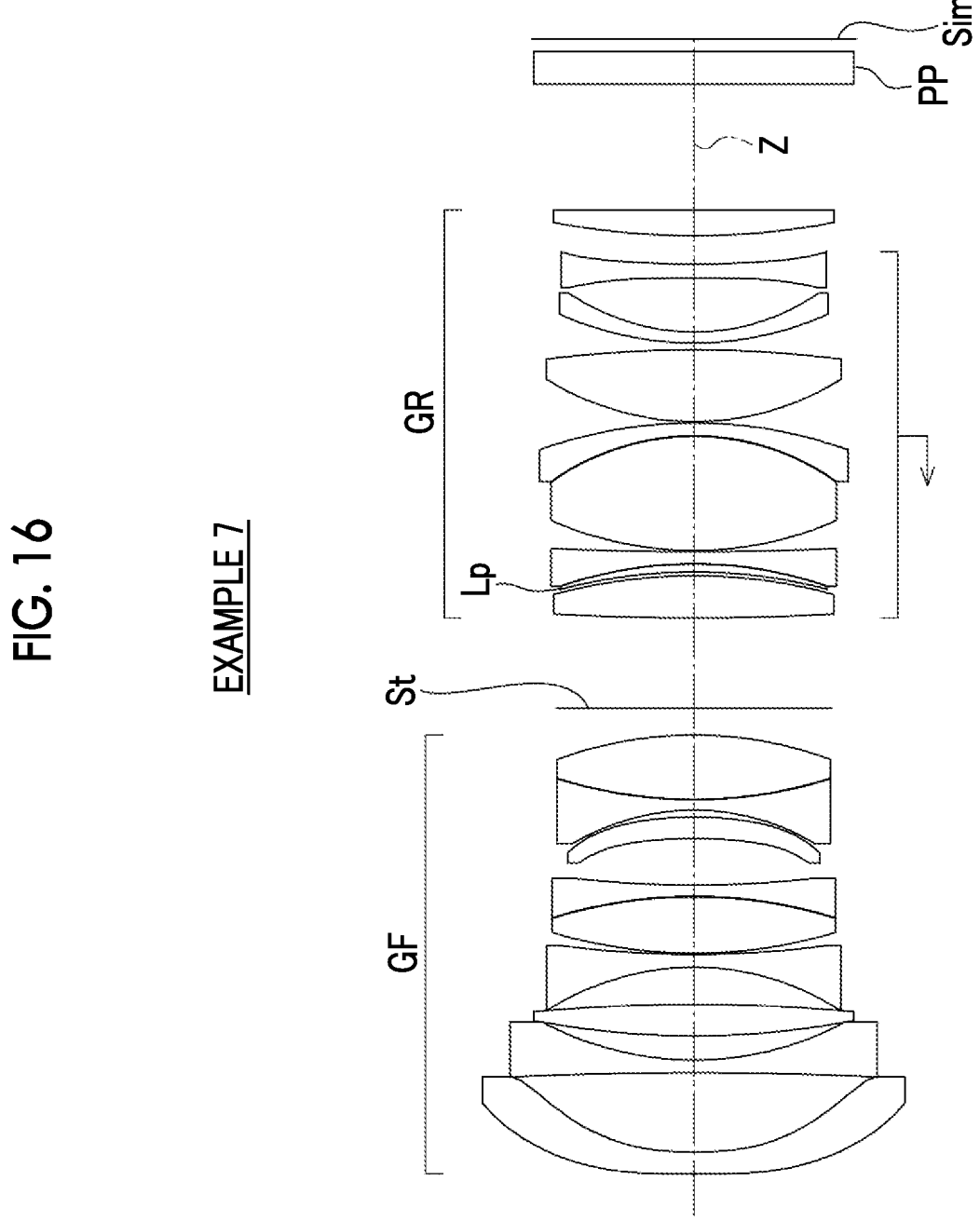
FIG. 16 is a cross-sectional view showing a configuration of an imaging lens of Example 7.

FIG. 16 is a cross-sectional view of a configuration of the imaging lens of Example 7. The imaging lens of Example 7 consists of, in order from the object side to the image side, a first lens group that has a positive refractive power, an aperture stop St, a second lens group that has a positive refractive power, and a third lens group that has a positive refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is second from the object side, includes the Lp lens Lp. The lens component is a cemented lens configured by cementing an Lp lens Lp and a negative lens in order from the object side.

Figure 17:
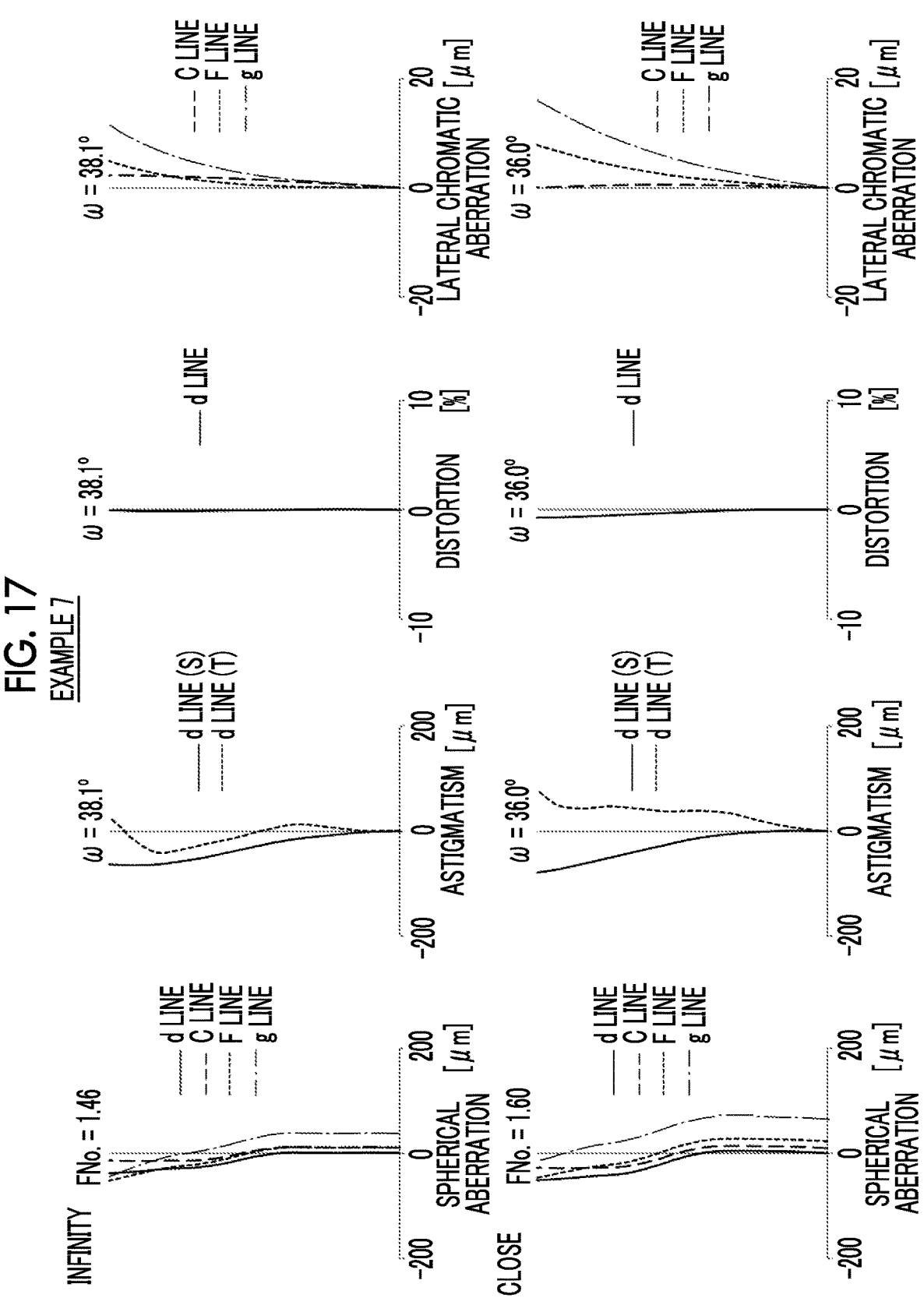
FIG. 17 is a diagram showing aberrations of the imaging lens of Example 7.

Regarding the imaging lens of Example 7, Table 19 shows basic lens data, Table 20 shows specifications and variable surface spacings, and Table 21 shows aspherical coefficients thereof. FIG. 17 shows aberration diagrams. The twentieth and twenty first surfaces of Table 19 correspond to the Lp lens Lp.

TABLE 19

| | | Example 7 | | | |
|---|---|---|---|---|---|
| Sn | R | D | Nd | vd | θgF |
| *1 | 132605.6161 | 1.8978 | 1.51633 | 64.06 | |
| *2 | 35.3775 | 6.9512 | | | |
| 3 | −339.2187 | 1.1078 | 1.81386 | 24.31 | |
| 4 | 28.0748 | 2.1226 | | | |
| 5 | 73.8138 | 2.7658 | 1.95001 | 33.00 | |
| 6 | −151.5488 | 3.2681 | | | |
| 7 | −23.6369 | 1.1287 | 1.43999 | 81.27 | |
| 8 | 88.4721 | 0.1000 | | | |
| 9 | 43.1017 | 4.9631 | 1.93685 | 34.32 | |
| 10 | −41.6262 | 1.0007 | 1.63717 | 37.90 | |

TABLE 19-continued

| | | Example 7 | | | |
|---|---|---|---|---|---|
| Sn | R | D | Nd | vd | θgF |
| 11 | 95.2786 | 4.0634 | | | |
| *12 | −50.8618 | 1.8877 | 1.80621 | 40.91 | |
| *13 | −34.7920 | 0.6058 | | | |
| 14 | −20.6656 | 0.9258 | 1.51774 | 52.50 | |
| 15 | 39.5975 | 5.6590 | 1.84527 | 43.32 | |
| 16 | −34.4028 | 2.3376 | | | |
| 17(St) | ∞ | DD[17] | | | |
| 18 | 214.8808 | 3.6191 | 1.51012 | 78.44 | |
| 19 | −46.7907 | 0.3406 | | | |
| 20 | −45.4102 | 0.7000 | 1.59833 | 20.31 | 0.83392 |
| 21 | −35.7016 | 1.0710 | 1.79212 | 26.99 | |
| 22 | 286.1184 | 0.1000 | | | |
| 23 | 30.9146 | 10.0209 | 1.45773 | 86.50 | |
| 24 | −21.4709 | 1.1545 | 1.74256 | 32.03 | |
| 25 | −39.6826 | 0.1000 | | | |
| 26 | 24.0375 | 6.3139 | 1.57736 | 68.10 | |
| 27 | −103.1153 | 0.6084 | | | |
| 28 | 28.6708 | 0.9613 | 1.59738 | 39.14 | |
| 29 | 19.2265 | 4.7112 | | | |
| *30 | −241422.1816 | 1.2176 | 1.79103 | 42.12 | |
| *31 | 66.3335 | DD[31] | | | |
| 32 | 65.1634 | 2.2616 | 1.54506 | 73.07 | |
| 33 | −38590.3182 | 11.0211 | | | |
| 34 | ∞ | 2.8500 | 1.51680 | 64.20 | |
| 35 | ∞ | 1.1000 | | | |

TABLE 20

| | Example 7 | |
|---|---|---|
| | Infinity | Close 97 mm |
| Focal length | 18.12 | 18.53 |
| Open F number | 1.46 | 1.60 |
| Maximum total angle of view [°] | 76.2 | 72.0 |
| DD[17] | 7.9128 | 4.0044 |
| DD[31] | 2.5000 | 6.4084 |

TABLE 21

| | Example 7 | | |
|---|---|---|---|
| Sn | 1 | 2 | 12 |
| KA | −4.9999975823E+00 | 9.0564499476E−01 | 2.5371050465E+00 |
| A3 | 0.0000000000E+00 | 0.0000000000E+00 | 0.0000000000E+00 |
| A4 | 1.8214983670E−04 | 1.8388965999E−04 | −6.5211177486E−05 |
| A5 | −3.4244624298E−06 | −1.8762601085E−06 | 1.3633242991E−06 |
| A6 | −1.2301757446E−06 | −1.2385930540E−06 | −1.2299846544E−06 |
| A7 | 2.9432370541E−08 | 5.6831868528E−08 | 2.0556710164E−07 |
| A8 | 8.3614322746E−09 | −6.0521473761E−09 | −1.6366710547E−08 |
| A9 | −3.9140250344E−10 | 1.3062411976E−09 | −1.2029432851E−09 |
| A10 | −2.1962871606E−11 | −6.4939571064E−11 | 3.3217765134E−10 |
| A11 | 1.3915091110E−12 | −2.4154579269E−12 | −2.7986191823E−11 |
| A12 | 5.6937541161E−14 | 2.9965861061E−13 | 8.7546237963E−13 |
| A13 | −5.6566615280E−15 | −2.4642394464E−14 | 7.8541685018E−14 |
| A14 | 1.0205912739E−16 | 2.4876232625E−15 | −1.5015800142E−14 |
| A15 | 1.6343011697E−18 | −1.2497757724E−16 | 9.7849756602E−16 |
| A16 | −5.0315251508E−20 | 2.1603907341E−18 | −2.2520121427E−17 |

| Sn | 13 | 30 | 31 |
|---|---|---|---|
| KA | 2.7612794169E+00 | −4.9999923706E+00 | −1.2578112734E+00 |
| A3 | 0.0000000000E+00 | 0.0000000000E+00 | 0.0000000000E+00 |
| A4 | −4.4375078142E−05 | −6.2769511042E−05 | −4.3420069731E−07 |
| A5 | 1.0292208120E−06 | −1.6084967699E−05 | −3.1030626290E−05 |
| A6 | −1.2628959508E−06 | −2.3976158449E−07 | 7.5495741509E−06 |
| A7 | 3.5587774346E−07 | 2.0472115339E−06 | −6.5947958849E−07 |
| A8 | −5.7267643913E−08 | −6.6393294070E−07 | −1.2024285236E−08 |
| A9 | 1.9176178614E−09 | 1.1485550600E−07 | 8.1095245052E−09 |

TABLE 21-continued

| | Example 7 | | |
|---|---|---|---|
| A10 | 7.4597799195E−10 | −1.3010334758E−08 | −7.6871341504E−10 |
| A11 | −1.0708694061E−10 | 1.15293 99919E−09 | 5.7207680308E−11 |
| A12 | 1.6123113957E−12 | −9.8355998392E−11 | −5.6441254551E−12 |
| A13 | 8.4723078464E−13 | 8.0210706727E−12 | 3.8115245910E−13 |
| A14 | −9.0398540898E−14 | −4.9610049476E−13 | −9.8936689597E−15 |
| A15 | 4.0294842301E−15 | 1.8489150694E−14 | −1.0082645116E−16 |
| A16 | −7.1250896502E−17 | −3.0203642417E−16 | 6.5247839855E−18 |

Example 8

Figure 18:
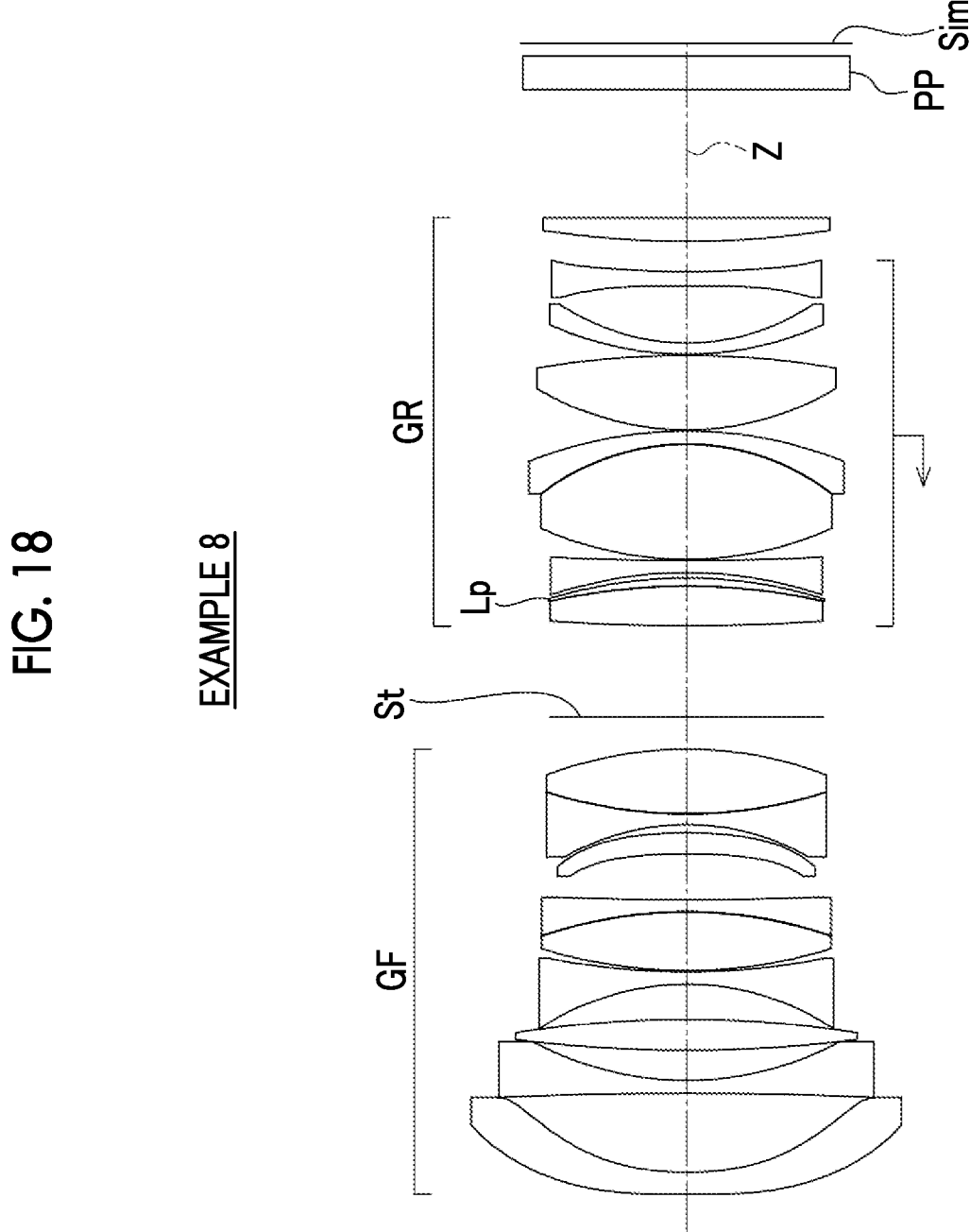
FIG. 18 is a cross-sectional view showing a configuration of an imaging lens of Example 8.

FIG. 18 is a cross-sectional view of a configuration of the imaging lens of Example 8. The imaging lens of Example 8 consists of, in order from the object side to the image side, a first lens group that has a positive refractive power, an aperture stop St, a second lens group that has a positive refractive power, and a third lens group that has a positive refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is closest to the object side, includes the Lp lens Lp. The lens component is a cemented lens formed by cementing a positive lens and the Lp lens Lp in order from the object side.

Figure 19:
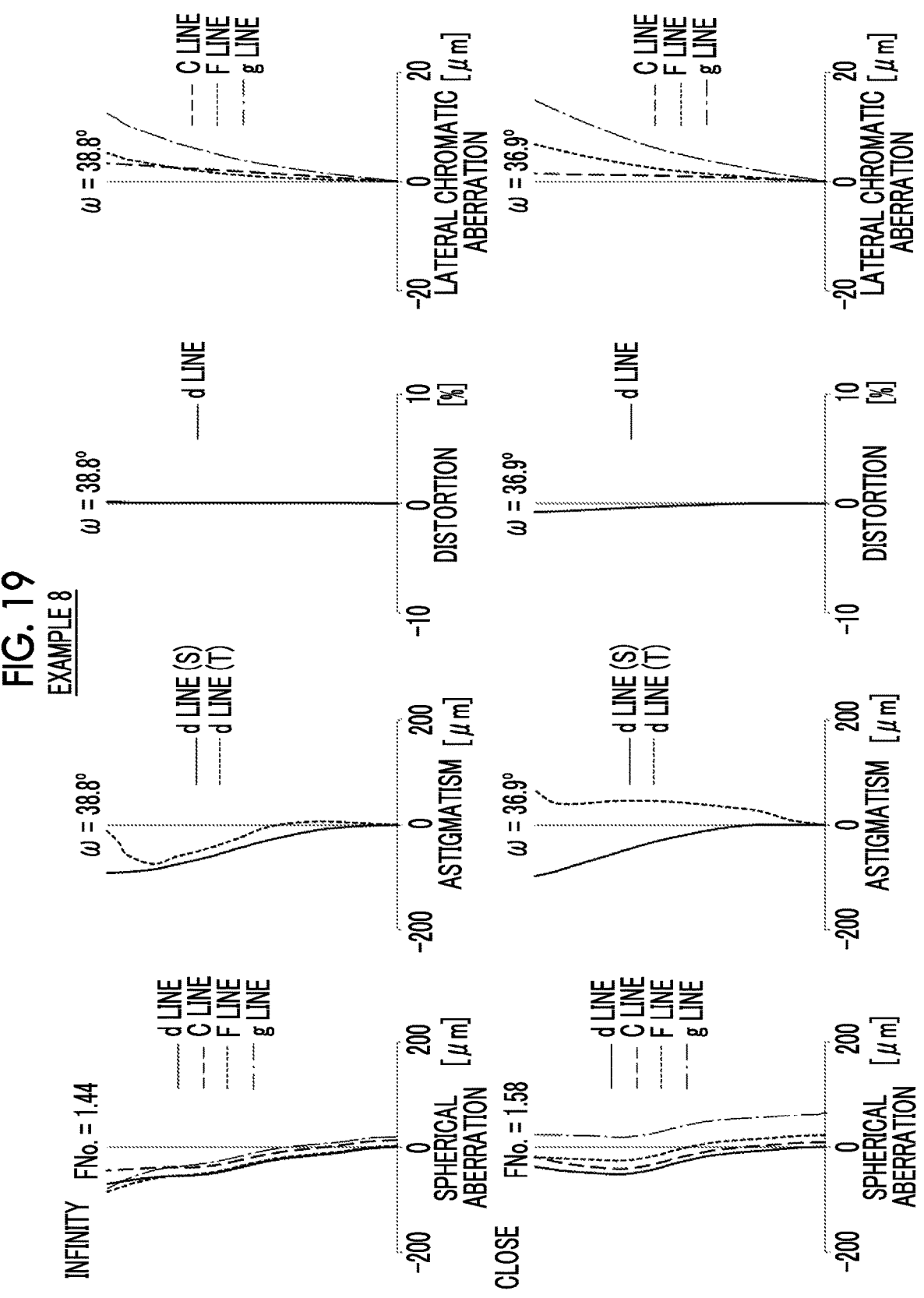
FIG. 19 is a diagram showing aberrations of the imaging lens of Example 8.

Regarding the imaging lens of Example 8, Table 22 shows basic lens data, Table 23 shows specifications and variable surface spacings, and Table 24 shows aspherical coefficients thereof. FIG. 19 shows aberration diagrams. The nineteenth to twentieth surfaces of Table 22 correspond to the Lp lens Lp.

TABLE 22

| | Example 8 | | | | |
|---|---|---|---|---|---|
| Sn | R | D | Nd | vd | θgF |
| *1 | 3134.4931 | 1.9043 | 1.51633 | 64.06 | |
| *2 | 33.8124 | 6.7546 | | | |
| 3 | −360.7787 | 1.1038 | 1.78386 | 25.81 | |
| 4 | 27.7479 | 2.5866 | | | |
| 5 | 115.6592 | 2.6595 | 1.95000 | 33.00 | |
| 6 | −93.8628 | 3.0335 | | | |
| 7 | −22.7401 | 1.0700 | 1.45240 | 74.21 | |
| 8 | 61.9070 | 0.1000 | | | |
| 9 | 41.8884 | 5.0409 | 1.94999 | 33.00 | |

TABLE 22-continued

| | Example 8 | | | | |
|---|---|---|---|---|---|
| Sn | R | D | Nd | vd | θgF |
| 10 | −38.1968 | 1.0333 | 1.73859 | 29.94 | |
| 11 | 299.0235 | 3.9362 | | | |
| *12 | −58.2347 | 1.8083 | 1.80621 | 40.91 | |
| *13 | −38.2097 | 0.7046 | | | |
| 14 | −21.0907 | 0.9173 | 1.51795 | 52.46 | |
| 15 | 39.4057 | 5.5498 | 1.84337 | 43.51 | |
| 16 | −33.6549 | 2.7478 | | | |
| 17(St) | ∞ | DD[17] | | | |
| 18 | 173.8517 | 3.3147 | 1.51597 | 77.54 | |
| 19 | −53.5600 | 0.7000 | 1.59833 | 20.31 | 0.83392 |
| 20 | −39.7550 | 0.4558 | | | |
| 21 | −36.6107 | 1.0386 | 1.81940 | 27.22 | |
| 22 | 229.9135 | 0.1000 | | | |
| 23 | 30.5350 | 9.8812 | 1.44715 | 88.13 | |
| 24 | −20.4079 | 1.1258 | 1.75666 | 31.12 | |
| 25 | −36.2907 | 0.1000 | | | |
| 26 | 24.7727 | 6.4127 | 1.57370 | 68.66 | |
| 27 | −76.6096 | 0.1010 | | | |
| 28 | 28.4135 | 0.9644 | 1.59364 | 39.24 | |
| 29 | 19.4559 | 4.8929 | | | |
| *30 | −2476.1726 | 1.2215 | 1.77038 | 43.77 | |
| *31 | 61.7170 | DD[31] | | | |
| 32 | 79.9019 | 2.0179 | 1.78773 | 49.23 | |
| 33 | 13999.8060 | 11.0267 | | | |
| 34 | ∞ | 2.8500 | 1.51680 | 64.20 | |
| 35 | ∞ | 1.1000 | | | |

TABLE 23

| | Example 8 | |
|---|---|---|
| | Infinity | Close 97.6 mm |
| Focal length | 17.64 | 18.04 |
| Open F number | 1.44 | 1.58 |
| Maximum total angle of view [°] | 77.6 | 73.8 |
| DD[17] | 7.8573 | 4.0084 |
| DD[31] | 2.6093 | 6.4582 |

TABLE 24

| | Example 8 | | |
|---|---|---|---|
| Sn | 1 | 2 | 12 |
| KA | −4.9999975823E+00 | 7.0835444609E−01 | 5.0000009020E+00 |
| A3 | 0.0000000000E+00 | 0.0000000000E+00 | 0.0000000000E+00 |
| A4 | 1.7389779749E−04 | 1.7554363195E−04 | −5.7986013366E−05 |
| A5 | −2.3742463171E−06 | −1.7434075669E−06 | 1.1720247255E−06 |
| A6 | −1.3924791214E−06 | −1.1278650060E−06 | −1.4398938648E−06 |
| A7 | 6.7493437530E−08 | 7.6181014525E−08 | 3.0567528501E−07 |
| A8 | 2.9531752488E−09 | −1.7967993765E−08 | −3.4759731817E−08 |
| A9 | −1.1553875176E−10 | 3.5511849938E−09 | −6.7146403393E−10 |
| A10 | −5.9446073109E−12 | −3.2269385382E−10 | 8.1789808769E−10 |
| A11 | −1.4843411601E−12 | 1.6320429923E−11 | −1.4374498857E−10 |
| A12 | 1.9798279373E−13 | −3.7823593966E−13 | 1.4018442067E−11 |

TABLE 24-continued

| | Example 8 | | |
|---|---|---|---|
| A13 | −6.6420443973E−15 | −3.1113804796E−14 | −7.1415396292E−13 |
| A14 | −7.8438792010E−17 | 4.1199809715E−15 | 4.6236333152E−15 |
| A15 | 9.0481399083E−18 | −1.8307455231E−16 | 1.2184874362E−15 |
| A16 | −1.4617488244E−19 | 2.8659572860E−18 | −3.9017822944E−17 |

| Sn | 13 | 30 | 31 |
|---|---|---|---|
| KA | 2.2142875420E+00 | −4.9999923706E+00 | −2.6597570447E+00 |
| A3 | 0.0000000000E+00 | 0.0000000000E+00 | 0.0000000000E+00 |
| A4 | −4.0982082462E−05 | −6.8228621771E−05 | −1.6071013383E−05 |
| A5 | −3.1443656034E−06 | −2.3100385728E−05 | −1.8665556088E−05 |
| A6 | 1.4674675175E−06 | 4.6430375912E−06 | 9.3529488477E−07 |
| A7 | −6.4434429846E−07 | −4.2576012593E−08 | 4.3577019845E−07 |
| A8 | 1.5129867470E−07 | −8.2879506285E−08 | 2.7868903736E−07 |
| A9 | −1.9806242097E−08 | 5.7308542188E−09 | −1.7139729852E−07 |
| A10 | 9.0788946298E−10 | 1.3873891604E−09 | 3.9186860169E−08 |
| A11 | 7.6505602436E−11 | −2.4822253029E−10 | −4.7860417162E−09 |
| A12 | −4.9516736392E−12 | 8.8928076830E−12 | 3.0579262162E−10 |
| A13 | −1.4648990494E−12 | 1.2543324738E−12 | −5.0158214454E−12 |
| A14 | 2.2017638683E−13 | −1.6035752460E−13 | −6.2276906312E−13 |
| A15 | −1.1855135637E−14 | 7.4693614062E−15 | 4.1682485834E−14 |
| A16 | 2.3453013215E−16 | −1.3303743978E−16 | −8.2010767973E−16 |

Example 9

Figure 20:
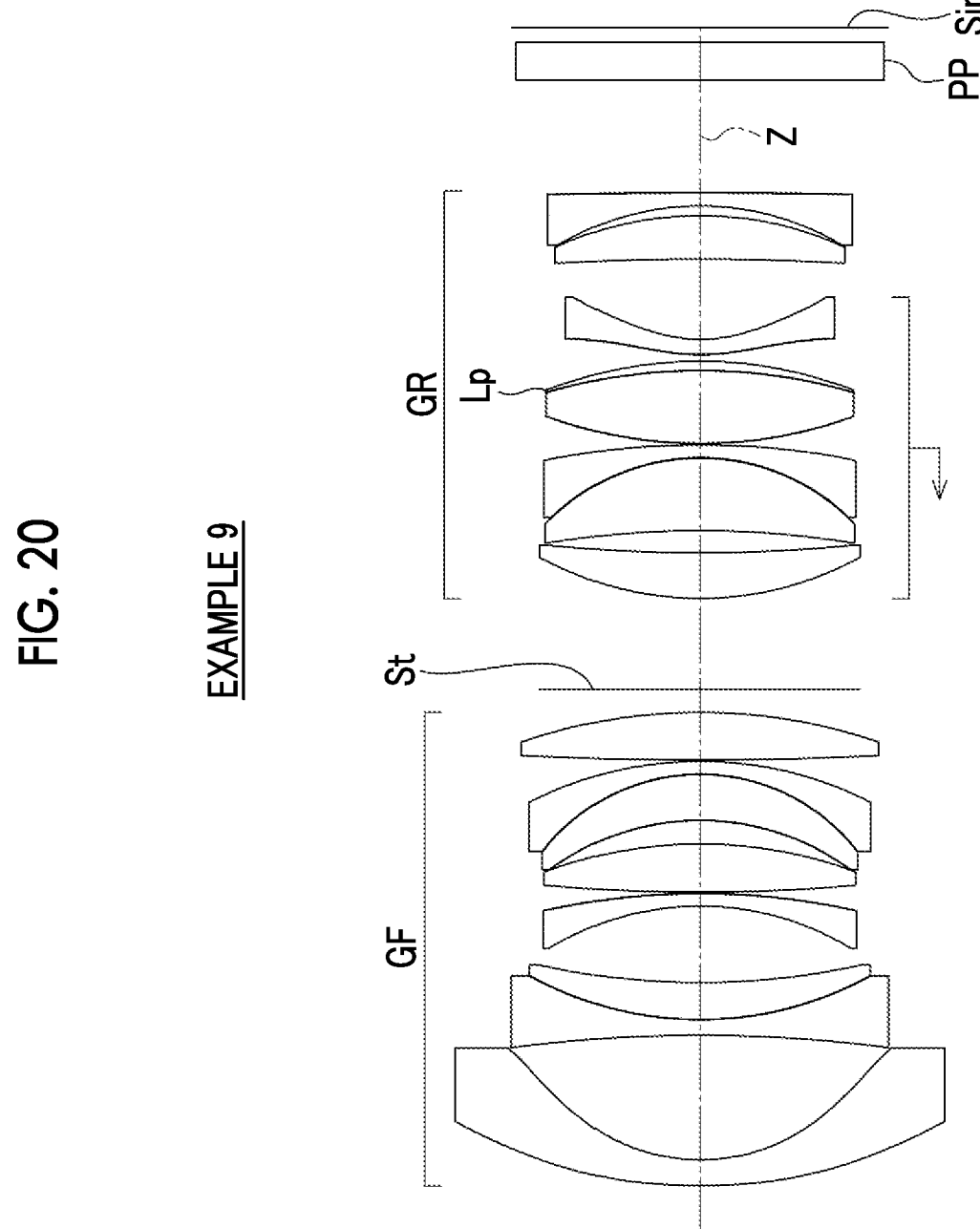
FIG. 20 is a cross-sectional view showing a configuration of an imaging lens of Example 9.

FIG. 20 is a cross-sectional view of a configuration of the imaging lens of Example 9. The imaging lens of Example 9 consists of, in order from the object side to the image side, a first lens group that has a positive refractive power, an aperture stop St, a second lens group that has a positive refractive power, and a third lens group that has a negative refractive power. The front group GF consists of the first lens group. The rear group GR consists of the second lens group and the third lens group. During focusing from the infinite distance object to the close object, the first lens group and the third lens group remain stationary with respect to the image plane Sim, and the second lens group moves to the object side.

A lens component of the second lens group, which is third from the object side, includes the Lp lens Lp. The lens component is a cemented lens formed by cementing a positive lens and the Lp lens Lp in order from the object side.

Figure 21:
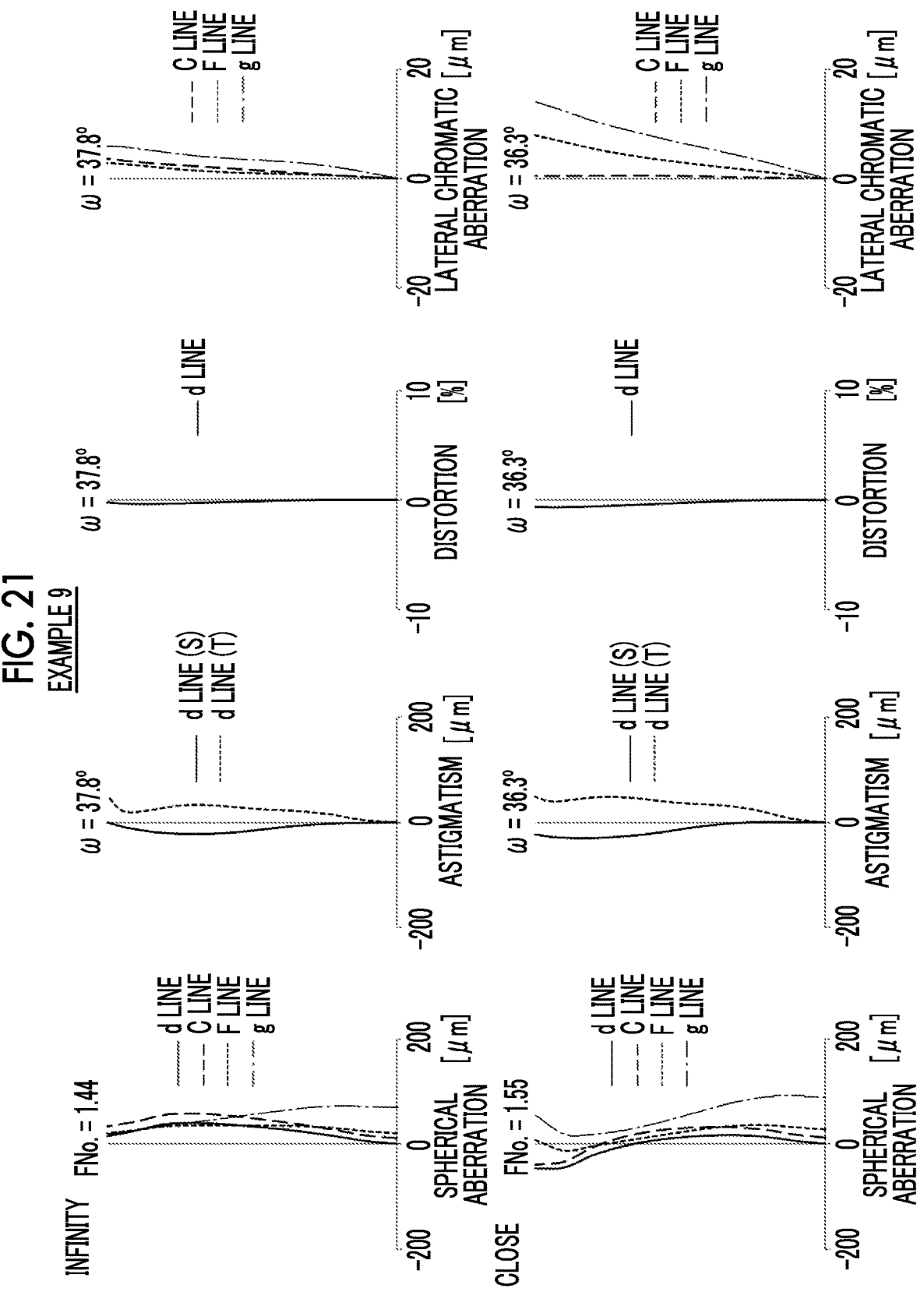
FIG. 21 is a diagram showing aberrations of the imaging lens of Example 9.

Regarding the imaging lens of Example 9, Table 25 shows basic lens data, Table 26 shows specifications and variable surface spacings, and Table 27 shows aspherical coefficients thereof. FIG. 21 shows aberration diagrams. The twenty second to twenty third surfaces of Table 25 correspond to the Lp lens Lp.

TABLE 25

| | | Example 9 | | | |
|---|---|---|---|---|---|
| Sn | R | D | Nd | vd | θgF |
| *1 | 57.6472 | 1.9384 | 1.51633 | 64.06 | |
| *2 | 15.7635 | 9.3894 | | | |
| 3 | −110.1195 | 1.2067 | 1.44001 | 89.23 | |
| 4 | 26.6174 | 2.8041 | 1.89001 | 39.00 | |
| 5 | 56.8348 | 5.7600 | | | |
| 6 | −22.0292 | 0.9588 | 1.89055 | 20.47 | |
| 7 | −53.9802 | 0.1000 | | | |
| 8 | 134.5760 | 3.6365 | 1.83387 | 40.35 | |
| 9 | −33.8620 | 1.7801 | | | |
| 10 | −19.2061 | 3.4815 | 1.51000 | 78.46 | |
| 11 | −15.0695 | 0.9805 | 1.77992 | 26.00 | |
| 12 | −28.4471 | 0.1000 | | | |
| 13 | 275.5522 | 3.5948 | 1.95001 | 20.93 | |

TABLE 25-continued

| | | Example 9 | | | |
|---|---|---|---|---|---|
| Sn | R | D | Nd | vd | θgF |
| 14 | −41.6761 | 1.7500 | | | |
| 15(St) | ∞ | DD[15] | | | |
| 16 | 25.0668 | 3.4428 | 1.51721 | 77.35 | |
| 17 | 118.0485 | 1.6742 | | | |
| 18 | −71.5813 | 5.4874 | 1.54435 | 73.18 | |
| 19 | −16.1930 | 0.9778 | 1.85478 | 24.80 | |
| 20 | −59.6059 | 0.1000 | | | |
| 21 | 33.8476 | 5.5325 | 1.73190 | 54.81 | |
| 22 | −41.6361 | 0.7000 | 1.59833 | 20.31 | 0.83392 |
| *23 | −34.1386 | 0.4944 | | | |
| *24 | 15.4885 | 1.1492 | 1.80625 | 40.91 | |
| *25 | 10.5580 | DD[25] | | | |
| 26 | −184.4890 | 3.2724 | 1.83126 | 44.87 | |
| 27 | −26.3127 | 0.7314 | | | |
| 28 | −20.9428 | 0.9927 | 1.62284 | 35.72 | |
| 29 | −562.0894 | 8.5228 | | | |
| 30 | ∞ | 2.8500 | 1.51680 | 64.20 | |
| 31 | ∞ | 1.1000 | | | |

TABLE 26

| | Example 9 | |
|---|---|---|
| | Infinity | Close 100 mm |
| Focal length | 18.37 | 18.07 |
| Open F number | 1.44 | 1.55 |
| Maximum total angle of view [°] | 75.5 | 72.6 |
| DD[15] | 6.7818 | 4.0013 |
| DD[25] | 6.0756 | 8.8561 |

TABLE 27

Example 9

| Sn | 1 | 2 | 23 |
|---|---|---|---|
| KA | −5.0000006570E+00 | 4.6394438184E−01 | 3.1393220430E+00 |
| A3 | 0.0000000000E+00 | 0.0000000000E+00 | 0.0000000000E+00 |
| A4 | 1.2667981603E−04 | 1.4621377564E−04 | −6.7932079189E−05 |
| A5 | −9.0019926913E−06 | −8.8070313996E−06 | 2.7193193145E−06 |
| A6 | −3.4791872164E−07 | −5.6326440504E−07 | 2.1463431065E−06 |
| A7 | 6.0179758104E−08 | 1.4936067914E−07 | −3.1713258890E−07 |
| A8 | −6.2191777937E−10 | −1.9727459676E−08 | 1.4721261733E−08 |
| A9 | −2.2947334598E−10 | 1.6545779933E−09 | −6.9114314769E−10 |
| A10 | 1.6693857112E−11 | −2.9641473840E−10 | 2.1451972949E−10 |
| A11 | −9.3971085350E−13 | −7.5811353027E−12 | −1.3611696695E−11 |
| A12 | 6.6134779220E−14 | 4.8097591773E−13 | −1.8025021645E−12 |
| A13 | −2.2007252775E−15 | 7.9631652161E−15 | 1.8287955541E−13 |
| A14 | −7.5432250024E−17 | −7.0826242319E−16 | 7.4279204001E−15 |
| A15 | 7.0647096469E−18 | −5.1460730569E−17 | −1.3452357234E−15 |
| A16 | −1.3316160074E−19 | 2.3951201589E−18 | 4.0586249951E−17 |

| Sn | 24 | 25 |
|---|---|---|
| KA | −4.6016311343E+00 | −2.5030681044E+00 |
| A3 | 0.0000000000E+00 | 0.0000000000E+00 |
| A4 | −1.4830394545E−04 | 7.2086913601E−05 |
| A5 | −8.9066841167E−06 | −1.9087450187E−05 |
| A6 | 3.4132613793E−07 | −1.2744540794E−06 |
| A7 | −5.1727746878E−08 | 2.0157454013E−07 |
| A8 | 4.5871321728E−08 | 3.8649877760E−08 |
| A9 | 6.0742484846E−10 | 5.9606723063E−09 |
| A10 | −5.3611778967E−10 | −2.0290191914E−09 |
| A11 | −5.9779908343E−11 | 4.1125285289E−11 |
| A12 | 9.9646595118E−12 | 1.6610281712E−11 |
| A13 | 1.2706064772E−13 | −8.8550069661E−13 |
| A14 | −4.5402158547E−14 | −3.6189797066E−14 |
| A15 | 1.9719638960E−16 | 3.2377160824E−15 |
| A16 | 6.3169140422E−17 | −4.7273538254E−17 |

Example 10

Figure 22:
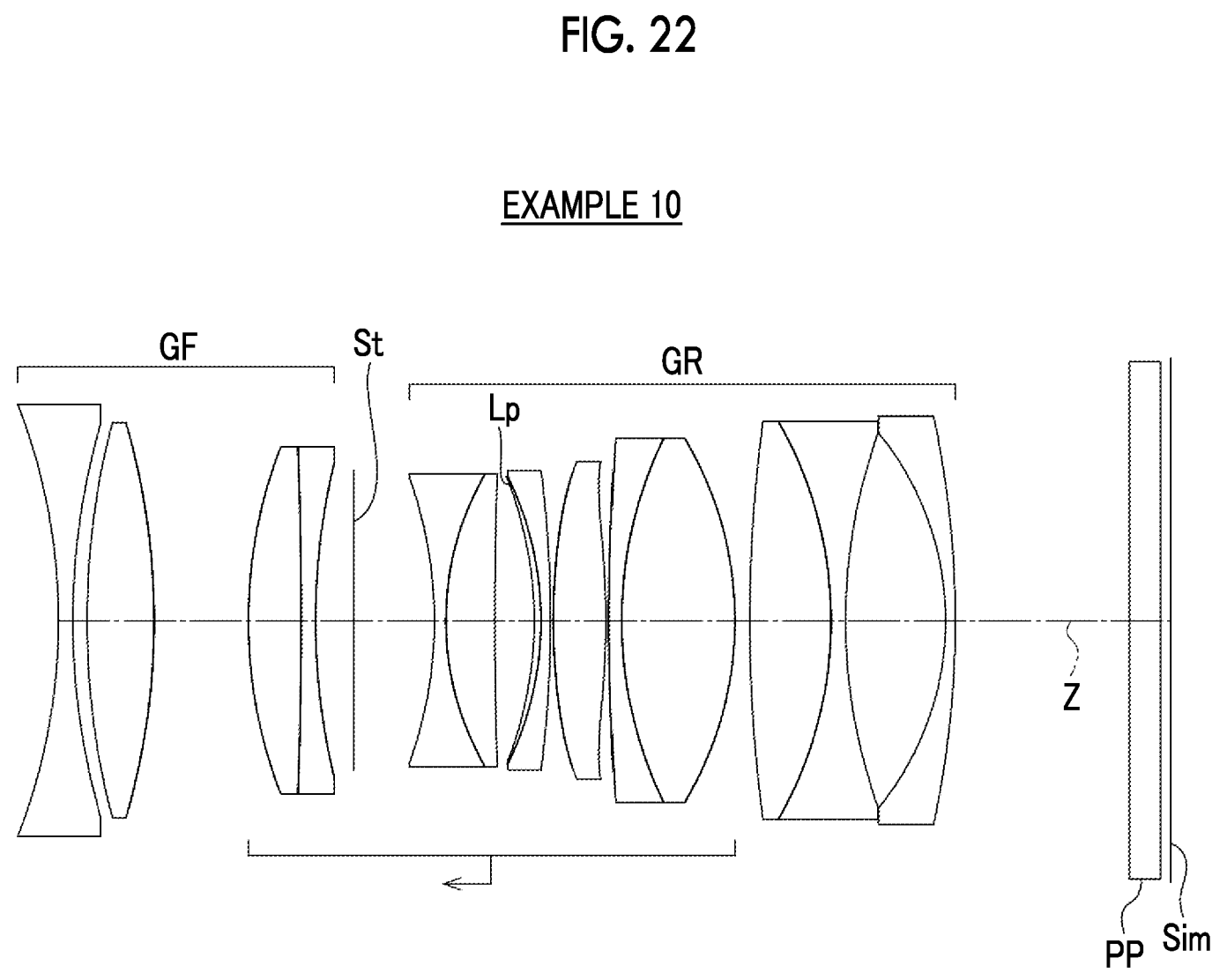

FIG. 22 is a cross-sectional view of a configuration of the imaging lens of Example 10. The imaging lenses of Example 10 consists of, in order from the object side to the image side, a first lens group that has a negative refractive power, a second lens group that has a positive refractive power, and a third lens group that has a negative refractive power. The second lens group includes an aperture stop St. The front group GF consists of the first lens group and a part of the second lens group on the object side. The rear group GR consists of the other part of the second lens group and the third lens group. During focusing from the infinite distance object to the close object, the first lens group and the third lens group remain stationary with respect to the image plane Sim, and the second lens group moves to the object side.

A lens component of the second lens group, which is second from the object side, includes the Lp lens Lp. The lens component is a cemented lens configured by cementing an Lp lens Lp and a negative lens in order from the object side.

Figure 23:
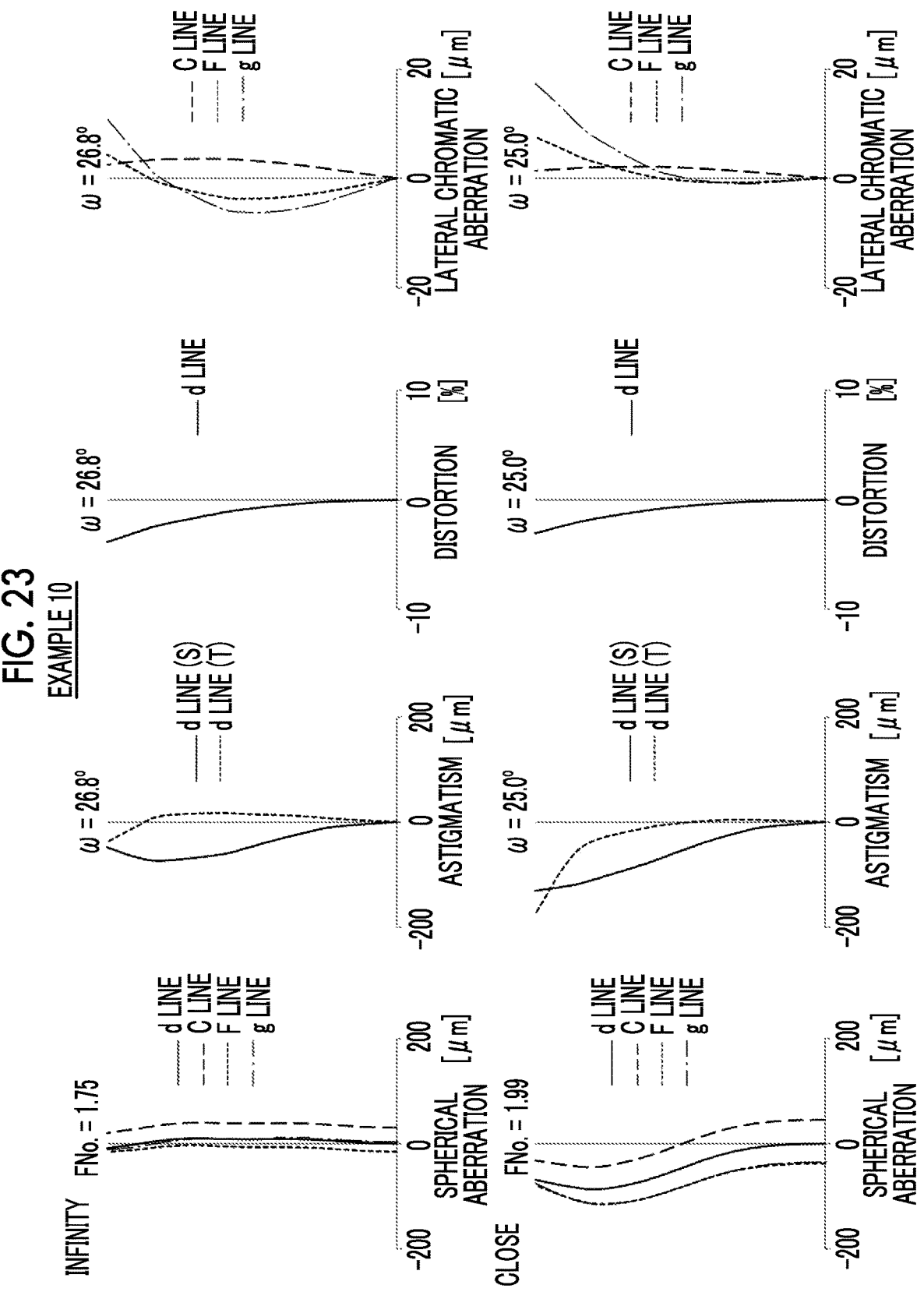
FIG. 23 is a diagram showing aberrations of the imaging lens of Example 10.

Regarding the imaging lens of Example 10, Table 28 shows basic lens data, Table 29 shows specifications and variable surface spacings, and Table 30 shows aspherical coefficients thereof. FIG. 23 shows aberration diagrams. The twelfth to thirteenth surfaces of Table 28 correspond to the Lp lens Lp.

TABLE 28

Example 10

| Sn | R | D | Nd | vd | θgF |
|---|---|---|---|---|---|
| 1 | −61.9356 | 1.5000 | 1.51742 | 52.43 | |
| 2 | 73.4976 | 1.5000 | | | |
| *3 | 85.9038 | 7.0001 | 1.58313 | 59.46 | |
| *4 | −73.9171 | DD[4] | | | |
| 5 | 50.3273 | 5.5000 | 1.85150 | 40.78 | |
| 6 | −494.8646 | 1.5100 | 1.59551 | 39.24 | |
| 7 | 70.5210 | 4.0000 | | | |
| 8(St) | ∞ | 8.4049 | | | |
| 9 | −43.7729 | 1.2100 | 1.59551 | 39.24 | |
| 10 | 30.5775 | 5.0973 | 1.75500 | 52.32 | |
| 11 | 446.3743 | 4.1107 | | | |
| *12 | −39.6052 | 0.7000 | 1.59833 | 20.31 | 0.83435 |
| 13 | −34.2307 | 1.0000 | 1.59551 | 39.24 | |
| 14 | −122.8152 | 0.3000 | | | |
| *15 | 71.7128 | 5.5000 | 1.69350 | 53.20 | |
| *16 | −75.0791 | 0.3002 | | | |
| 17 | 272.6236 | 1.2700 | 1.59551 | 39.24 | |
| 18 | 43.5277 | 11.8057 | 1.49700 | 81.54 | |
| 19 | −36.7266 | DD[19] | | | |
| 20 | 158.8561 | 8.5014 | 1.88300 | 40.76 | |
| 21 | −41.7059 | 1.5202 | 1.59551 | 39.24 | |
| 22 | 57.9998 | 10.4174 | | | |
| 23 | −30.8126 | 1.0001 | 1.48749 | 70.24 | |
| 24 | −101.9347 | 18.1847 | | | |
| 25 | ∞ | 3.2000 | 1.51680 | 64.20 | |
| 26 | ∞ | 1.1000 | | | |

TABLE 29

| | Example 10 | | |
|---|---|---|---|
| | Infinity | Close 300 mm | 5 |
| Focal length | 56.43 | 52.84 | |
| Open F number | 1.75 | 1.99 | |
| Maximum total angle of view [°] | 53.5 | 50.0 | |
| DD[4] | 9.8374 | 2.1427 | |
| DD[19] | 1.5448 | 9.2394 | |

TABLE 29-continued

| | Example 10 | |
|---|---|---|
| | Infinity | Close 300 mm |

TABLE 30

| | Example 10 | | |
|---|---|---|---|
| Sri | 3 | 4 | 12 |
| KA | 1.0000000000E+00 | 1.0000000000E+00 | 1.0000000000E+00 |
| A4 | 8.6904290127E−07 | 5.9860796378E−08 | 1.1308276598E−06 |
| A6 | −1.1987878195E−10 | −7.2246335077E−10 | −2.6508000748E−09 |
| A8 | 3.5992754959E−12 | 5.5888485740E−12 | 3.2224981708E−11 |
| A10 | −1.8012445782E−14 | −1.6756476564E−14 | −3.1159637629E−14 |
| A12 | 7.9205331672E−17 | 2.6863603430E−17 | −1.9559123272E−16 |
| A14 | −2.1161023857E−19 | −4.0164086941E−20 | −4.0528177081E−19 |
| A16 | 5.5185491788E−23 | −6.4360277265E−24 | 2.9581367171E−21 |
| A18 | 8.6153654828E−25 | 3.4852187355E−25 | 1.1319301414E−24 |
| A20 | −1.2011528525E−27 | −5.7770438841E−28 | −1.8662849379E−26 |

| | Example 10 | |
|---|---|---|
| Sn | 15 | 16 |
| KA | 1.0000000000E+00 | 1.0000000000E+00 |
| A4 | 1.6158007609E−06 | 1.1103698543E−05 |
| A6 | 1.7249994397E−08 | 1.3404604776E−08 |
| A8 | 1.2697856462E−12 | 4.3806760569E−11 |
| A10 | −1.0145016313E−13 | −1.3923488524E−13 |
| A12 | 7.6980281811E−16 | 7.4016856579E−17 |
| A14 | −9.1138966591E−19 | 2.2240070362E−18 |
| A16 | −3.4281048434E−21 | −3.4835878582E−21 |
| A18 | 1.1769482782E−23 | −1.6118651444E−23 |
| A20 | −2.8338709546E−27 | 4.8803969327E−26 |

Tables 31 and 32 show corresponding values of Conditional Expressions (1) to (20) of the imaging lenses of Examples 1 to 10. By using the corresponding values of examples shown in Tables 31 and 32 as the upper limits or the lower limits of conditional expressions, preferable ranges of the conditional expressions may be set.

TABLE 31

| Expression Number | | Example 1 | Example 2 | Example 3 | Example 4 | Example 5 |
|---|---|---|---|---|---|---|
| (1) | $\nu p + 94.24 \times Np$ | 172.1 | 172.1 | 170.9 | 170.9 | 170.9 |
| (2) | $d \times (1/Rf − 1/Rr)$ | 0.00758 | 0.00145 | 0.00819 | 0.00840 | 0.00326 |
| (3) | $TL \times (1/De − 1/Rr)$ | 0.164 | −7.031 | 0.180 | 0.246 | 0.616 |
| (4) | $FNo \times TL/(f \times \tan\omega m)$ | 9.903 | 9.968 | 9.875 | 9.931 | 8.838 |
| (5) | $Bf/(f \times \tan\omega m)$ | 0.993 | 1.403 | 1.004 | 0.996 | 0.806 |
| (6) | $Denp/f$ | 1.155 | 1.192 | 1.163 | 1.156 | 0.976 |
| (7) | $Dexp/Bf$ | 4.026 | 2.603 | 4.030 | 3.989 | 3.630 |
| (8) | $TL/fp$ | 0.581 | 0.305 | 0.509 | 0.517 | 0.254 |
| (9) | $Hpp/Hpm$ | 0.564 | 0.324 | 0.582 | 0.585 | 0.691 |
| (10) | $(De − Rr)/(De + Rr)$ | 0.019 | −0.327 | 0.021 | 0.030 | 0.134 |
| (11) | $(Rf − Rr)/(Rf + Rr)$ | 21.000 | 0.032 | 0.102 | 0.106 | 0.085 |
| (12) | $ffoc/fp$ | 0.208 | 0.100 | 0.181 | 0.192 | 0.108 |
| (13) | $\nu p$ | 21.197 | 21.197 | 20.305 | 20.305 | 20.305 |
| (14) | $\theta gFp$ | 0.801 | 0.801 | 0.834 | 0.834 | 0.834 |
| (15) | $Np$ | 1.602 | 1.602 | 1.598 | 1.598 | 1.598 |
| (16) | $Dexp/Dpi$ | 1.649 | 1.273 | 1.686 | 1.666 | 1.707 |
| (17) | $Dpi/Hpm$ | 3.073 | 4.473 | 3.030 | 2.993 | 2.492 |
| (18) | $(f \times \tan\omega m) \times (1/De − 1/Rr)$ | 0.024 | −1.016 | 0.026 | 0.036 | 0.100 |
| (19) | $\omega m$ | 37.52 | 37.74 | 37.55 | 37.79 | 37.81 |
| (20) | $FNo$ | 1.441 | 1.440 | 1.440 | 1.441 | 1.441 |

TABLE 32

| Expression Number | | Example 6 | Example 7 | Example 8 | Example 9 | Example 10 |
|---|---|---|---|---|---|---|
| (1) | vp + 94.24 × Np | 170.9 | 170.9 | 170.9 | 170.9 | 170.9 |
| (2) | d × (1/Rf − 1/Rr) | 0.00342 | 0.00419 | 0.00454 | 0.00369 | 0.00278 |
| (3) | TL × (1ZDe − 1ZRr) | −3.537 | −4.614 | −5.371 | 0.671 | −3.490 |
| (4) | FNo × TL/(f × tanωm) | 8.940 | 10.079 | 9.925 | 8.745 | 7.071 |
| (5) | Bf/(f × tanωm) | 0.816 | 0.986 | 0.988 | 0.808 | 0.752 |
| (6) | Denp/f | 1.031 | 1.036 | 1.049 | 0.987 | 0.406 |
| (7) | Dexp/Bf | 3.932 | 4.521 | 4.735 | 3.598 | 3.151 |
| (8) | TL/fp | 0.261 | 0.362 | 0.386 | 0.282 | 0.286 |
| (9) | Hpp/Hpm | 0.619 | 0.386 | 0.382 | 0.658 | 0.584 |
| (10) | (De − Rr)/(De + Rr) | −0.533 | −0.456 | −0.522 | 0.153 | −0.342 |
| (11) | (Rf − Rr)/(Rf + Rr) | 0.162 | 0.120 | 0.148 | 0.099 | 0.073 |
| (12) | ffoc/fp | 0.099 | 0.145 | 0.161 | 0.125 | 0.134 |
| (13) | vp | 20.305 | 20.305 | 20.305 | 20.305 | 20.310 |
| (14) | θgFp | 0.834 | 0.834 | 0.834 | 0.834 | 0.834 |
| (15) | Np | 1.598 | 1.598 | 1.598 | 1.598 | 1.598 |
| (16) | Dexp/Dpi | 1.527 | 1.384 | 1.453 | 1.661 | 1.033 |
| (17) | Dpi/Hpm | 2.832 | 3.950 | 4.014 | 2.464 | 4.469 |
| (18) | (f × tanωm) × (1/De − 1/Rr) | −0.570 | −0.666 | −0.779 | 0.110 | −0.864 |
| (19) | ωm | 38.13 | 38.09 | 38.79 | 37.77 | 26.75 |
| (20) | FNo | 1.441 | 1.455 | 1.439 | 1.440 | 1.750 |

The imaging lenses of Examples 1 to 10 each have an open F number smaller than 1.8 in a state in which the infinite distance object is in focus, and particularly the imaging lenses of Examples 1 to 9 each have an open F number smaller than 1.5 in a state in which the infinite distance object is in focus. Further, the imaging lenses of Examples 1 to 10 each have a small size and a light weight, and each maintain favorable optical performance by suppressing various aberrations including chromatic aberration.

In an imaging apparatus such as a digital camera, there is a demand for a lens system that has a small size and a light weight and has a small F number. In the related art, in a case where such a lens system is intended to achieve reduction in size, chromatic aberration occurs, and it is difficult to maintain the resolution performance. In the related art, in a case where it is intended to correct chromatic aberration, the number of lenses increases, and it is difficult to reduce the weight. On the other hand, in Examples 1 to 10 of the present disclosure, the Lp lens Lp made of a highly dispersed resin is effectively disposed. As a result, a small size, a light weight, and a small F number are realized while various aberrations including chromatic aberration are corrected.

Figure 24:
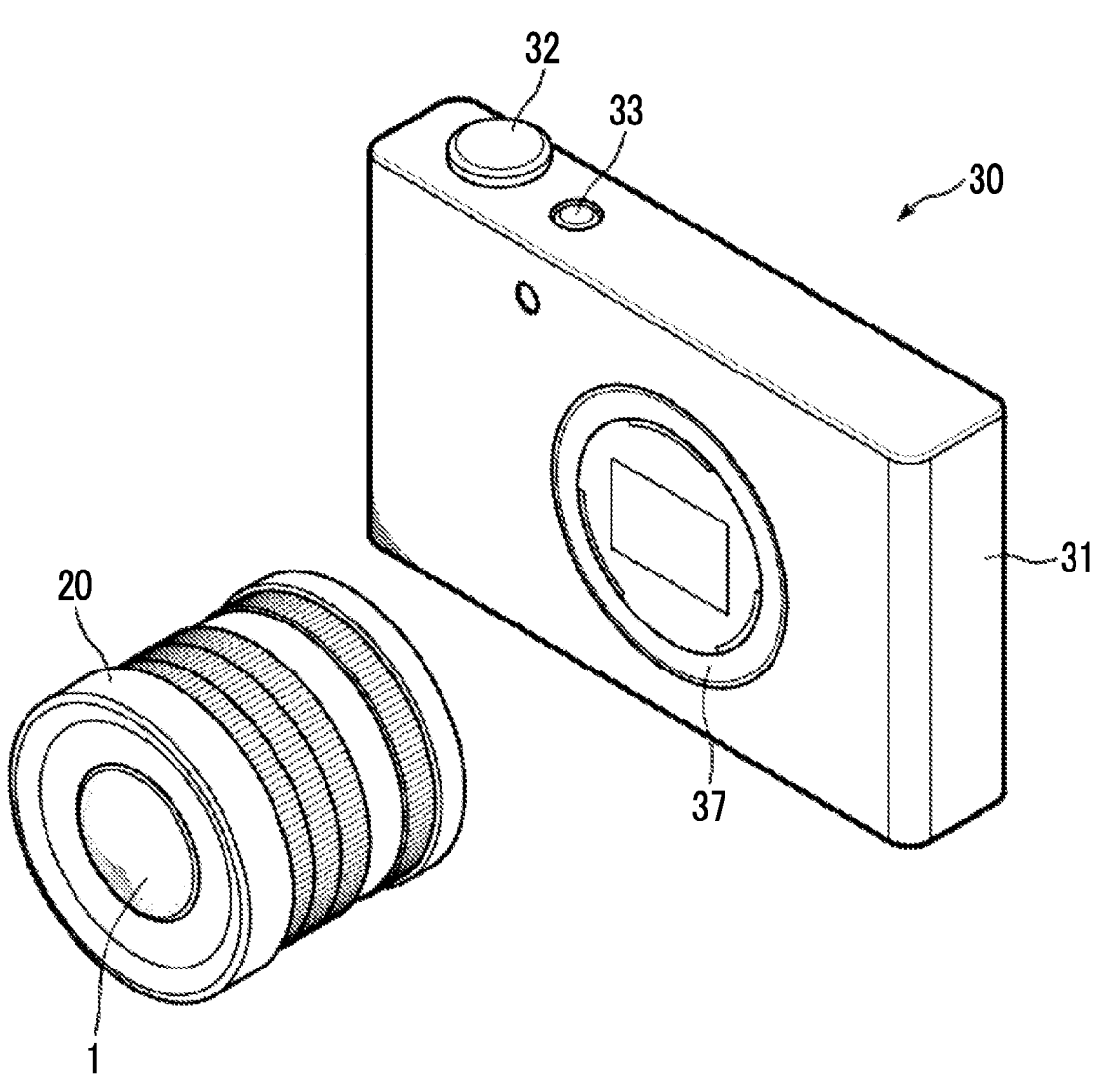
FIG. 24 is a perspective view of the front side of the imaging apparatus according to an embodiment.
Figure 25:
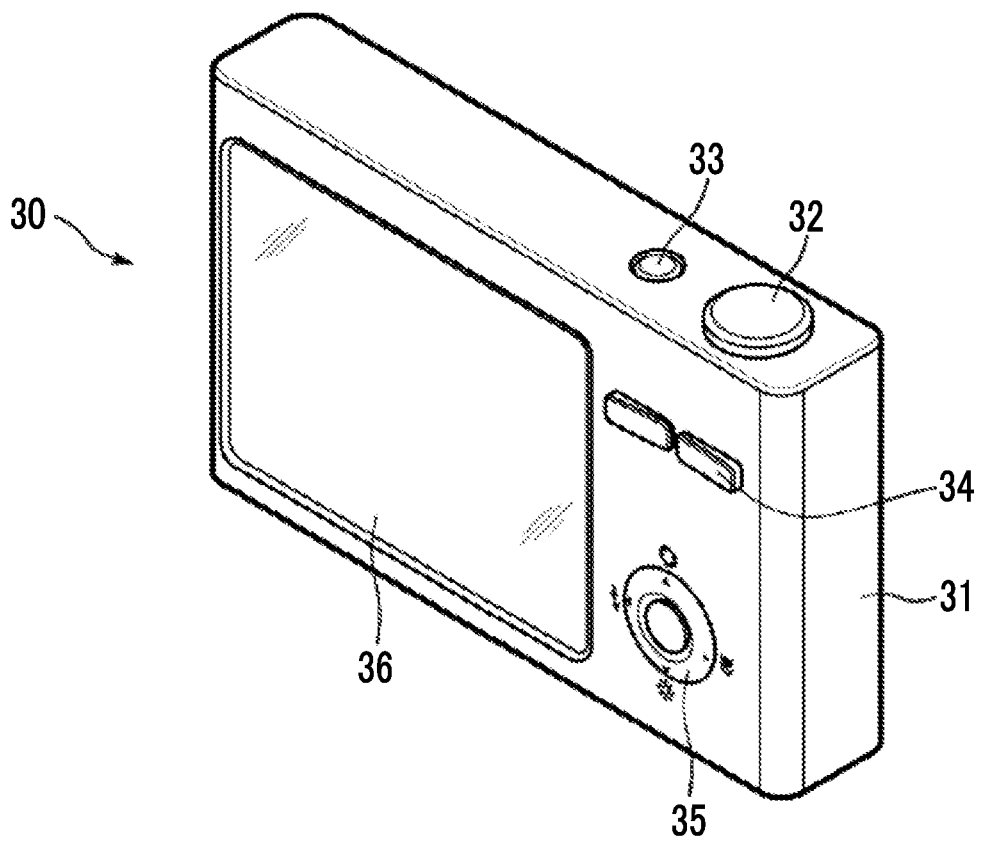
FIG. 25 is a perspective view of the rear side of the imaging apparatus according to the embodiment.

Next, an imaging apparatus according to an embodiment of the present disclosure will be described. FIGS. 24 and 25 are external views of a camera 30 which is the imaging apparatus according to the embodiment of the present disclosure. FIG. 24 is a perspective view of the camera 30 viewed from a front side, and FIG. 25 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side, a front group, an aperture stop, and a rear group, wherein the rear group includes at least one Lp lens that
  is made of a resin, has a positive refractive power, and
  is cemented to a lens,
  an Abbe number of the Lp lens based on a d line is vp,
  a refractive index of the Lp lens at the d line is Np,
  a center thickness of the Lp lens is d,
  a curvature radius of an object side surface of the Lp
    lens is Rf,
  a curvature radius of an image side surface of the Lp
    lens is Rr, a sum of an air-equivalent distance on an optical axis from a lens surface closest to the image side in the rear group to an image plane and a distance on the optical axis from a lens surface closest to the object side in the front group to the lens surface closest to the image side in the rear group in a state in which an infinite distance object is in focus is TL, a distance on the optical axis from the image side surface of the Lp lens to an image point, which is formed by an optical system ranging from a lens surface adjacent to the image side of the aperture stop to the image side surface of the Lp lens, in a case where a point at a position of the aperture stop on the optical axis is set as an object point in a state in which the infinite distance object is in focus is De, De is calculated in a case where a medium closer to the image side than the image side surface of the Lp lens is set as air, and a sign of De is negative in a case where the image point is closer to the object side than the image side surface of the Lp lens on the optical axis and is positive in a case where the image point is closer to the image side than the image side surface of the Lp lens, an open F number in a state in which the infinite distance object is in focus is FNo, a focal length of the imaging lens in a state in which the infinite distance object is in focus is f, and a maximum half angle of view in a state in which the infinite distance object is in focus is om, Conditional Expressions (1), (2), (3), and (4) are satisfied, which are represented by $$120 < \nu p + 94.24 \times Np < 186 \tag{1},$$

$$0 < d \times (1/Rf - 1/Rr) < 0.05 \tag{2},$$

$$-20 < TL \times (1/De - 1/Rr) < 20 \tag{3, and}$$

$$1 < FNo \times TL/(f \times \tan \omega m) < 30 \tag{4, and}$$

wherein the air-equivalent distance on the optical axis from the lens surface closest to the image side in the rear group to the image plane in a state in which the infinite distance object is in focus is Bf, Conditional Expression (5) is satisfied, which is represented by $$0.4 < Bf/(f \times \tan \omega m) < 1.7 \tag{5, or}$$

wherein a focal length of a focus group moving along the optical axis during focusing is ffoc, and a focal length of the Lp lens is fp, Conditional Expression (12) is satisfied, which is represented by $$0.04 < ffoc/fp < 0.36 \tag{12}.$$

2. The imaging lens according to claim 1, wherein the Lp lens has either the object side surface or the image side surface being in contact with air.

3. The imaging lens according to claim 1, wherein the Lp lens has both the object side surface and the image side surface cemented to lenses.

4. The imaging lens according to claim 1, wherein a focus group moving along the optical axis during focusing includes the Lp lens.

5. The imaging lens according to claim 1, wherein the Lp lens has either one of the object side surface or the image side surface having an aspherical shape.

6. The imaging lens according to claim 1, wherein a distance on the optical axis from the lens surface closest to the object side in the front group to a paraxial entrance pupil position in a state in which the infinite distance object is in focus is Denp, Conditional Expression (6) is satisfied, which is represented by $$0.3 < Denp/f < 2.5 \tag{6}.$$

7. The imaging lens according to claim 1, wherein the air-equivalent distance on the optical axis from the lens surface closest to the image side in the rear group to the image plane in a state in which the infinite distance object is in focus is Bf, and a sum of the air-equivalent distance on the optical axis from the lens surface closest to the image side in the rear group to the image plane and a distance on the optical axis from a paraxial exit pupil position to the lens surface closest to the image side in the rear group in a state in which the infinite distance object is in focus is Dexp, Conditional Expression (7) is satisfied, which is represented by $$1.95 < Dexp/Bf < 7.2 \tag{7}.$$

8. The imaging lens according to claim 1, wherein a focal length of the Lp lens is fp, Conditional Expression (8) is satisfied, which is represented by $$0.1 < TL/fp < 1.2 \tag{8}.$$

9. The imaging lens according to claim 1, wherein a height from the optical axis of a principal ray at a maximum half angle of view on the object side surface of the Lp lens in a state in which the infinite distance object is in focus is Hpp, and a height from the optical axis of an on-axis marginal ray on the object side surface of the Lp lens in a state in which the infinite distance object is in focus is Hpm, Conditional Expression (9) is satisfied, which is represented by $$0.2 < Hpp/Hpm < 1.1 \tag{9}.$$

10. The imaging lens according to claim 1, wherein Conditional Expression (10) is satisfied, which is represented by $$-0.9 < (De - Rr)/(De + Rr) < 0.9 \tag{10}.$$

11. The imaging lens according to claim 1, wherein Conditional Expression (11) is satisfied, which is represented by $$0.005 < (Rf - Rr)/(Rf + Rr) < 0.45 \tag{11}.$$

12. The imaging lens according to claim 1, wherein Conditional Expression (13) is satisfied, which is represented by $$14 < \nu p < 28 \tag{13}.$$

13. The imaging lens according to claim 1, wherein a partial dispersion ratio of the Lp lens between a g line and an F line is θgFp, Conditional Expression (14) is satisfied, which is represented by $$0.67 < \theta gFp < 1.1 \tag{14}.$$

14. The imaging lens according to claim 1,
wherein Conditional Expression (15) is satisfied, which is
represented by $$1.51 < Np < 1.72 \tag{15}$$

15. The imaging lens according to claim 1,
wherein a sum of the air-equivalent distance on the optical axis
from the lens surface closest to the image side in the
rear group to the image plane and a distance on the
optical axis from a paraxial exit pupil position to the
lens surface closest to the image side in the rear
group in a state in which the infinite distance object
is in focus is Dexp, and a sum of the air-equivalent distance on the optical axis
from the lens surface closest to the image side in the
rear group to the image plane and a distance on the
optical axis from the object side surface of the Lp
lens to the lens surface closest to the image side in
the rear group in a state in which the infinite distance
object is in focus is Dpi, Conditional Expression (16) is satisfied, which is repre-
sented by $$0.8 < Dexp/Dpi < 2.4 \tag{16}$$

16. The imaging lens according to claim 1,
wherein a sum of the air-equivalent distance on the optical axis
from the lens surface closest to the image side in the
rear group to the image plane and a distance on the
optical axis from the object side surface of the Lp
lens to the lens surface closest to the image side in
the rear group in a state in which the infinite distance
object is in focus is Dpi, and a height from the optical axis of an on-axis marginal ray
on the object side surface of the Lp lens in a state in
which the infinite distance object is in focus is Hpm, Conditional Expression (17) is satisfied, which is repre-
sented by $$1.9 < Dpi/Hpm < 5.9 \tag{17}$$

17. The imaging lens according to claim 1,
wherein Conditional Expression (18) is satisfied, which is
represented by $$-2.5 < (f \times \tan \omega m) \times (1/De - 1/Rr) < 1 \tag{18}$$

18. An imaging apparatus comprising the imaging lens
according to claim 1.

\* \* \* \* \*